United States Patent
Yuste et al.

(10) Patent No.: US 10,520,712 B2
(45) Date of Patent: Dec. 31, 2019

(54) SYSTEM, METHOD AND COMPUTER-ACCESSIBLE MEDIUM FOR MULTI-PLANE IMAGING OF NEURAL CIRCUITS

(71) Applicant: THE TRUSTEES OF COLUMBIA UNIVERSITY IN THE CITY OF NEW YORK, New York, NY (US)

(72) Inventors: Rafael Yuste, New York, NY (US); Darcy S. Peterka, Hoboken, NJ (US); Weijian Yang, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 15/741,435

(22) PCT Filed: Jul. 1, 2016

(86) PCT No.: PCT/US2016/040753
§ 371 (c)(1),
(2) Date: Jan. 2, 2018

(87) PCT Pub. No.: WO2017/004555
PCT Pub. Date: Jan. 5, 2017

(65) Prior Publication Data
US 2018/0373009 A1    Dec. 27, 2018

Related U.S. Application Data

(60) Provisional application No. 62/187,595, filed on Jul. 1, 2015.

(51) Int. Cl.
G02B 21/00    (2006.01)
G02B 21/06    (2006.01)
(Continued)

(52) U.S. Cl.
CPC .......... *G02B 21/002* (2013.01); *G02B 21/06* (2013.01); *G02B 21/16* (2013.01); *G02B 21/367* (2013.01);
(Continued)

(58) Field of Classification Search
CPC .................................. G02B 21/02; G02B 21/06
See application file for complete search history.

(56) References Cited

U.S. PATENT DOCUMENTS

| 4,831,333 A | 5/1989 | Welch |
| 2008/0049232 A1 | 2/2008 | Vakoc et al. |

(Continued)

FOREIGN PATENT DOCUMENTS

| WO | WO 2009/136189 | 11/2009 | |
| WO | WO-2009136189 A1 * | 11/2009 | ......... B23K 26/0006 |

OTHER PUBLICATIONS

Petter J. Burt and Edward H. Adelson, "A Multiresolution Spline With Application to Image Mosaics", ACM Transactions on Graphics, vol. 2, No. (Year: 1983).*

(Continued)

*Primary Examiner* — Thai Q Tran
*Assistant Examiner* — Girumsew Wendmagegn
(74) *Attorney, Agent, or Firm* — Hunton Andrews Kurth LLP

(57) ABSTRACT

An exemplary device can be provided which can include, for example, a radiation source(s) configured to generate a first radiation(s), a spatial light modulator (SLM) arrangement(s) configured to receive the first radiation(s) and generate a second radiation(s) based on the first radiation(s), and a galvanometer(s) configured to receive the second radiation(s), generate a third radiation(s) based on the second radiation(s), and provide the third radiation(s) to a sample(s).

21 Claims, 35 Drawing Sheets

(51) Int. Cl.
G02B 21/16 (2006.01)
G02B 21/36 (2006.01)
G02B 26/10 (2006.01)
G02F 1/03 (2006.01)
G06T 5/00 (2006.01)

(52) U.S. Cl.
CPC ...... *G02B 26/101* (2013.01); *G02B 2207/114* (2013.01); *G02F 1/03* (2013.01); *G06T 5/002* (2013.01); *G06T 2207/10056* (2013.01); *G06T 2207/10064* (2013.01); *G06T 2207/30016* (2013.01)

(56) References Cited

U.S. PATENT DOCUMENTS

| | | |
|---|---|---|
| 2008/0084542 A1 | 4/2008 | Lalley et al. |
| 2009/0046333 A1 | 2/2009 | Peyghambarian et al. |
| 2011/0233046 A1* | 9/2011 | Nikolenko ......... G01N 21/6458 204/157.15 |
| 2013/0057953 A1 | 3/2013 | Yokoi et al. |
| 2013/0181143 A1* | 7/2013 | Betzig ................ G02B 21/0032 250/459.1 |
| 2014/0152795 A1* | 6/2014 | Fujii .................... G02B 21/002 348/79 |

OTHER PUBLICATIONS

International Search Report for International Appication No. PCT/US2016/040753 dated Nov. 10, 2016.
International Written Opinion for International Appication No. PCT/US2016/040753 dated Nov. 10, 2016.
Ahrens, Misha B. et al., Whole-brain functional imaging at cellular resolution using light-sheet microscopy. Nature Methods, vol. 10, No. 5, pp. 413-424, 2013.
Alivisatos, A.P., et al., Nanotools for Neuroscience and Brain Activity Mapping. Acs Nano. vol. 7, No. 3, pp. 1850-1866, 2013.
Alivisatos, A.P. et al., The Brain Activity Map. Science, vol. 339, pp. 1284-1285, Mar. 15, 2013.
Alivisatos, A.P. et al. The Brain Activity Map Project and the Challenge of Functional Connectomics. Neuron, vol. 74, pp. 970-974, Jun. 21, 2012.
Andresen, V., et al., Time-multiplexed multifocal muitiphoton microscope. Optics Letters, vol. 26, No. 2, pp. 75-77, 2001.
Anselmi, F., et al., Three-dimensional imaging and photostimulation by remote-focusing and holographic light patterning. Proceedings of the National Academy of Sciences of the United States of America, vol. 108, No. 49, pp. 19504-19509, Dec. 6, 2011.
Bahlmann, K., et al., Multifocal muitiphoton microscopy (MMM) at a frame rate beyond 600 Hz. Optics Express, vol. 15, No. 17, pp. 10991-10998, Aug. 20, 2007.
Beaurepaire, E. et al., Epifluorescence collection in two-photon microscopy. Applied Optics, vol. 41, No. 25, pp. 5376-5382, Sep. 1, 2002.
Beckmann, C.F., et al., Probabilistic independent component analysis for functional magnetic resonance imaging, Ieee Transactions on Medical Imaging, vol. 23, No. 2, pp. 137-152, Feb. 2004.
Bewersorf, J. et al., Multifocal multiphoton microscopy. Optics Letters, vol. 23, No. 9, pp. 655-657, May 1, 1998.
Botcherby, E.J. et al., An optical technique for remote focusing in microscopy. Optics Communications, vol. 281, pp. 880-887, 2008.
Botcherby, E.J., et al., Scanning two photon fluorescence microscopy with extended depth of field. Optics Communications, vol. 268, pp. 253-260, 2006.
Botcherby, E.J. et al. (2012). Aberration-free three-dimensional multiphoton imaging of neuronal activity at kHz rates. Proceedings of the National Academy of Sciences of the United States of America, vol. 109, No. 8, pp. 2919-2924, Feb. 21, 2012.
Brainard, D.H. The psychophysics toolbox. Spatial Vision,vol. 10, No. 4, pp. 433-436, 1997.

Bowsher, James E. et al., Bayesian reconstruction and use of anatomical a Priori information for emission tomography. IEEE Transactions on Medical Imaging, vol. 15, No. 5, pp. 673-686, Oct. 1996.
Cha, J.W., et al., Reassignment of Scattered Emission Photons in Muitifocal Multiphoton Microscopy. Scientific Reports 4., pp. 1-13, Jun. 5, 2014.
Chen, G.H. et al., Prior image constrained compressed sensing (PICCS): A method to accurately reconstruct dynamic CT images from highly undersampled projection data sets. Medical Physics, vol. 35, No. 2, pp. 660-663, 2008.
Chen, T.W. et al., Ultrasensitive fluorescent proteins for imaging neuronal activity. Nature, vol. 499, pp. 295-302, Jul. 18, 2013.
Cheng, A., et al., Simultaneous two-photon calcium imaging at different depths with spatiotemporal multiplexing. Nature Methods, vol. 8, No. 2, 139-144, Feb. 2011.
Ducros, M. et al., Encoded multisite two-photon microscopy. Proceedings of the National Academy of Sciences of the United States of America, vol. 110, No. 32, pp. 13138-13143, Aug. 6, 2013.
Dunn, A.K. Optical Properties of Neural Tissue. In Optical Imaging of Neocortical, Vo. 18. Dynamics, B. Weber, and F. Helmchen, Eds., pp. 33-51, 2014.
Egner, A. et al., Time multiplexing and parallelization in multifocal multiphoton microscopy. Journal of the Optical Society of America a-Optics Image Science and Vision, vol. 17, pp. 1192-1201, 2000.
Fahrabach, F.O. et al., Light-sheet microscopy in thick media using scanned Bessel beams and two-photon fluorescence excitation. Optics Express, vol. 21, p. 13824-13839, 2013.
Fittinghoff, D.N. et al., Widefield multiphoton and temporally decorrelated multifocal multiphoton microscopy. Optics Express, No. 7, pp. 273-279, 2000.
Frickle, M. et al.. Two-dimensional imaging without scanning by multifocal multiphoton microscopy. Applied Optics, vol. 44, pp. 2984-2988, 2005.
Golan, L. et al., Design and characteristics of holographic neural photo-stimulation systems. Journal of Neural Engineering, vol. 6, pp. 1-15, 2009.
Grewe, B.F. et al., High-speed in vivo calcium imaging reveals neuronal network activity with near-millisecond precision. Nature Methods, vol. 7, 399-405, May 2010.
Grewe, B.F. et al., Fast two-layer two-photon imaging of neuronal cell populations using an electrically tunable lens. Biomedical Optics Express, vol. 2, No. 7, pp. 2035-2046, Jul. 1, 2011.
Helmchen, F. et al, Deep tissue two-photon microscopy. Nature Methods, vol. 2, No. 12, pp. 932-940, Dec. 2005.
Helmstaedter, M. et al., Neuronal Correlates of Local, Lateral, and Translaminar inhibition with Reference to Cortical Columns. Cerebral Cortex, vol. 19, pp. 926-937, Apr. 2009.
Helmstaedter, M. et al., Efficient recruitment of layer ⅔ interneurons by layer 4 input in single columns of rat somatosensory cortex. Journal of Neuroscience, vol. 28, No. 33, pp. 8273-8284, Aug. 13, 2008.
Hirlimann, C. Femtosecond Laser Pulses: Principles and Experiments, Vol Advanced texts in physics, 2nd Edn, Springer, pp. 1-437, 2005.
Horton, N.G. et al., In vivo three-photon microscopy of subcortical structures within an intact mouse brain. Nature Photonics, vol. 7, pp. 205-209, Mar. 2013.
Huberman, A.D. et al., What can mice tell us about how vision works? Trends in Neurosciences, vol. 34, No. 9, pp. 464-473, Sep. 2011.
Insel, T.R. et al., The NIH Brain Initiative. Science, vol. 340, pp. 687-688, May 10, 2013.
Iyer, V. et al., Fast functional imaging of single neurons using random-access muitiphoton (RAMP) microscopy. Journal of Neurophysiology, vol. 95, pp. 535-545, 2006.
Sato, T.R. et al., Characterization and adaptive optical correction of aberrations during in vivo imaging in the mouse cortex. Proceedings of the National Academy of Sciences of the United States of America, vol. 109, No. 1, pp. 22-27, Jan. 3, 2012.
Katona, G. et al., Fast two-photon in vivo imaging with three-dimensional random-access scanning in large tissue voiumes. Nature Methods, vol. 9, No. 2, pp. 201-208, Feb. 2012.

(56) References Cited

OTHER PUBLICATIONS

Kim, K.H. et al., Multifocal muitiphoton microscopy based on multianode photomultiplier tubes. Optics Express, vol. 15, No. 18, pp. 11658-11678, Sep. 3, 2007.

Kobat, D. et al., In vivo two-photon microscopy to 1.6-mm depth in mouse cortex. Journal of Biomedical Optics, vol. 16, No. 10, pp. 1-5, Oct. 2011.

Kremer, Y. et al., A spatio-temporally compensated acousto-optic scanner for two-photon microscopy providing large field of view. Optics Express, vol. 16, No. 14, pp. 10066-10076, Jul. 7, 2008.

Li, Y. et al., Clonally related visual cortical neurons show similar stimulus feature selectivity. Nature, vol. 486, 118-122 Jun. 7, 2012.

London, M. et al., Dendritic computation. In Annual Review of Neuroscience, pp. 503-532, 2005.

Masamizu, Y. et al., Two distinct layer-specific dynamics of cortical ensembles during learning of a motor task. Nature Neuroscience, vol. 17, No. 7, pp. 987-994, 2014.

Matsumoto, N. et al., An adaptive approach for uniform scanning in multifocal muitiphoton microscopy with a spatial light modulator. Optics Express, vol. 22, pp. 633-645, 2014.

Mazurek, M. et al., Robust quantification of orientation selectivity and direction selectivity. Frontiers in Neural Circuits, vol. 8, Article 92, pp. 1-17, Aug. 2014.

Meyer, H.S. et al., Inhibitory interneurons in a cortical column form hot zones of inhibition in layers 2 and 5A. Proceedings of the National Academy of Sciences of the United States of America, vol. 108, No. 40, pp. 16807-16812, Oct. 4, 2011.

Niell, C.M. et al., Highly selective receptive fields in mouse visual cortex. Journal of Neuroscience, vol. 28, No. 30, pp. 7520-7536, 2008.

Nikolenko, V. et al., (2008). SLM microscopy: Scanless two-photon imaging and photostirnuiation with spatial light modulators. Frontiers in Neural Circuits, vol. 2, Article 5, pp. 1-14, Dec. 2008.

O'Shea, D.C., Suleski, T.J., Kathman, A.D., and Prather, D.W. (2003). Diffractive Optics: Design, Fabrication, and Test, vol. TT62 (Bellingham, Washington, USA: SPIE Press).

Otsu, Y. et al., Optical monitoring of neuronal activity at high frame rate with a digital random-acess multiphoton (RAMP) microscope. Journal of Neuroscience Methods, vol. 173, pp. 259-270, 2008.

Packer, A.M. et al., Two-photon optogenetics of dendritic spines and neural circuits. Nature Methods, vol. 9, No. 12, pp. 1202-1208, Dec. 2012.

Packer, A.M. et al., Simultaneous all-optical manipulation and recording of neural circuit activity with cellular resolution in vivo. Nature Methods, vol. 12, No. 2, pp. 140-150, Feb. 2015.

Pnevmatikakis, E.A. et al. Simultaneous denoising, deconvolution, and demixing of calcium imaging data. Neuron, vol. 89, pp. 285-299, Jan. 20, 2016.

Pologruto, T.A. et al., ScanImage flexible software for operating laser scanning microscopes. Biomedical engineering online, vol. 2, pp. 13-13, 2003.

Quirin, S. et al., Simultaneous imaging of neural activity in three dimensions. Frontiers in Neural Circuits, vol. 8, Article 29, pp. 1-11, Apr. 2014.

Qurin, S. et al., Instantaneous three-dimensional sensing using spatial light modulator illumination with extended depth of field imaging. Optics Express, vol. 21, No. 13, pp. 16007-16021, Jul. 1, 2013.

Reddy, G.D. et al., Three-dimensional random access multiphoton microscopy for functional imaging of neuronal activity. Nature Neuroscience, vol. 11, No. 6, 713-720, Jun. 2008.

Rickgauer, J.P. et al., Simultaneous cellular-resolution optical perturbation and imaging of place cell fields. Nature Neuroscience, vol. 17, No. 12, pp. 1816-1824, Dec. 2014.

Rochefort, N.L. et al., Development of Direction Selectivity in Mouse Cortical Neurons. Neuron, vol. 71, pp. 425-432, Aug. 11, 2011.

Salome, R. et al., Ultrafast random-access scanning in two-photon microscopy using acousto-optic deflectors. Journal of Neuroscience Methods, vol. 154, pp. 161-174, 2006.

Shai, A.S. et al., Physiology of Layer 5 Pyramidal Neurons in Mouse Primary Visual Cortex: Coincidence Detection through Bursting. PLoS computational biology, vol. 11, pp. 1-18, Mar. 13, 2015.

Sheetz, K.E. et al., Advancing multifocal nonlinear microscopy: development and application of a novel multibeam Yb:KGd(WO4)(2) oscillator. Optics Express, vol. 16, No. 22, pp. 17574-17584, Oct. 27, 2008.

Siltanen, S. et al., Statistical inversion for medical x-ray tomography with few radiographs: I. General theory. Physics in Medicine and Biology, vol. 48, pp. 1437-1463, 2003.

Stirman, J.N. et al., Wide field-of-view, twin-region two-photon imaging across extended cortical networks. [From the Internet], pp. 1-8, http://dx.doi.org/10.1101/011320.

Theriault, G. et al., Extended two-photon microscopy in live samples with Bessel beams: steadier focus, faster volume scans, and simpler stereoscopic imaging. Frontiers in Cellular Neuroscience, vol. 8, Article 139, May 2014.

Thevenaz, P. et al., A pyramid approach to subpixel registration based on intensity. IEEE Transactions on Image Processing, vol. 7, No. 1, pp. 27-41, Jan. 1998.

Vogelstein, J.T, et al., Fast Nonnegative Deconvolution for Spike Train Inference From Population Calcium Imaging. Journal of Neurophysiology, vol. 104, pp. 3691-3704, 2010.

Vogelstein, J.T. et al., Spike Inference from Calcium Imaging Using Sequential Monte Carlo Methods. Biophysical Journal, vol. 97, pp. 636-655, Jul. 2009.

Williams, R.M. et al., Multiphoton microscopy in biological research. Current Opinion in Chemical Biology, vol. 5, pp. 603-608, 2001.

Zipfel, W.R. at al., Nonlinear magic: Multiphoton microscopy in the biosciences. Nature Biotechnology, vol. 21, No. 11, pp. 1369-1377. Nov. 2003.

Palmer, C. et al., "Diffraction Grating handbook," 7th Edition, pp. 1-136, 2014.

Schmidt. J.D. et al., "Numerical Simulation of Optical Wave Propagation with Examples in MALAB," Bellingham, Washington 98227-0010, USA: SPE Press, pp. 1-214, 2010.

O'Shea, D.C. at al., "Diffraction Optics: Design, Fabrication, and Test," Tutorial Texts in Optical Engineering, vol. TT62, Bellingtonham, Washington, USA: SPIE Press, pp. 1-262, 2003.

\* cited by examiner

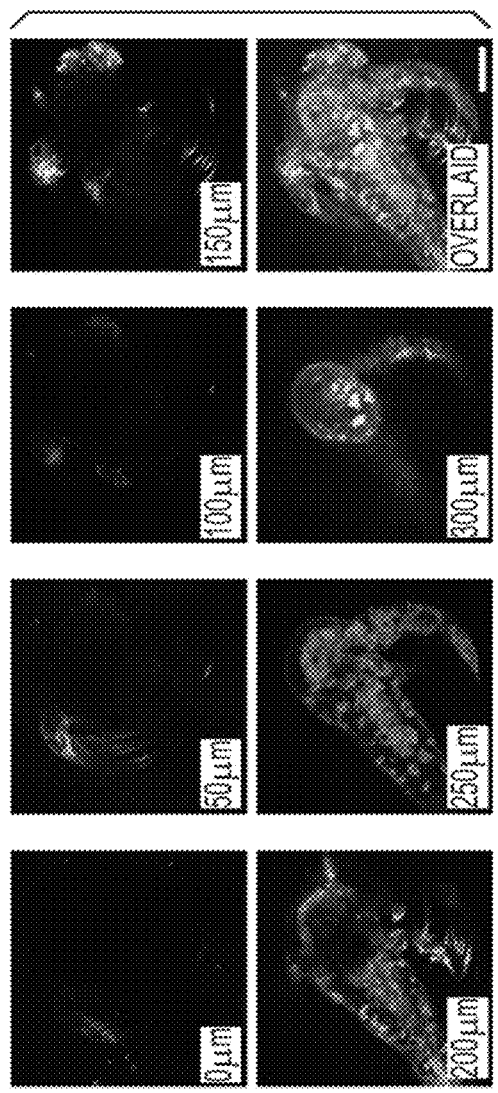
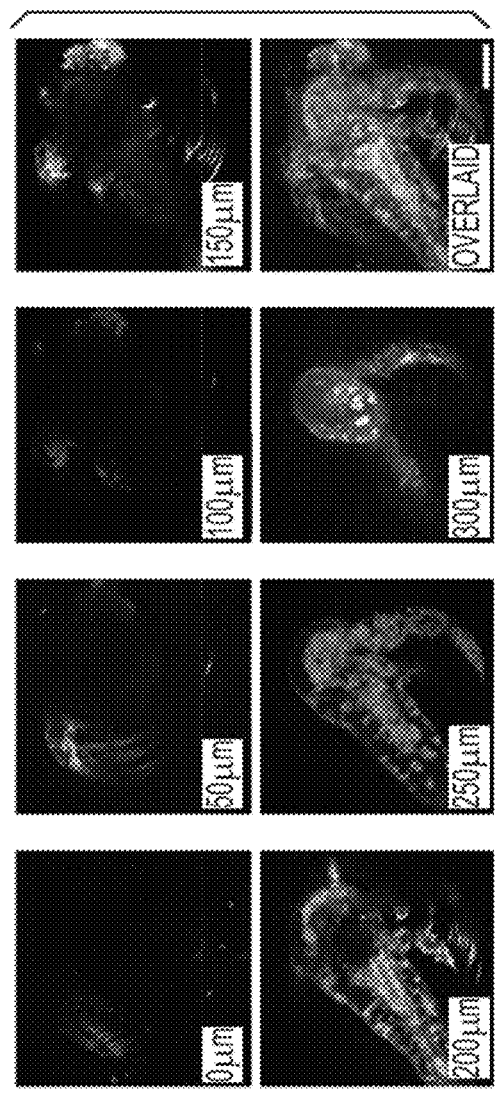
FIG. 1D
FIG. 1E

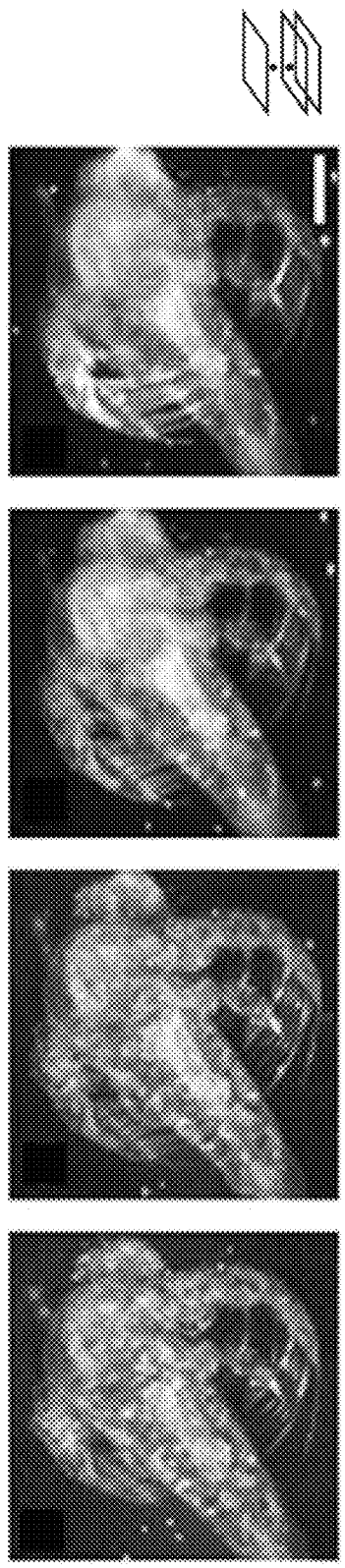

FIG. 2F　　　FIG. 2G

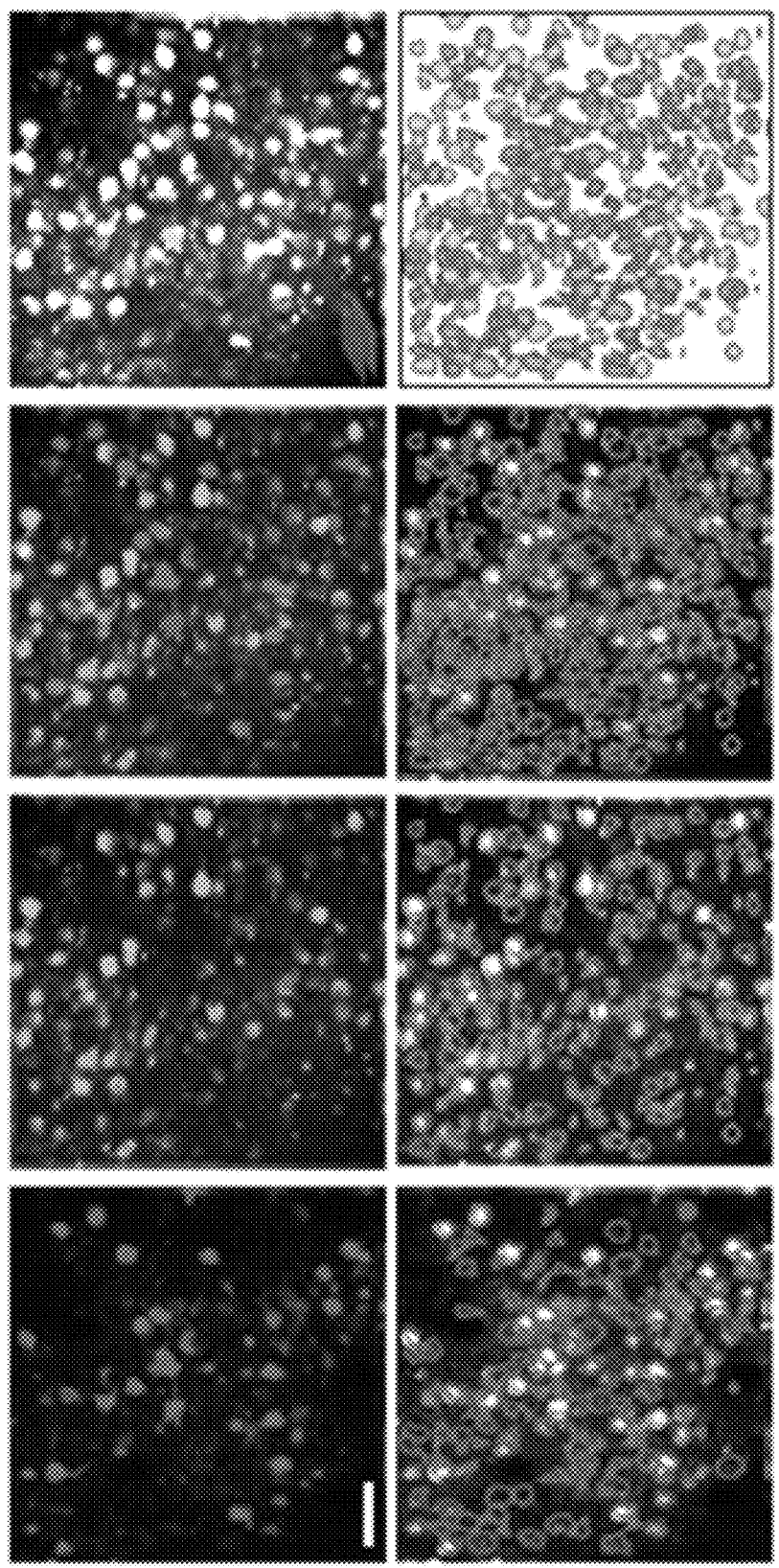

FIG. 3G    FIG. 3H

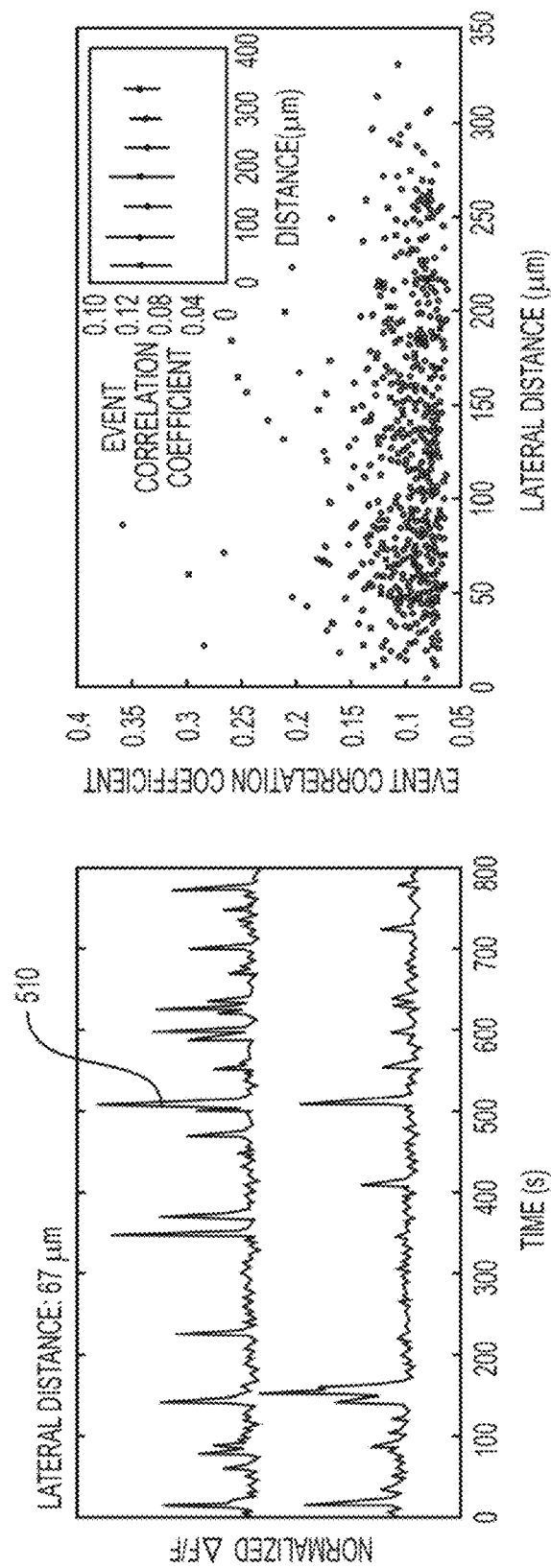

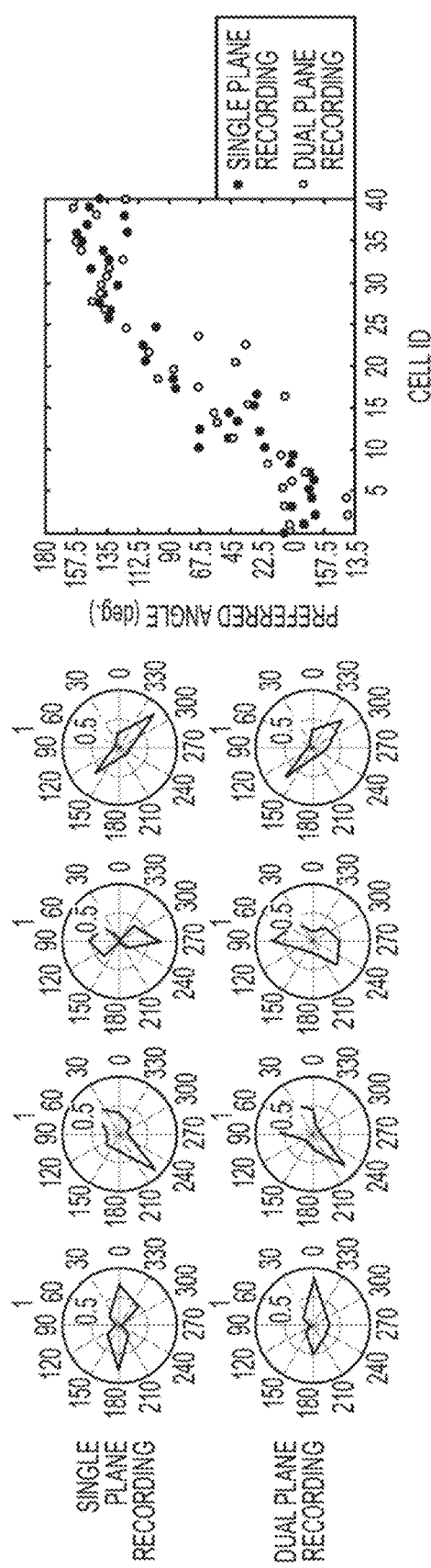
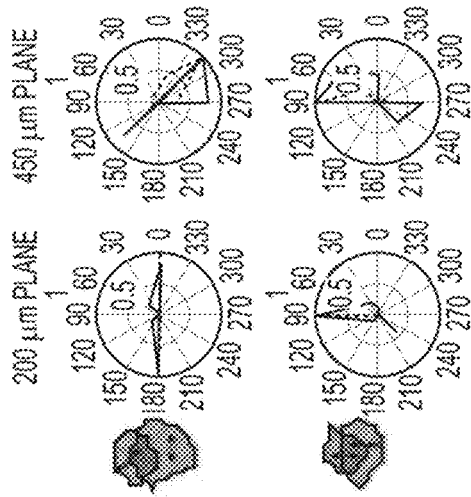
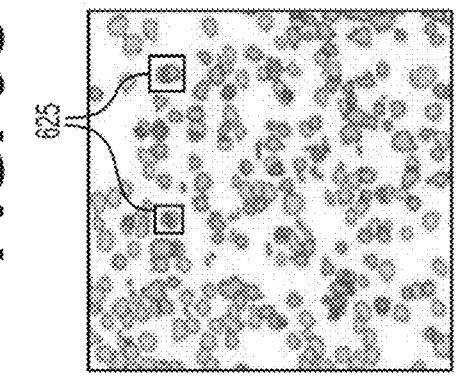
FIG. 6C
FIG. 6D1
FIG. 6D2
FIG. 6E

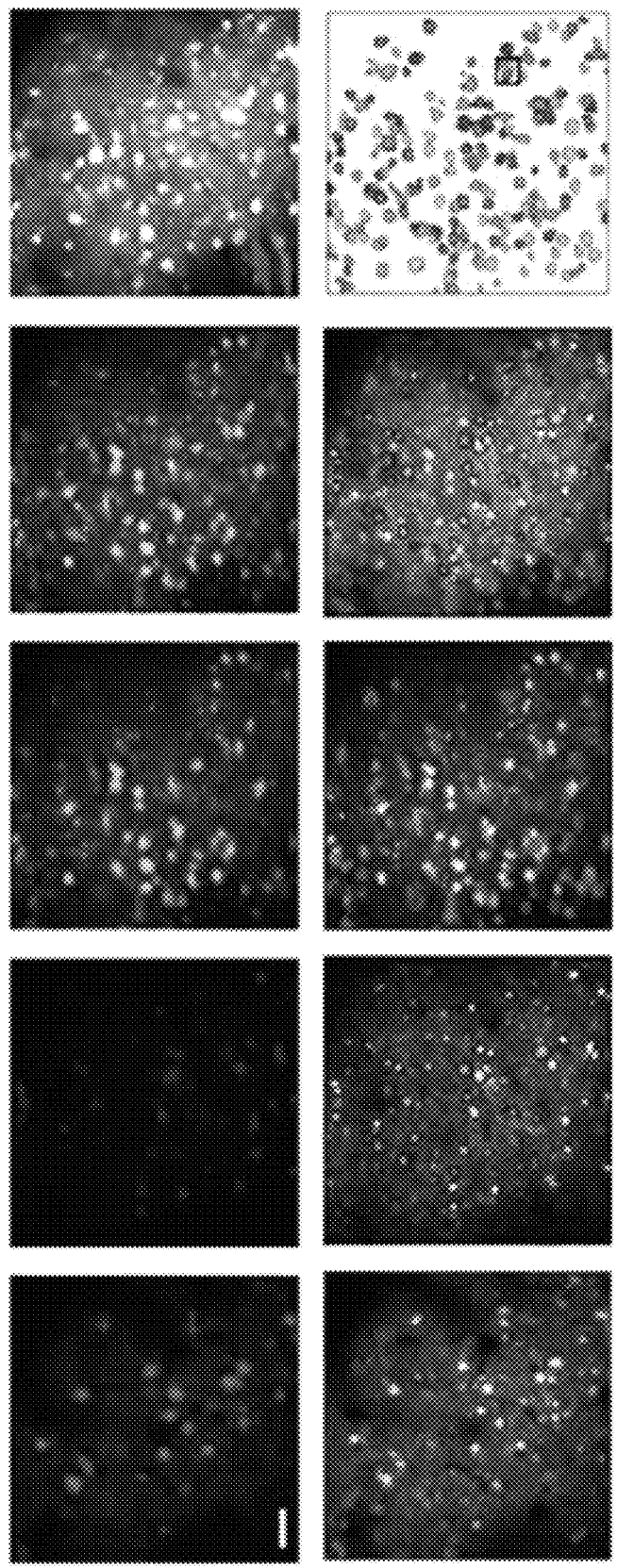

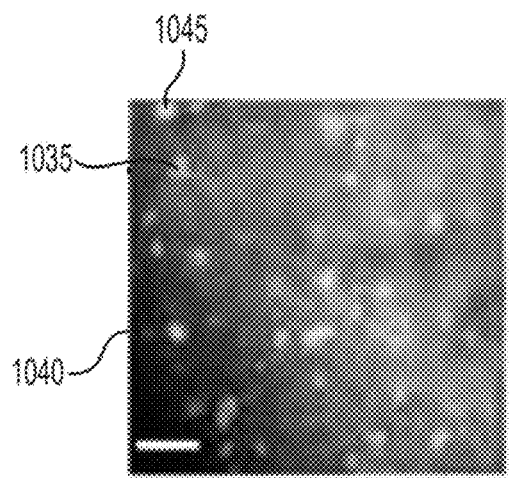
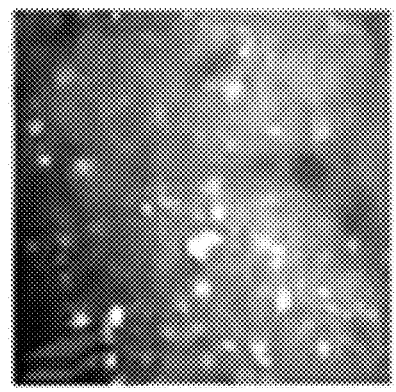
FIG. 10J    FIG. 10K
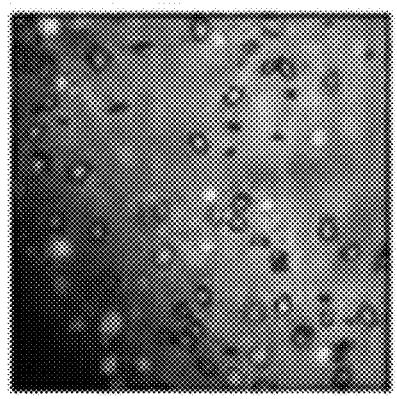
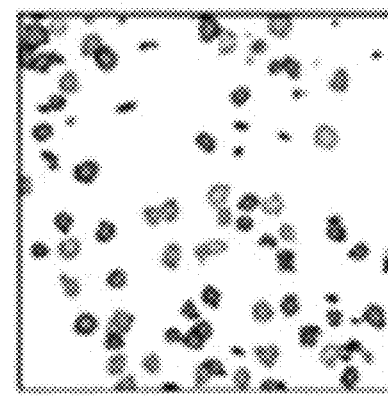
FIG. 10L    FIG. 10M

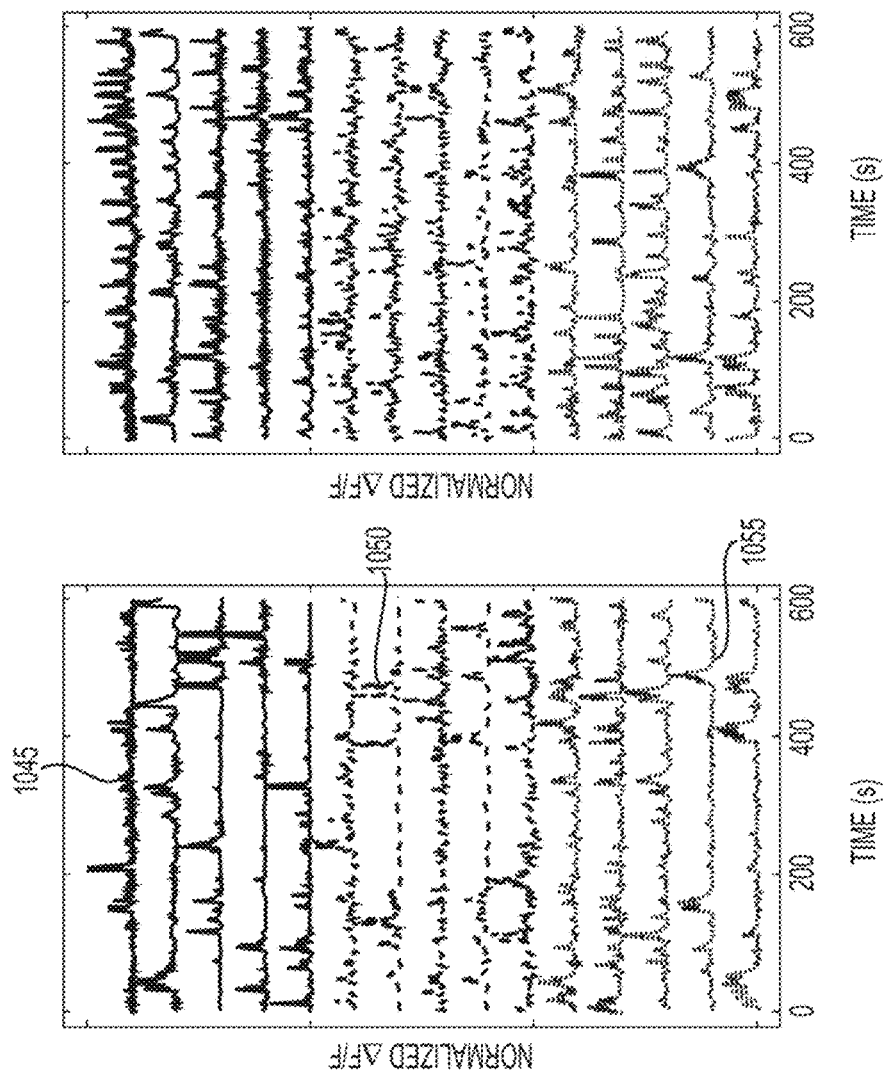
FIG. 10O
FIG. 10N
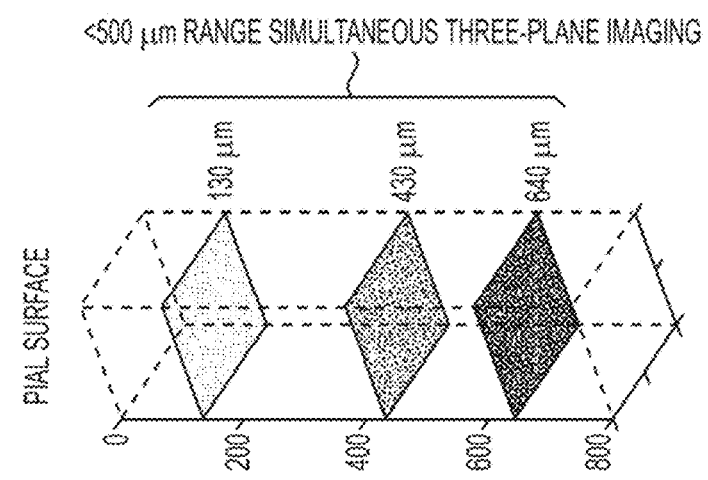
FIG. 10I

SYSTEM, METHOD AND COMPUTER-ACCESSIBLE MEDIUM FOR MULTI-PLANE IMAGING OF NEURAL CIRCUITS

CROSS-REFERENCE TO RELATED APPLICATION(S)

This application relates to, and claims the benefit and priority from International Patent Application No. PCT/US2016/040753 filed on Jul. 1, 2016 that published as International Patent Publication No. WO 2017/004555 on Jan. 2, 2017, which claims the benefit and priority from, U.S. Provisional Patent Application No. 62/187,595, filed on Jul. 1, 2015, the entire disclosures of which are incorporated herein by reference.

FIELD OF THE DISCLOSURE

The present disclosure relates generally to multi-plane imaging, and more specifically, to exemplary embodiments of an exemplary system, method and computer-accessible medium for, e.g., simultaneous multi-plane imaging of neural circuits.

BACKGROUND INFORMATION

A coherent activity of individual neurons, firing in precise spatiotemporal patterns, can likely be the underlying basis of thought and action in the brain. Optical imaging methods aim to capture this activity, with recent progress now facilitating the functional imaging of nearly the entire brain of an intact transparent organism, the zebra fish, with cellular resolution. (See, e.g., Reference 1). In scattering tissue, where nonlinear microscopy can be beneficial (see, e.g., References 23, 63, and 69), progress toward imaging large pools of neurons has been slower. But in nearly all existing two-photon microscopes, a single beam can be serially scanned in a continuous trajectory across the sample with galvanometric mirrors, in a raster patterns or with a specified trajectory that intersects targets of interest along the path. This means that the imaging can be serial and thus slow.

Since the inception of two-photon microscopy, there have been large efforts to increase the speed and extent of imaging. Parallelized multifocal approaches have been developed (see, e.g., References 8 and 56), as well as inertia-free scanning using acousto-optic deflectors ("AODs") (see, e.g., References 23, 31, and 50), or scanless approaches utilizing spatial light modulators ("SLMs") (see, e.g., References 16, 41 and 48), each with its own strengths and weaknesses. Despite the tremendous improvements in imaging modalities, the "view" can still be limited, whether by the fundamental technology, the expense or the complexity. A difficulty in imaging can be linked to expanding the volumetric extent of imaging, while maintaining high temporal resolution and high sensitivity. (See, e.g., References 2 and 3). This can generally be linked to the inverse relationship between volume scanned, and the signal collected per voxel, at a fixed resolution.

Thus, it may be beneficial to provide an exemplary system, method and computer-accessible medium which can overcome at least some of the deficiencies described herein above.

SUMMARY OF EXEMPLARY EMBODIMENTS

To that end, in order to overcome some of the deficiencies presented herein above, an exemplary device can be provided which can include, for example, a radiation source(s) configured to generate a first radiation(s), a spatial light modulator (SLM) arrangement(s) configured to receive the first radiation(s) and generate a second radiation(s) based on the first radiation(s), and a galvanometer(s) configured to receive the second radiation(s), generate a third radiation(s) based on the second radiation(s), and provide the third radiation(s) to a sample(s).

In some exemplary embodiments of the present disclosure, the SLM arrangement(s) can include, for example, a SLM and a pre-SLM afocal telescope configured to resize the first radiation(s) to match an area of the SLM. According to particular exemplary embodiments of the present disclosure, the SLM arrangement(s) can further include a plurality of folding mirrors configured to redirect the first radiation(s) to the pre-SLM, and a post SLM afocal telescope configured to resize the second radiation(s) to match a size of an acceptance aperture of the galvanometer(s). The SLM arrangement(s) can also further include a broadband waveplate(s) located between the pre-SLM afocal telescope and the SLM. The broadband waveplate(s) can be configured to rotate a polarization of the first radiation(s) to cause the radiation(s) to be parallel with an active axis of the SLM.

In certain exemplary embodiments of the present disclosure, the SLM arrangement(s) can be configured to split the first radiation(s) into the radiation beamlets which are the second radiation(s). The SLM arrangement(s) can be further configured to independently dynamically control each of the radiation beamlets. The SLM arrangement(s) can split the first radiation(s) into the radiation beamlets by imprinting a phase profile across the first radiation(s). The galvanometer(s) can be further configured to direct each of the radiation beamlets to a different area of the sample(s). The galvanometer(s) can direct each of the radiation beamlets to a different plane of the sample(s). The radiation source(s) can be a laser source(s).

In some exemplary embodiments of the present disclosure, a computer processing arrangement can be configured to generate an image(s of the sample(s) based on a plurality of resultant radiations received from the sample(s) that can be based on the radiation beamlets. A first number of the resultant radiations can be based on a second number of the radiation beamlets. The second number of the radiation beamlets can be based on a third number of the planes of the sample(s). The computer processing arrangement can be further configured to generate a third number of images of the sample(s) based on the resultant radiations.

In certain exemplary embodiments of the present disclosure, the image(s) can include a plurality of images. The computer processing arrangement can be further configured to generate a multiplane image(s) based on the images. The multiplane image(s) can be generated by interleaving the images into the multiplane image(s). The computer processing arrangement can be further configured to correct brain motion artifacts in the images based on a pyramid procedure.

According to some exemplary embodiments of the present disclosure, a pocket cell(s) can be located between the radiation source(s) and the SLM arrangement(s), which can be configured to modulate an intensity of the first radiation(s). A computer processing arrangement can be provided, which can be configured to generate an image(s) of the sample(s) based on a fourth radiation(s) received from the sample(s) that can be based on the third radiation(s).

According to a further exemplary embodiment of the present disclosure, an exemplary method can include, for example, generating a radiation(s), providing the radiation(s) to a spatial light modulator (SLM) arrangement(s), splitting the radiation(s) into a plurality of radiation beamlets using the SLM arrangement(s), and directing the radiation beamlets to a sample(s) using a galvanometer(s). A computer hardware arrangement can be used to generate an image(s) of the sample(s) based on a resultant radiation received from the sample(s) that can be based on the radiation beamlets.

In some exemplary embodiments of the present disclosure, the radiation(s) can be generated using a laser(s). Each of the radiation beamlets can be independently dynamically controlled using the SLM arrangement(s). The SLM arrangement(s) can split the radiation(s) into the plurality of radiation beamlets by imprinting a phase profile across the radiation(s). The SLM arrangement(s) can include a SLM(s). Each of the radiation beamlets can be directed to a different area of the sample(s). Each of the radiation beamlets can be swept across the respective different area of the sample(s) using the galvanometer(s).

In certain exemplary embodiments of the present disclosure, each of the radiation beamlets can be directed to a different plane of the sample(s). A plurality of resultant radiations can be received from the sample(s) that can be based on the radiation beamlets. A first number of the resultant radiations can be based on a second number of the radiation beamlets. The second number of the radiation beamlets can be based on a third number of the planes of the sample(s). A third number of images of the sample(s) can be generated based on the resultant radiations. A plurality of images can be generated based on the resultant radiations.

In some exemplary embodiments of the present disclosure, a multiplane image(s) can be generated based on the images. The multiplane images can be generated by interleaving the images into the multiplane image(s). Brain motion artifacts can be corrected in the images based on a pyramid procedure.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 1D is a set of exemplary images of two-photon structural imaging of a shrimp (e.g., artemia nauplii) at different depths of the sample according to an exemplary embodiment of the present disclosure;

FIG. 1E is a set of exemplary images of software based SLM focusing of the same shrimp as in FIG. 1D according to an exemplary embodiment of the present disclosure;

FIG. 1F is an exemplary image of the sum of all the images at the seven planes shown in FIG. 1D according to an exemplary embodiment of the present disclosure;

FIG. 1G is an exemplary image of the sum of all the images at the seven planes shown in FIG. 1E according to an exemplary embodiment of the present disclosure;

FIG. 1H is an exemplary image of seven-axial-plane imaging of the same shrimp as in FIGS. 1D-1G according to an exemplary embodiment of the present disclosure;

FIG. 1I is an exemplary image of seven-axial-plane imaging using the SLM to increase the illumination intensity only for the 50 μm plane according to an exemplary embodiment of the present disclosure;

FIG. 2F is an exemplary signal diagram of the extracted ΔF/F traces of the selected ROIs from the two field of views according to an exemplary embodiment of the present disclosure;

FIG. 2G is an exemplary signal diagram of extracted ΔF/F traces of the same ROIs shown in FIG. 2F from the simultaneous dual plane recording according to an exemplary embodiment of the present disclosure;

FIGS. 3A and 3B are exemplary images of the temporal standard deviation image of the sequential single plane recording of mouse V1 at a depth of about 170 μm (e.g., layer 2/3) and depth of about 500 μm (e.g., layer 5) from the cortical surface according to an exemplary embodiment of the present disclosure;

FIG. 3C is an exemplary image using the exemplary system according to an exemplary embodiment of the present disclosure;

FIG. 3D is an exemplary image of the temporal standard deviation image of the simultaneous dual plane recording of the two planes shown in FIGS. 3A and 3B according to an exemplary embodiment of the present disclosure;

FIGS. 3G-3I are zoomed views of the exemplary signal diagrams of ΔF/F traces in the shaded area in FIGS. 3E and 3F according to an exemplary embodiment of the present disclosure;

FIG. 5C is an exemplary signal diagram of a pair of ROIs that show relatively high correlation (e.g., R=0.1709) according to an exemplary embodiment of the present disclosure;

FIG. 5D is an exemplary chart illustrating the activity correlation coefficient extracted from FIG. 5B versus the lateral distance of the corresponding pairs of ROIs according to an exemplary embodiment of the present disclosure;

FIG. 6C is an exemplary diagram and an exemplary chart illustrating the response of the ROIs to the drifting grating in visual stimulation for ROIs located at 450 μm depth from cortical surface according to an exemplary embodiment of the present disclosure;

FIG. 6D1 is an overlaid temporal standard deviation image of the sequential single plane recording of the 200 μm plane and 450 μm plane according to an exemplary embodiment of the present disclosure;

FIG. 6D2 is an exemplary image of extracted ROI contours from the two planes with a Scale bar of 50 μm according to an exemplary embodiment of the present disclosure;

FIG. 6E is an exemplary diagram of the evoked responses of the ROIs with spatial lateral overlaps from the two planes according to an exemplary embodiment of the present disclosure;

FIGS. 10A-10H are exemplary images and signal charts of three plane imaging, on mouse V1 at depth of 170 μm, 350 μm and 500 μm from pial surface according to an exemplary embodiment of the present disclosure;

FIGS. 10I-10O are exemplary images and signal charts of three plane imaging, on V1 at depth of 130 μm, 430 μm and 640 μm from pial surface, extending a simultaneous imaging depth over 500 μm according to an exemplary embodiment of the present disclosure;

Figure 1A:
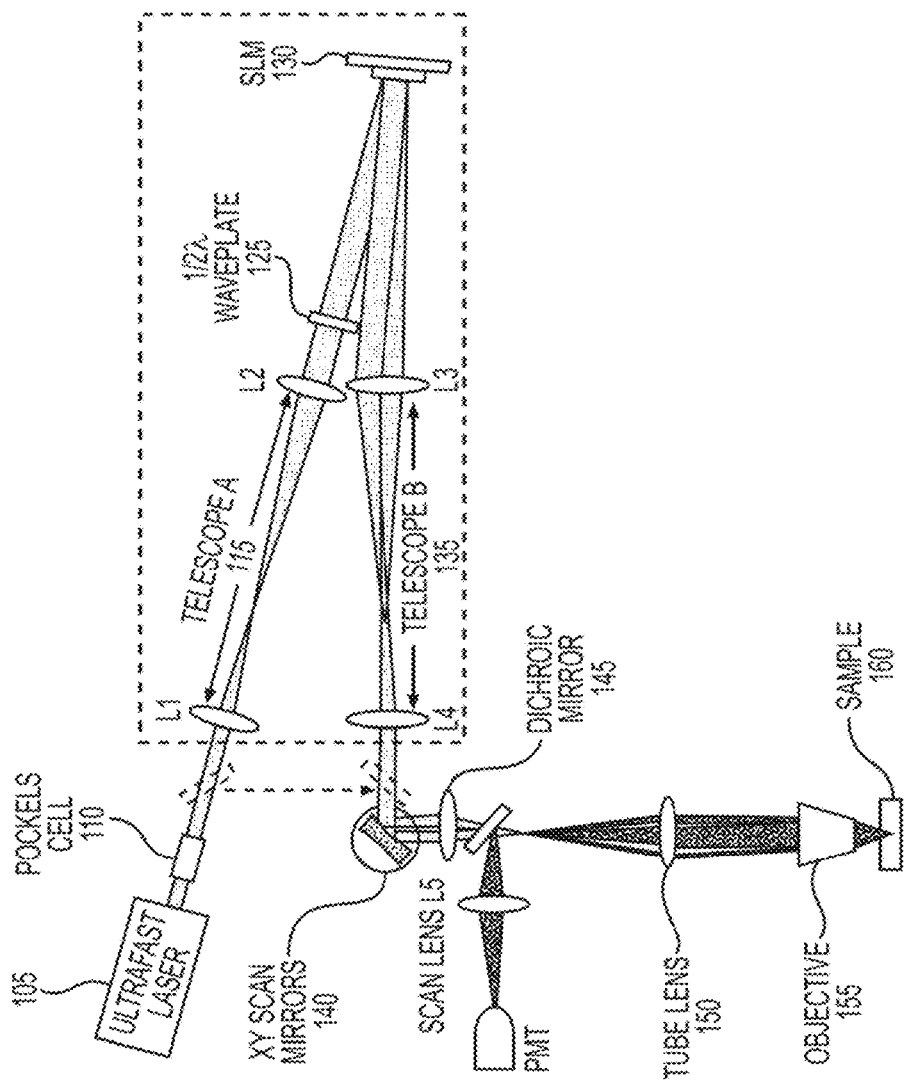
FIG. 1A is an exemplary diagram of an exemplary SLM Two-photon Microscope according to an exemplary embodiment of the present disclosure.

Throughout the drawings, the same Reference numerals and characters, unless otherwise stated, are used to denote like features, elements, components or portions of the illustrated embodiments. Moreover, while the present disclosure will now be described in detail with Reference to the figures, it is done so in connection with the illustrative embodiments and is not limited by the particular embodiments illustrated in the figures and the appended claims.

DETAILED DESCRIPTION OF EXEMPLARY EMBODIMENTS

Exemplary Results

An exemplary embodiment of the present disclosure can include, for example an exemplary SLM microscope coupled with a two-photon microscope, galvanometers and an SLM module. FIG. 1A shows a schematic diagram of the multi-plane imaging and the exemplary SLM two-photon microscope apparatus. The exemplary SLM module can include diverting the input path of the microscope, prior to the galvanometer mirrors 140, using retractable kinematic mirrors, onto a compact optical breadboard with the SLM 130 and associated exemplary components. Exemplary features of the SLM module can include folding mirrors for redirection, a pre-SLM afocal telescope 115 to resize the incoming beam to match the active area of the SLM, the SLM 130 and a post-SLM afocal telescope 135 to resize the beam again to match the acceptance aperture of the galvanometers 140, and to fill the back focal plane of the objective 155 appropriately.

Figure 1B:
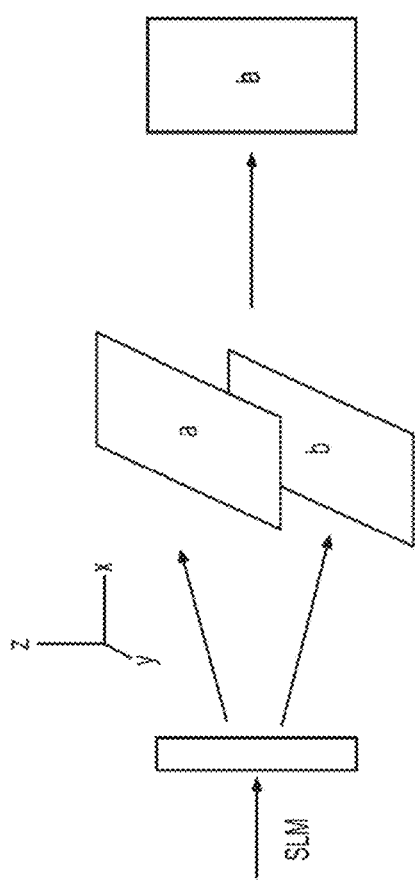
FIGS. 1B and 1C are exemplary diagrams of axial and lateral dual plane imaging according to an exemplary embodiment of the present disclosure.
Figure 1C:
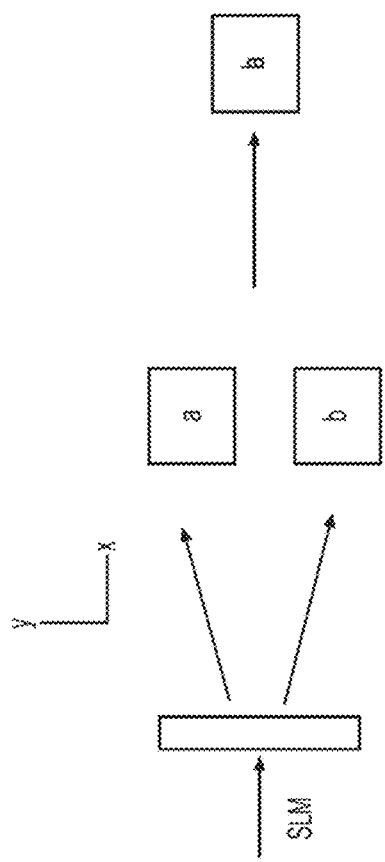

The exemplary SLM 130, post-SLM telescope 135 and galvanometers 140 can be spaced such that the SLM 130 can be conjugate to the galvanometers 140, and the microscope scan lens 145, and tube lens 150, can reimage this again to the back aperture of the microscope objective. This module can be coupled to 2P microscopes, and to Prairie/Bruker systems, with equal success, and similar performance. The SLM 130 can be used as a flexible, programmable beam splitter that can facilitate independent dynamic control of each generated beamlet, at high speed. The exemplary SLM 130 can perform this flexible beamsplitting by imprinting a phase profile across the incoming wavefront, resulting in a far field diffraction pattern yielding the desired illumination pattern. These multiple independent beamlets can be directed to different regions, and depths, on the sample 160, simultaneously. When the galvanometers are scanned, each individual beamlet can sweep across its targeted area on the sample 160, generating a fluorescence that can be collected by a single pixel detector (e.g., photomultiplier tube). As multiple regions of the sample can be illuminated simultaneously, the resultant "image" can be a superposition of all of the individual images that would have been produced by scanning each separate beamlet individually (See, e.g., FIGS. 1B and 1C).

To demonstrate the exemplary multiplane imaging system, a structural imaging of a brine shrimp, *Artemia naupili*, was performed, collecting its intrinsic autofluorescence. A traditional serial "z-stack", with seven planes, was acquired by moving the objective 50 µm axially between each plane (See, e.g., FIG. 1D). Next, a serial z-stack was acquired with seven planes with 50 µm separation, but with the objective fixed and the axial displacements generated by imparting a lens phase function on the SLM. (See, e.g., FIG. 1E). FIGS. 1F and 1G, show the arithmetic sums of all of the images in FIGS. 1D and 1E, respectively. The exemplary SLM can be used to generate all seven axially displaced beamlets simultaneously, and can scan them across the sample. (See, e.g., FIG. 1H). In some exemplary embodiments of the present disclosure, a Bessel or an Airy beam can be used to directly provide an extended depth of field. (See, e.g., References 19 and 59). While these beams can give a similar result about for the shrimp, or similarly transparent samples, they can provide near uniform intensity across the entire depth of field, while the exemplary approach can facilitate independent power adjustment of each depth. This is shown in FIG. 1I where the power directed to a single plane (e.g., 50 µm) is selectively increased, and the signal, only for features at that depth, is increased. This flexibility can be beneficial for inhomogeneously stained samples, and for multi-depth in-vivo imaging in scattering tissue, as is illustrated below, and may only be possible with independently configurable beamlets. Additionally, by illuminating only a select number of planes, the "density" of the resulting images can be controlled; for example, how many sections used to contribute to the final image can be controlled.

Figures 2A, 2B, 2C, 2D, 2E:
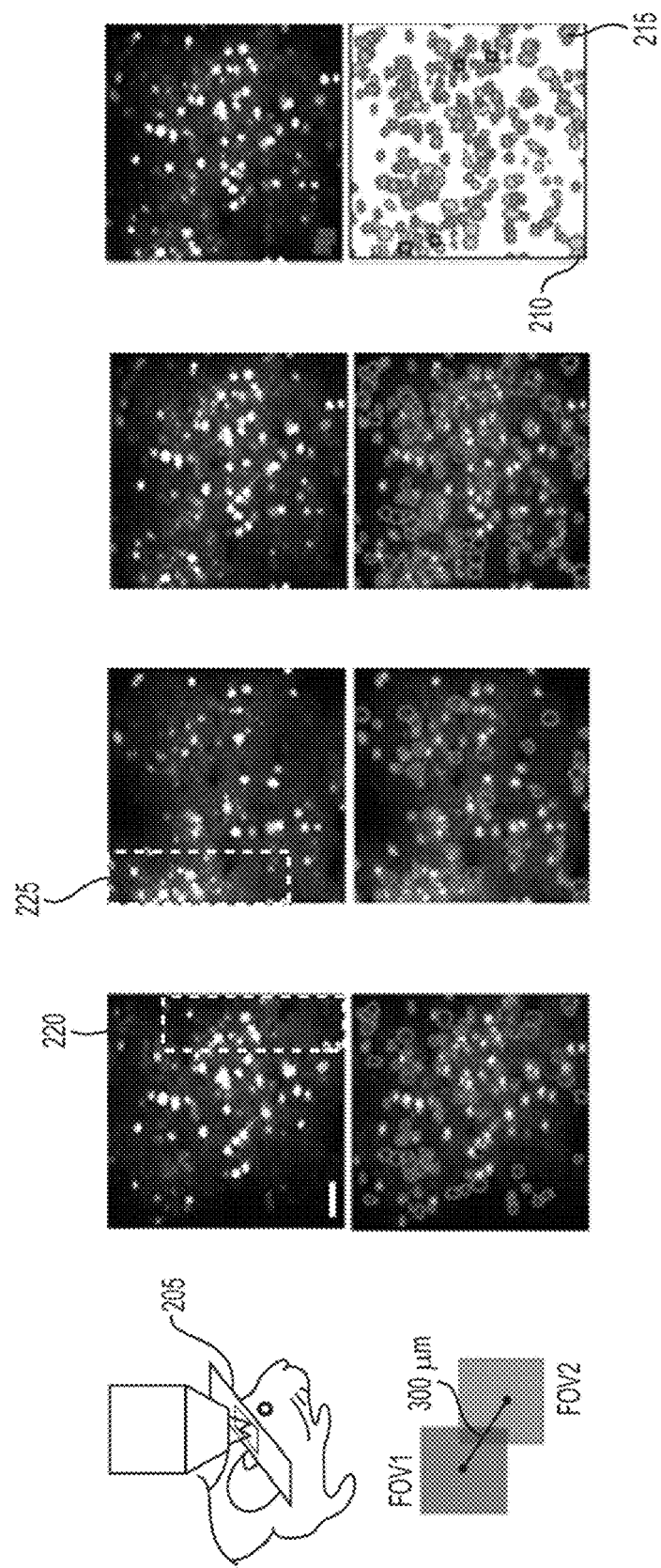
FIG. 2A is an exemplary diagram of the exemplary in-vivo experiment imaging the V1 of the mouse according to an exemplary embodiment of the present disclosure.
FIGS. 2B and 2C are exemplary images of the temporal standard deviation image of the sequential single plane recording of mouse V1 at a depth of about 280 μm from the pial surface according to an exemplary embodiment of the present disclosure.
FIG. 2D is an exemplary image of some of the illustrations from FIGS. 2B and 2C according to an exemplary embodiment of the present disclosure.
FIG. 2E is an exemplary image of the temporal standard deviation image of the simultaneous dual plane recording of the two fields of view according to an exemplary embodiment of the present disclosure.
Figure 2H:
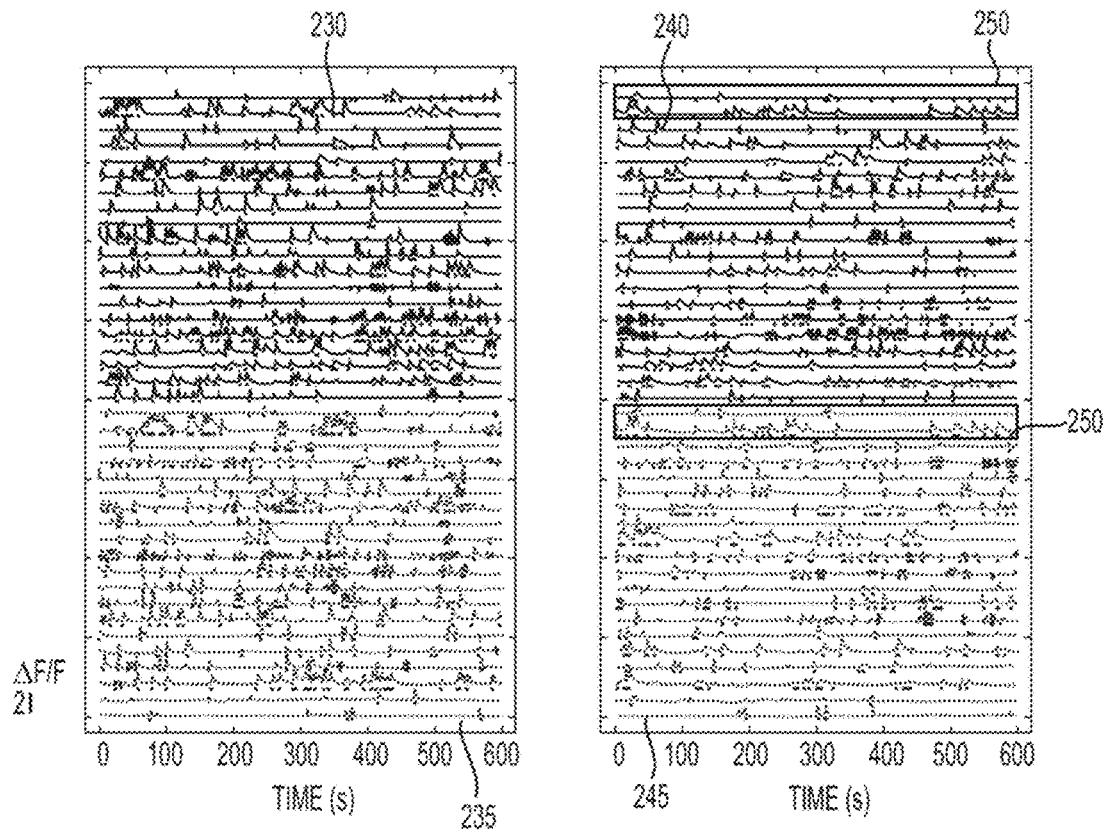
FIG. 2H is an exemplary signal diagram of a zoomed in view of the normalized ΔF/F traces in the shaded area in FIG. 2G according to an exemplary embodiment of the present disclosure.

As shown in FIGS. 2A-2H, the functional imaging application of the exemplary system 205 is shown. In-vivo two-photon imaging of layer 2/3 (e.g., L2/3) in the primary visual cortex (e.g., V1), at a depth of 280 µm, at 10 Hz, was performed in an awake head-fixed mouse that expresses the genetically encoded calcium indicator, GCaMP6f (See, e.g., Reference 14). The exemplary SLM can be configured similar to that illustrated in FIG. 1C, to expand the effective sampled area. To increase the imaged area, the beam can be laterally split, creating two beams of equal power with an on-sample separation of ~300 µm centered on the original field of view ("FOV"). (See, e.g., FIG. 2A). FIGS. 2B-2D, show images of the standard deviation ("std. dev.") of intensity across the acquired time-series image sequences that result from scanning each of these displaced beams individually, and their arithmetic sum, respectively, while FIG. 2E shows the std. dev. image acquired when both beams can be simultaneously scanned across the sample. The lower subpanels show detected source ROIs from the images, with the element 210 and 215 reflecting the originating source FOV. The areas contained in the rectangles 220 and 225 in FIGS. 2B and 2C, respectively, highlight the area that can be contained in the FOV of both beamlets, and thus their ROIs can be present twice in the dual plane image.

FIGS. 2F and 2G show representative extracted fluorescence time series data from the detected ROIs (e.g., 40 out of 235 shown). The same ROIs are displayed in both FIGS. 2F and 2G, with the same ordering, to facilitate direct comparison of the single and dual plane traces. In FIG. 2F, the FOVs were collected sequentially—that can be one at a time, and thus the traces 230 were collected at a different absolute time than the traces 235. Traces 240 and 245 traces shown in FIG. 2F, however, were collected simultaneously. Because of the relative spatial sparsity of active neurons (see, e.g., FIG. 2E, bottom), many of the ROIs can be separable even in the overlaid dual region image, and fluorescence time series data can be easily extracted using exemplary procedures. However, some ROIs show clear overlap, and more sophisticated procedures, such as independent component analysis ("ICA") (see, e.g., Reference 39), or a structured matrix factorization method ("CNMF"), can perform better at extracting the activity. The traces shown were extracted using an exemplary CNMF method, which will be highlighted and discussed in greater detail below. (See, e.g., FIG. 4). (See, e.g., Reference 46). In examining the traces in more detail, the overall effective SNR can be high, in both the sequentially acquired data and in the simultaneously collected dual region data, which can facilitate events to be easily detected by exemplary automated procedures. Because the collected multi-region image can be the arithmetic sum of the two single region images, the detected ROIs from the single region image can be used as strong prior knowledge for source localization. This can be leveraged to produce very good initial estimates on the likely number of independent sources, and their spatial location. This prior knowledge can be extremely useful for unmixing complex overlapping signals, and can increase the overall performance of the source extraction in the mixed images. The "uniqueness" of signal recovery can be examined by looking at the ROIs that appear twice in the dual plane image, and can display identical dynamics. Two exemplars are highlighted (e.g., element 250) shown in FIG. 2G, and expanded in FIG. 2H; traces 255 and 260 show the source copy generated from each beamlet, and the extremely high correlation between the extracted traces (e.g., R>0.985). These duplicative sources can be easily removed from the total independent ROI count; first, because the positioning of the FOVs can be deterministically controlled, and a priori known, which regions can be the shared, and where the components will appear in the image can be determined. It can be noted that even without such knowledge, such source ROIs can be identified by their extremely high cross-correlation.

Compared to the original FOV, the dual region image can include signals from a significantly larger total area. The single region FOV was approximate exemplary 380 µm×380 µm, and captured $1.45 \times 10^5$ µm$^2$, while the dual region image captured signals from $2.66 \times 105$ µm$^2$ (e.g., twice the FOV, minus the overlapped region), representing an about 84% increase in interrogated area, with no loss in temporal resolution. With the exemplary system, the exemplary maximal useful lateral displacement of each beamlet from the center of the FOV approximately 150 um. (See, e.g., FIGS. 7C and 7D). Because the SLM can be flexible in its ability to address arbitrary subregions of the FOV, alternate SLM approaches can be performed. For example, the effective frame rate of a system can be doubled by creating two laterally displaced beams, with an angular spread one half of the FOV, in the direction orthogonal to the fast axis of the galvos. By scanning the galvos over the middle 50% of the image, the displaced beams can still illuminate the entire FOV, though the total number of lines scanned can be halved, which can double the overall frame rate. Alternately, two or more small subregions enclosed within a single larger FOV can be scanned simultaneously. Under all of these paradigms, it can be noted that the splitting can facilitate increases in effective frame rate while keeping the dwell time per pixel of each region higher than what would be possible if the regions were sequentially scanned, which can increase the overall signal collected from each region.

Figure 3E:
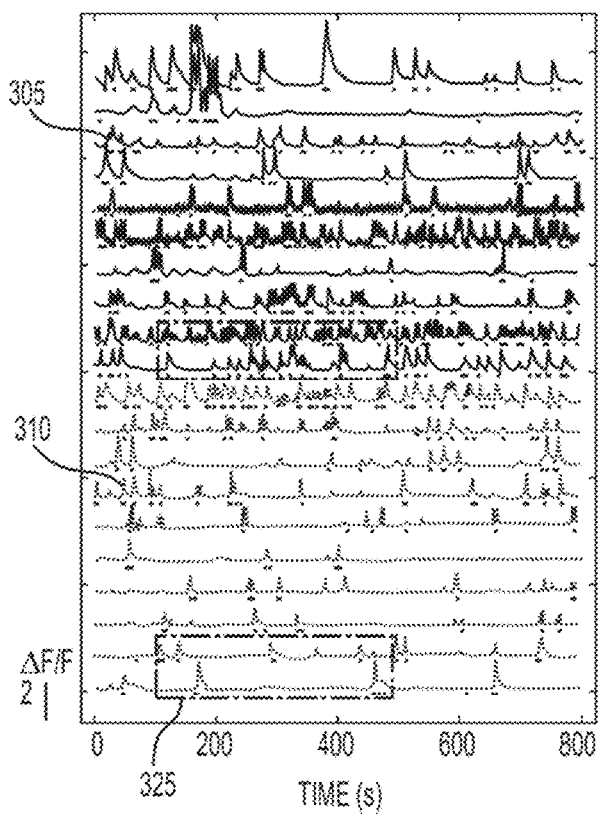
FIG. 3E is an exemplary signal diagram of the extracted ΔF/F traces of 20 ROIs out of 350 from the two planes from the sequential single plane recording according to an exemplary embodiment of the present disclosure.
Figure 7B:
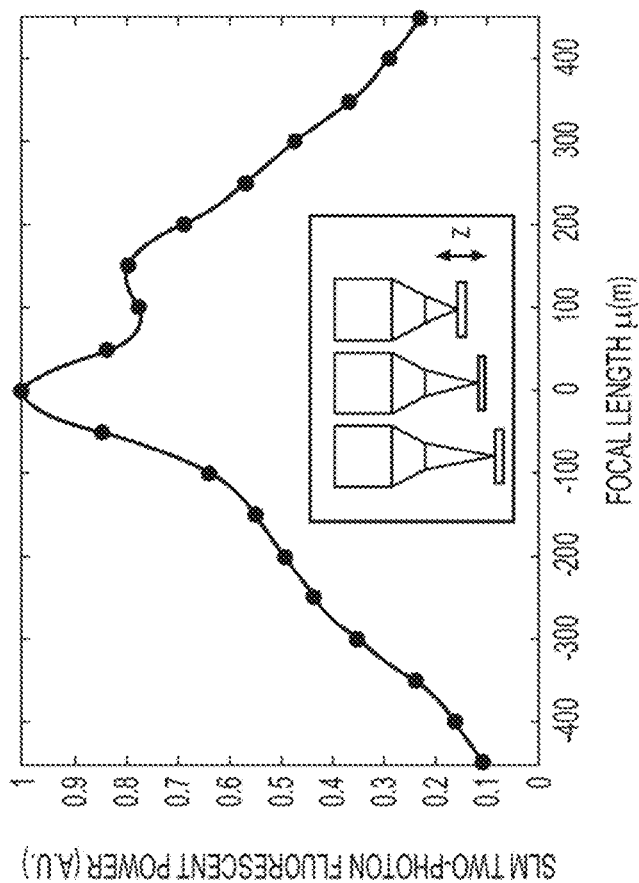
FIG. 7B is an exemplary graph illustrating SLM two-photon fluorescence efficiency with different defocusing length, measured from the fluorescence emitted from Rhodamine 6G with two-photon excitation according to an exemplary embodiment of the present disclosure.

While the lateral imaging procedures can increase imaging performance, the full power of multiplexed SLM imaging lies in its ability to flexibly address axially displaced planes, with independent control of beamlet power and position. An exemplary defocus aberration can be introduced to the wavefront, which can shift the beam focus away from the nominal focal plane. Higher order axially dependent phase terms can be included to offset the effects of higher-order aberrations, and facilitate "prism" shifts as well, which can add flexibly by facilitating for lateral displacements. The exemplary system can provide high performance, and gives approximately 500 µm of axial displacement while maintaining total collected two-photon fluorescence at greater than 50% of that generated at the objective's natural focal plane. (See, e.g., FIG. 7B). This can provide a considerable range for scanning, and it does so with high speed inertia-free focusing (e.g., less than 3 ms, as shown in FIG. 11). Because the objective may not be moving, there may be no acoustic noise, and there can be no vibrations transferred to the objective or sample, both of which can perturb animal preparations, or for strong vibrations, even damage the objective. Using the exemplary SLM, multiple axial planes can be addressed simultaneously—multiple lens phase functions can be combined, and imprinted onto the incoming beam by the SLM. FIGS. 3A and 3B show two examples of conventional "single-plane" two-photon images in mouse V1, the first approximately 170 µm below the pial surface, in L2/3, and the second 500 µm below the surface, in L5. These images were acquired with SLM focusing; the objective's focal plane was fixed at a depth of 380 µm, and the axial displacements were generated by imposing the appropriate lens phase on the SLM. At each depth, functional signals at 10 Hz were recorded. FIG. 3E shows some representative extracted fluorescence traces from L2/3 (e.g., element 305), and L5 (e.g., element 310) (e.g., 154 and 196 total ROIs detected across the upper and lower planes, respectively).

The exemplary SLM was then used to simultaneously split the incoming beam into two axially displaced beams, directed to cortical depths of 170 µm and 500 µm, and scanned over the sample at 10 Hz. (See, e.g., FIG. 3D). Because the mouse cortex can be highly scattering (see, e.g., References 17 and 33), significantly more power can be needed to image L5 than L2/3, and the power directed to each plane can be adjusted such that the collected fluorescence from each plane was approximately equal. The effective collected two photon signal can also depend on the overall efficiency of the SLM in redirecting the light to axial positions other than the designed focal plane of the microscope. Multiple factors can contribute to this, from optical parameters of the two-photon microscope, such as the bandwidth of the laser source and the effective numerical aperture ("NA") of excitation, along with the objective magnification, to SLM specific device parameters such as the number distinct phase levels, the pixels density, and the fill factor of the device. In designing the exemplary system, it can be beneficial to holographically deflect light over a span of approximately 500 µm axially, while also maintaining clear subcellular resolution and high two-photon efficiency.

The exemplary measured efficiency curve can be slightly asymmetric (see, e.g., FIG. 7B), and shows that the beam can be projected from 200 µm beyond (e.g., deeper) the focal plane of the objective, to 300 µm above (e.g., shallower) than the objective's focal plane while maintaining strong two-photon excitation. This curve can be relied upon as the objective's focal plane depth to a specific position, and can be set to optimally deliver power to the chosen targeted planes for simultaneous imaging, or to compute the power used for a good signal at various multiplane combinations. For the particular pair of planes acquired, as shown in FIGS. 3A and 3B, scattering alone can dictate that the L5 plane can utilize approximately six times the input power than that of the L2/3 image to match the signals. With the microscope's natural focal plane set to 380 µm, the SLM efficiency for redirection can be the same for both planes, and the dual beam hologram can be computed with an approximately six-fold increase in intensity for the lower layer.

Figure 3F:
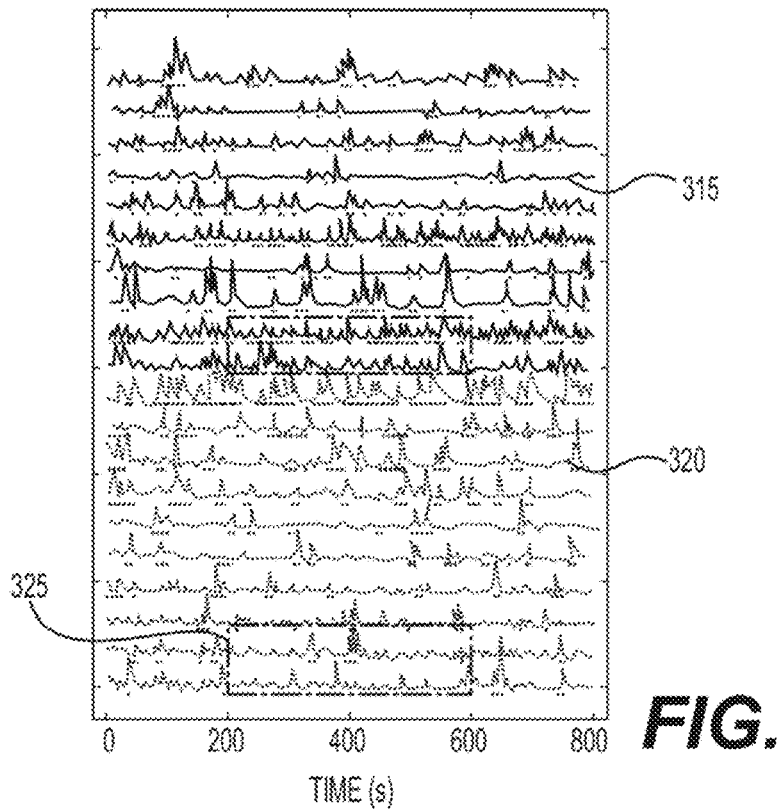
FIG. 3F is an exemplary signal diagram of extracted ΔF/F traces of the same ROIs shown in FIG. 3E from the simultaneous dual plane recording according to an exemplary embodiment of the present disclosure.
Figure 3I:
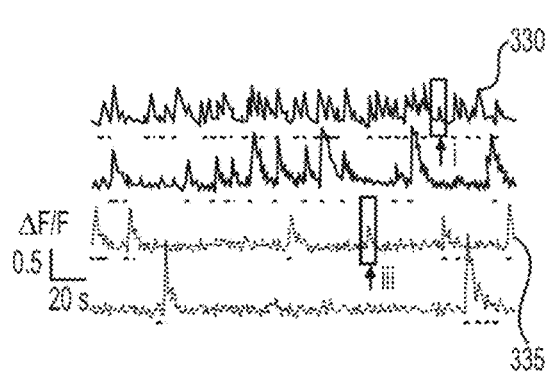
Figure 3I:
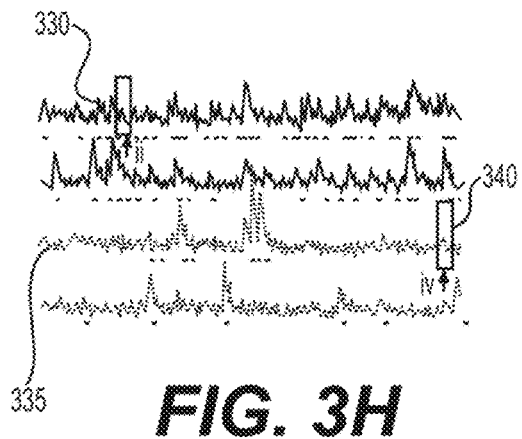
Figure 3I:

Scanning these beamlets over the sample, the dual plane image can be collected, which is shown, along with the ROIs, in FIG. 3D, which can correspond very well to the arithmetic sum of the individual plane images. In FIG. 3F, thirty representative traces (e.g., out of 350 source ROIs) are shown, which illustrate spontaneous activity across L2/3 (e.g., element 315) and L5 (e.g., element 320), with a high SNR. The ordering of traces is identical with that of FIG. 3E, which facilitates comparison of the signals detected with the conventionally acquired single plane images. The lightly shaded regions 325 in FIGS. 3E and 3F are enlarged and shown in FIGS. 3G and 3H. The traces 330 and 335 can be the signals extracted from the ROI using the CNMF method, which both optimally weights individual pixels and denoises the signal, while the underlying trace 340 shows the raw signal from the ROI. The raw signals show very clear events, with high SNR, and the CNMF traces can be even cleaner. Further exemplary zooms of small events are shown in FIG. 3I, which shows expanded views of the small peaks labeled i-iv on FIGS. 3G and 3H.

With a cursory examination of the ROIs in the dual plane image, it can be clear that there can be significant overlap between a number of sources, as expected by collecting fluorescence from both areas with a single pixel detector ("PMT"), without specific efforts to avoid such conditions. There have been many hardware strategies implemented to avoid such "cross-talk", from temporal multiplexing (see, e.g., Reference 15), to multiple array detectors (see, e.g., Reference 32), but these can be relatively complex, and while they can reduce, they never completely eliminate signal mixing. A software based approach can be utilized (See, e.g., Reference 46).

A generalized biophysical model can be used to relate the detected fluorescence from a source (e.g., neuron) to the underlying activity (e.g., spiking) (See, e.g., References 61 and 62). This can be extended to where the detected signal (e.g., fluorescence plus noise) in each single pixel can come from multiple underlying sources, which can produce a spatiotemporal mixing of signals in that pixel. The exemplary goal then can be, given a set of pixels of time varying intensity, infer the low-rank matrix of underlying independent signal sources that generated the measured signals. The non-negativity of fluorescence and of the underlying neuronal activity can be taken advantage of, and the computationally efficient constrained non-negative matrix factorization methods can be used to perform the source separation; thus the label of CNMF.

Figure 4A:
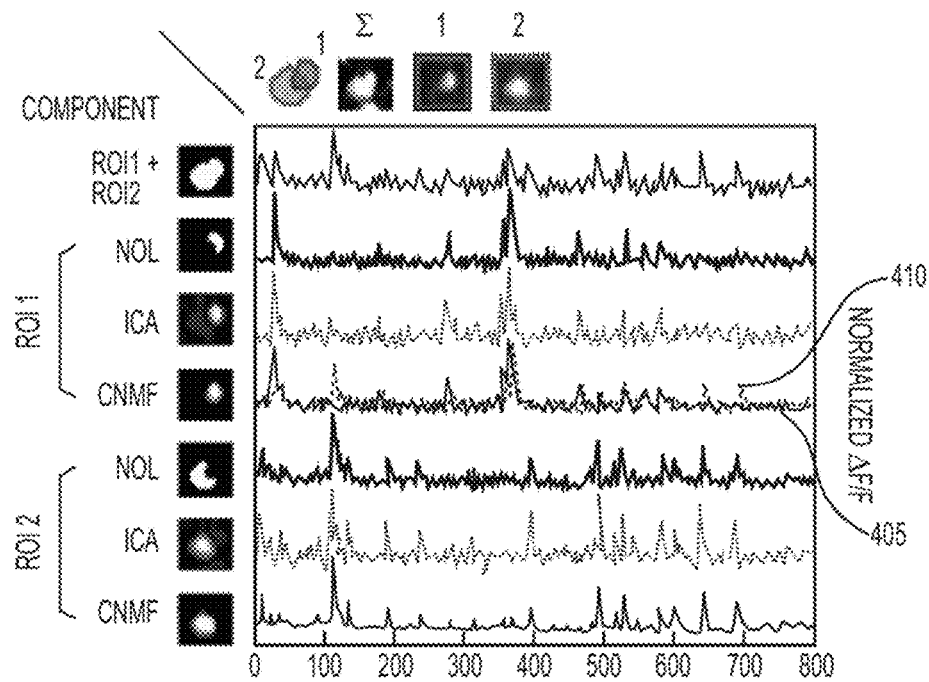
FIGS. 4A-4C are exemplary signal diagrams of the source separation of the fluorescent signal from spatially overlapped ROIs in the dual plane imaging shown in FIGS. 3A-3I according to an exemplary embodiment of the present disclosure.
Figure 4B:
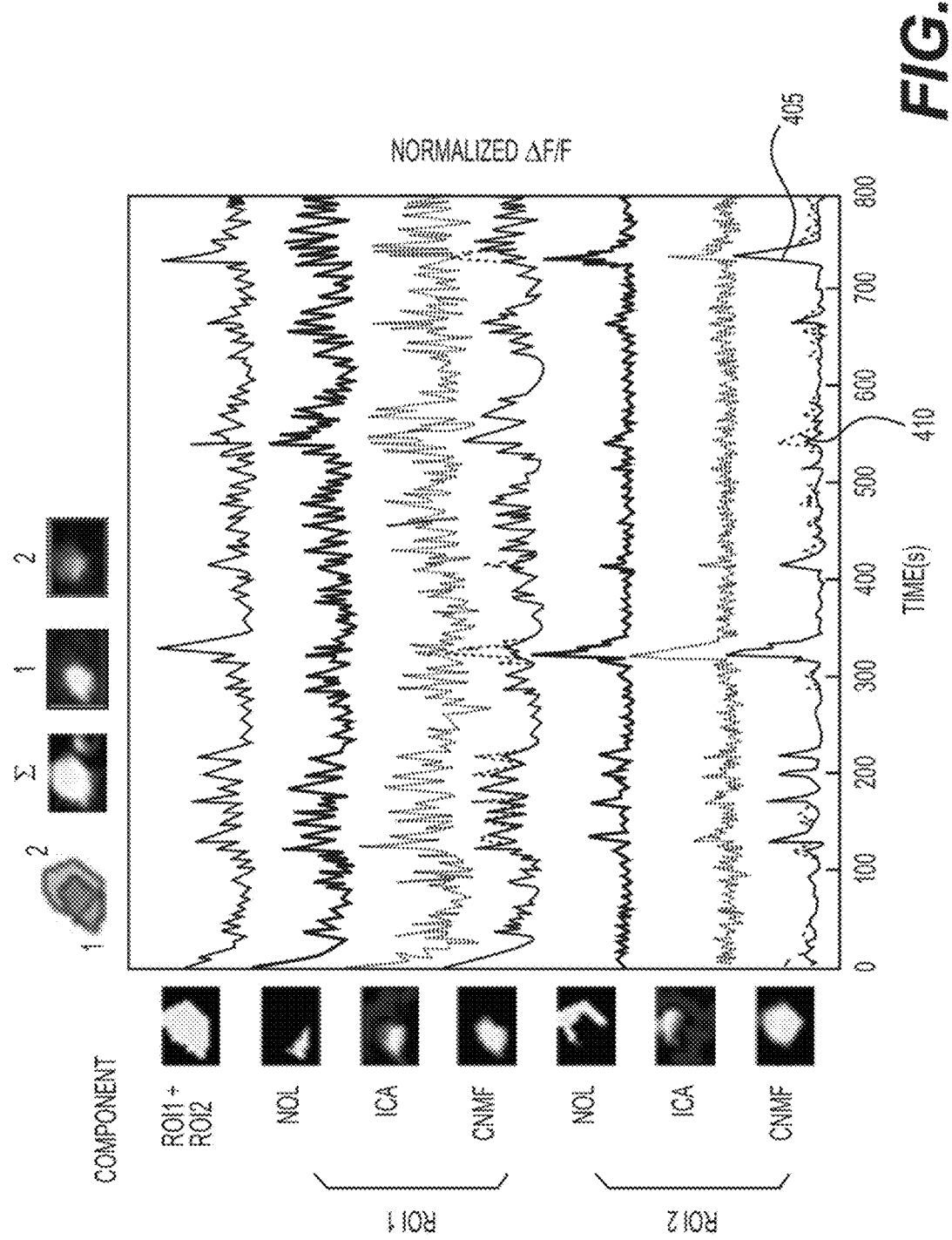
Figure 4C:
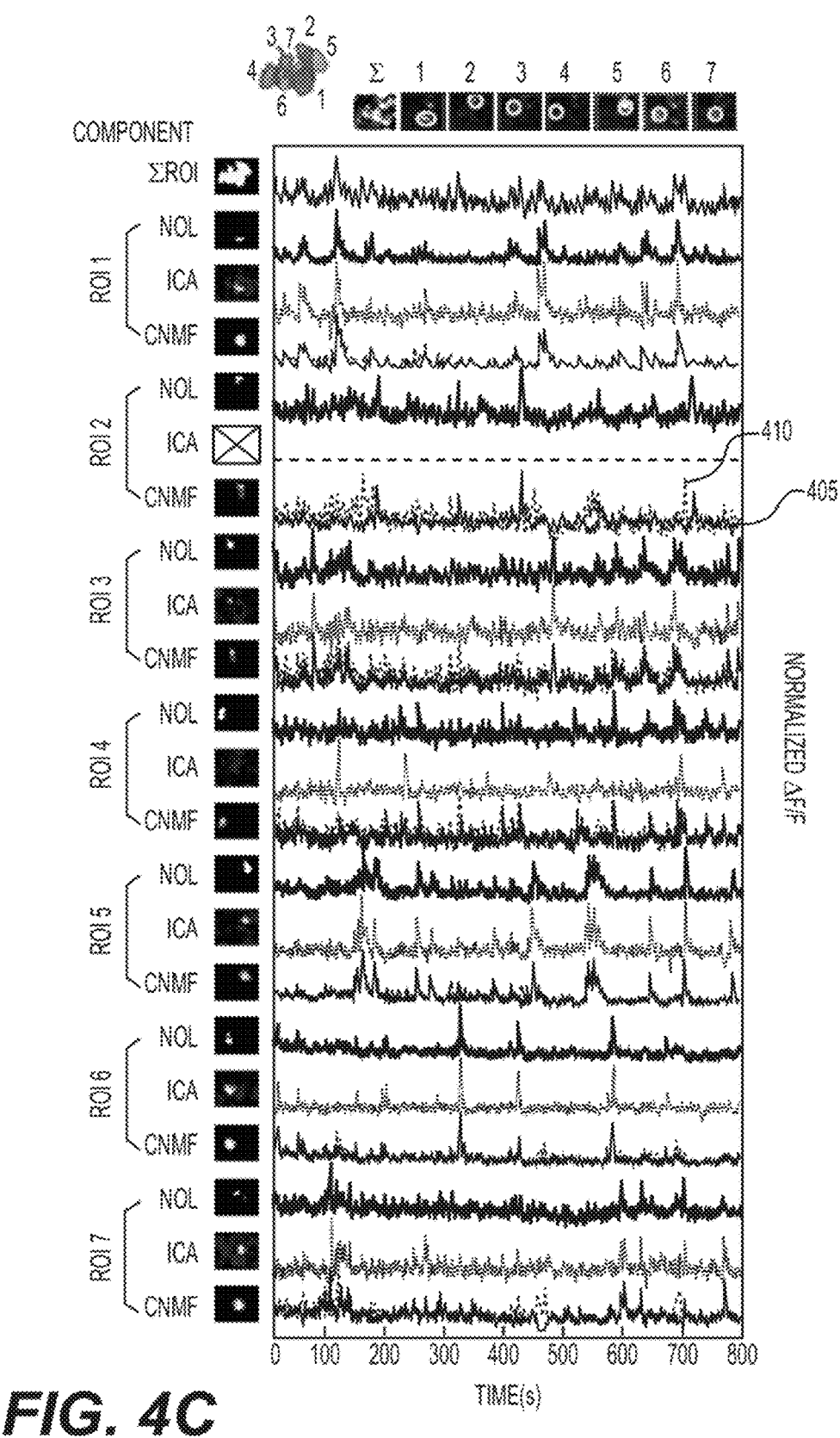
Figure 4D:
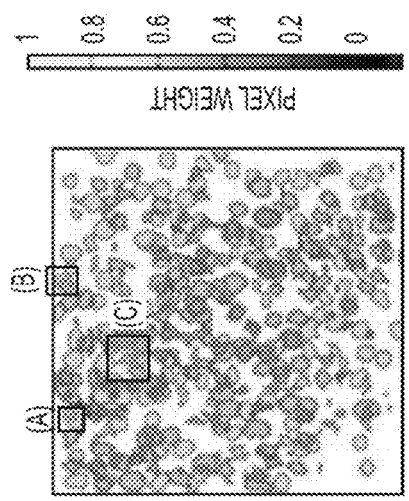
FIG. 4D is an exemplary signal diagram of the ROI contour map showing the ROI locations in FIGS. 4A-4C according to an exemplary embodiment of the present disclosure.
Figure 4F:
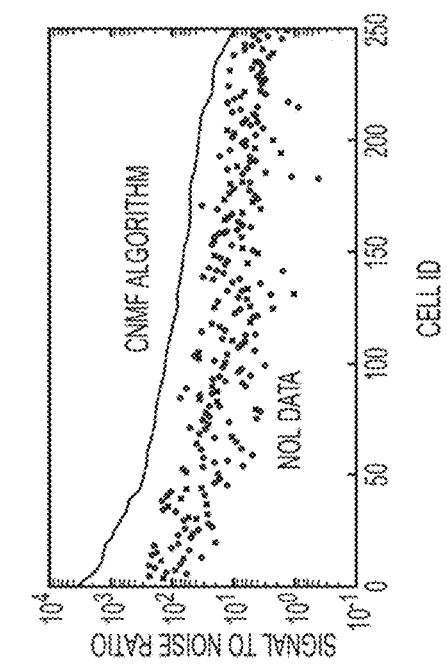
FIG. 4F is an exemplary graph illustrating the signal-to-noise ratio between the ΔF/F extracted from NMF and the raw ΔF/F extracted from NOL for a total of 250 ROIs according to an exemplary embodiment of the present disclosure.
Figure 4E:
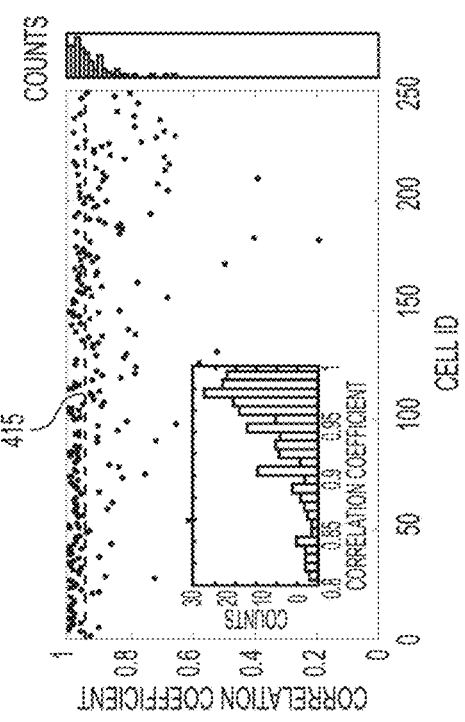
FIG. 4E is an exemplary chart illustrating the correlation coefficient between the ΔF/F extracted from NMF and NOL for a total of 250 ROIs according to an exemplary embodiment of the present disclosure.

To extract signals from the multiplane image, the exemplary procedure can be initialized with the expected number of sources (e.g., the rank), along with the nominal expected spatial location of the sources as prior knowledge, as identified by running the procedure on the previously acquired single plane image sequences. For the single plane images, the complexity, and number of overlapping sources can be significantly less than the multiplane images, and the procedure works very well for identifying sources without additional guidance. The effectiveness of this exemplary procedure, as applied to multiplane imaging, is shown in FIGS. 4A-4F. This can also be compared against the exemplary "best" human effort at selecting only the non, or minimally overlapping, pixels from each source, and against independent component analysis ("ICA"), which has previously proved very successful in extracting individual sources from mixed signals in calcium imaging movies (See, e.g., Reference 39). FIGS. 4A-4C show progressively more complex spatial patches of the dual plane image series with FIG. 4D showing the location of each patch in the overall image. The overall structure shown in FIGS. 4A-4C is identical. In each figure therein, the uppermost row of images show the maximum intensity projection of the time series, with the subsequent images showing, representative time points where the component sources can be independently active. The leftmost column of images shows the weighted mask, labeled with the ROI selection scheme (e.g., binary mask from maximum intensity projection, human selected non-overlapped, ICA, CNMF) that can produce the activity traces presented immediately to the right of these boxes. Therefore, the pixel weighting is shown adjacent to FIG. 4D. The extracted CNMF traces can include both the full CNMF extracted trace 405, and for comparison, trace 410, the signal extracted considering only the CNMF produced spatially weighted ROI, without taking into account the temporal mixing of other sources into those pixels. In simple cases (see, e.g., FIGS. 4A and 4B), the human selected non-overlapped regions appear to select only a subset of the events seen in the combined binary mask. In more complex cases (see, e.g., FIG. 4C and FIGS. 10B-G), where multiple distinct sources can overlap with the chosen source, the non-overlapped portion may only contain a few pixels, yielding a poor SNR, or those pixels may not be truly free from contamination, yielding mixed signals. In regions where the non-overlapped portion can be identifiable, this can be used as a Reference to evaluate the other two procedures.

Figure 9A:
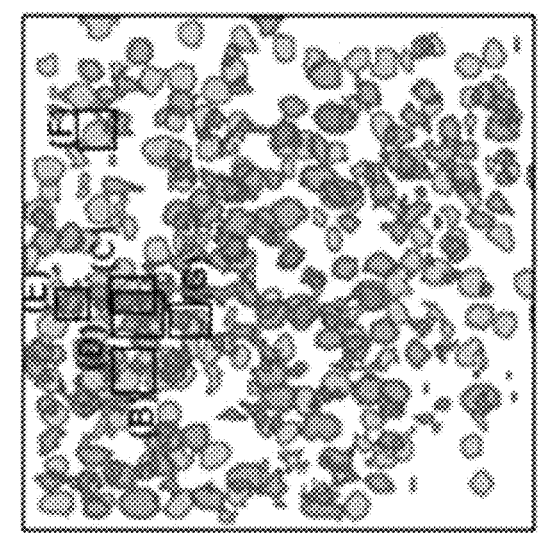
FIG. 9A is an exemplary chart illustrating the correlation coefficient between the ΔF/F extracted from CNMF and NOL for a total of 250 ROIs according to an exemplary embodiment of the present disclosure.
Figure 9A:
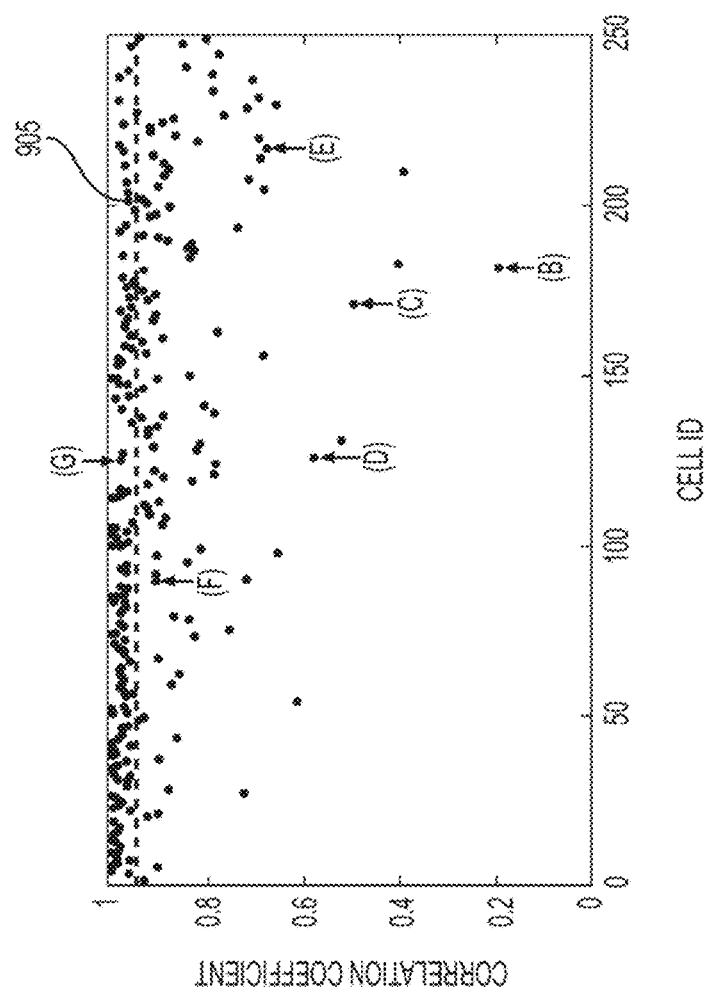
Figure 9C:
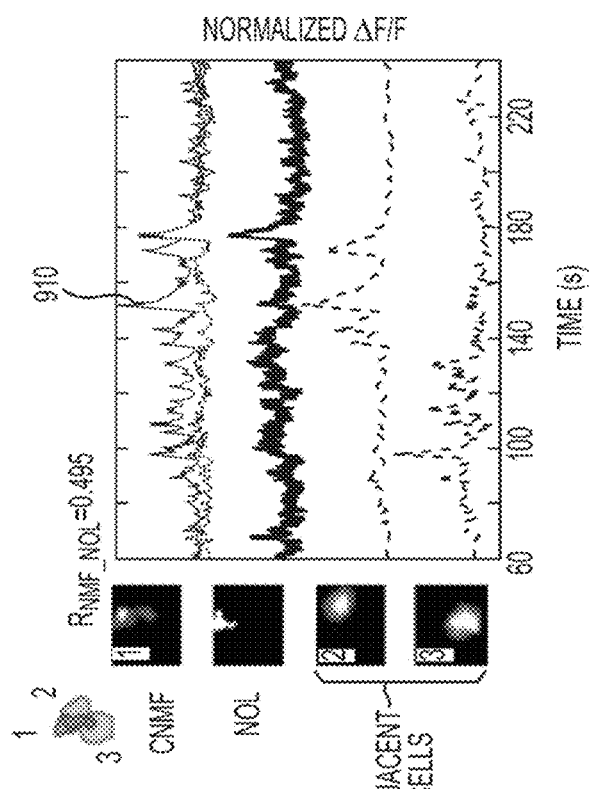
FIGS. 9B-9G are exemplary charts illustrating ROIs with various correlation coefficient between CNMF and NOL according to an exemplary embodiment of the present disclosure.
Figure 9B:
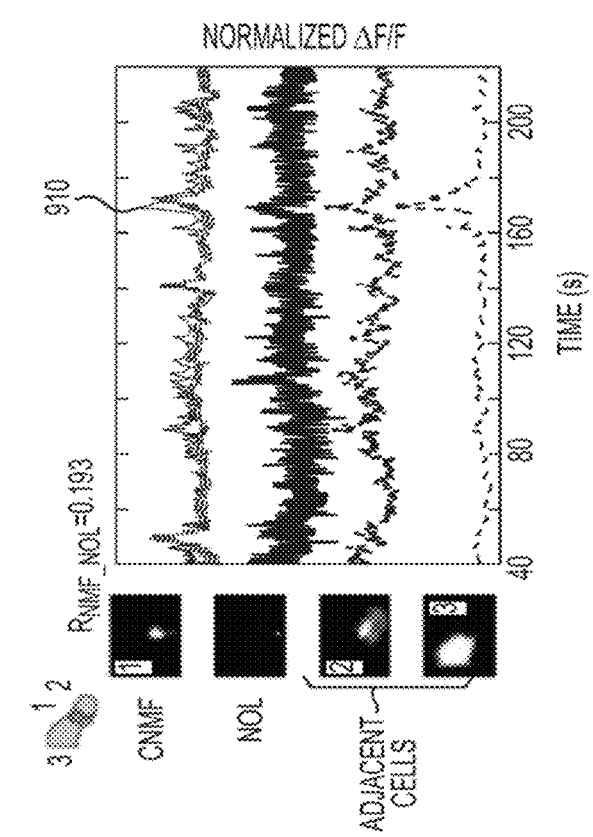
Figures 9D, 9E:
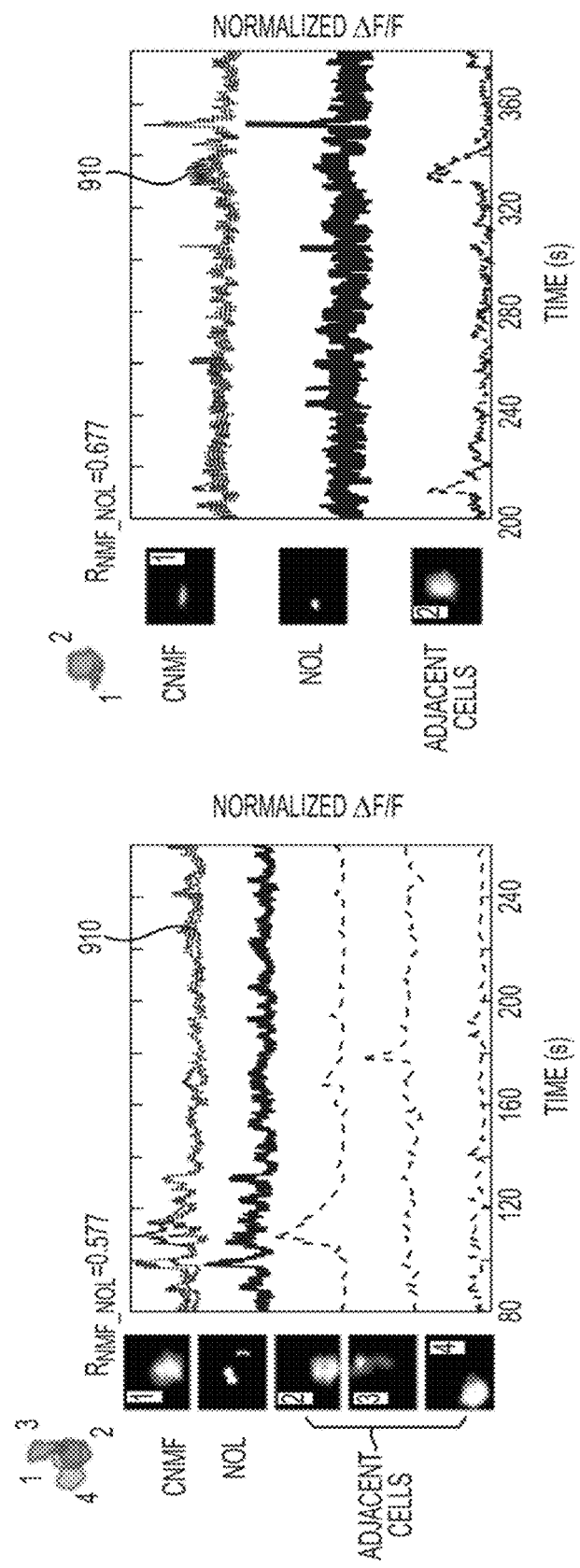
Figures 9F, 9G:
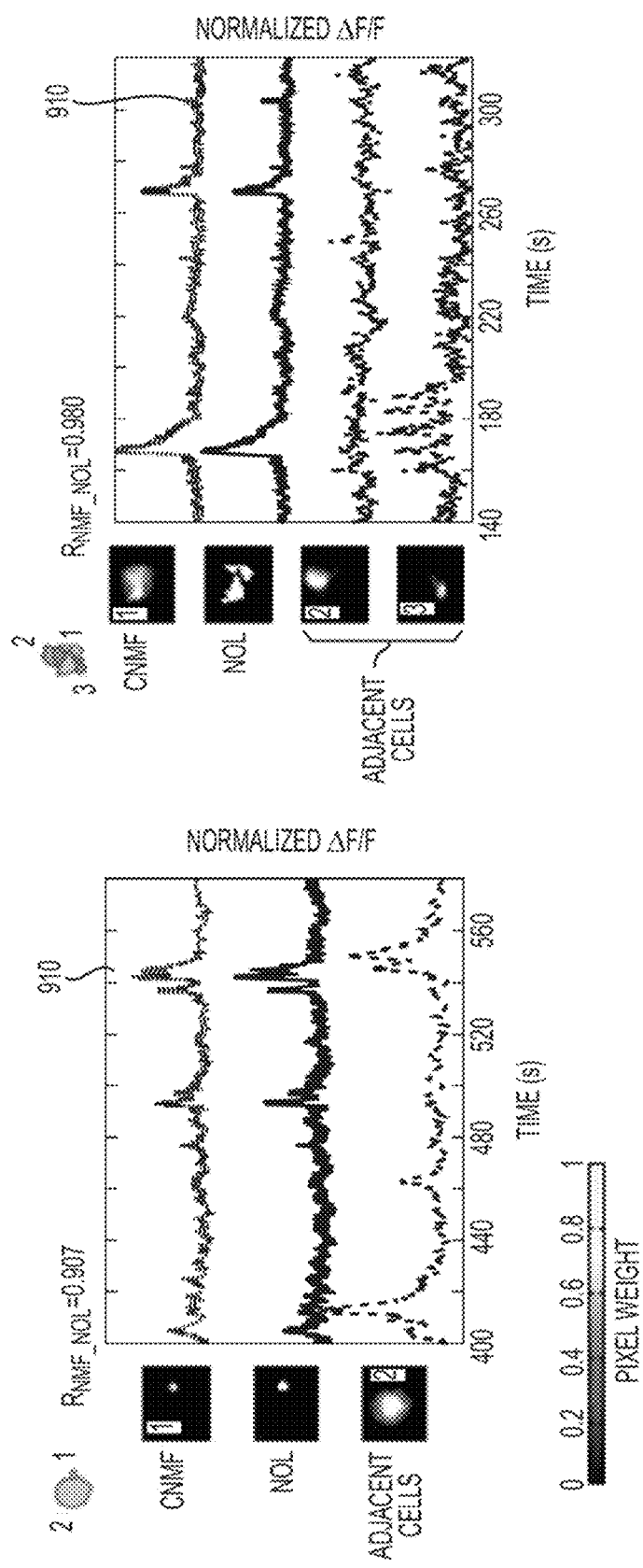

The ICA extracted sources can then be examined. ICA can identify the sources automatically, without human intervention, and does so quickly. For cases where the number of sources in space can be low, and there can be "clean" non-overlapping pixels with high SNR (see, e.g., FIGS. 4A and 4B), the extracted components can be spatially consistent with the known source location (e.g., top row of images). In many cases, they can include a region of low magnitude negative weights, which can appear to spatially overlap adjacent detected sources, presumably because this can decrease the apparent mixing of signals between the components. This can lead to unphysical minor negative transients, but these can be easily ignored with simple thresholding. For the complex overlapping signals in the exemplary experiment, ICA can routinely fail to identify human and CNMF identified source components, and appears to have less clean separation of mixed signals (e.g., activity traces shown in FIG. 4A, and the complete failure of ICA to identify ROI2 shown in FIG. 4C). Additionally, in order to maximize the performance of ICA, the acquired image can be tiled into smaller sub-images, with fewer component sources, for ICA to give reasonable performance. This can be simple to implement, but even in these instances, the total number of detected independent components with activity traces that look like real signals (e.g., appear "cell-shaped") and have temporal structure readily identifiable as physical (e.g., transients with fast leading edges, and characteristic longer decays) can be lower than what either a human, or CNMF methods identify (See, e.g., FIGS. 9A and 9B). (See, e.g., Reference 46). Nevertheless, ICA can find a significant number of sources, and does so automatically, an advantage over manually choosing ROIs. The graph shown in FIG. 9A illustrates the exemplary correlation coefficient between the ΔF/F extracted from CNMF and NOL for a total of 250 ROIs, for the data shown in FIGS. 3A-3I and 4A-4F. The dashed 905 line indicates the median of the correlation coefficients. The ROI contour map is also plotted.

FIGS. 9B-9G show exemplary ROIs with various correlation coefficient between CNMF and NOL. For each case, the ROI is labelled as 1, and its adjacent ROIs (e.g., potential contamination sources) are shown in FIG. 9A. To better evaluate the correlation coefficient of the signal extracted from the CNMF and NOL, both signals are plotted. Using the ROI contour in the CNMF but with uniformed pixel weighting and without unmixing treatment, the extracted ΔF/F trace 910 is plotted, superimposed onto the traces extracted from CNMF. The signals extracted from their adjacent ROIs (e.g., using CNMF) are plotted in green.

On inspection of the CNMF traces, many things can be seen. First, for the extracted traces that are automatically denoised, the exemplary model can facilitate this in a straightforward fashion. Second, the identified sources can be well separated. Comparing the CNMF trace to the non-overlapped trace, a very high correspondence can be seen, especially when the respective non-overlapped source SNR can be high. As shown in FIG. 4A, it is possible to see that the CNMF can be better than ICA at eliminating cross-talk between the two overlapping ROIs. This trend can be seen across all of the examples shown, and can generally be conserved over all ROIs. The CNMF traces can be compared against the human selected non-overlapping traces 415 shown in FIG. 4E. This exemplary graph shows the cross correlation between 250 CNMF sources, and the non-overlapped portion of that source (e.g., NOL) related to it. The correlation can be high, as would be expected if the CNMF traces accurately detect the underlying source. The majority of the signals show a correlation coefficient of less than 0.95, and the mean correlation coefficient can be 0.91, including all outliers. It can be noted that the distribution of coefficients can be strongly asymmetric, and it can contain some notable outliers.

Examining the underlying traces of these outliers, the source of the poor correlation between the NOL trace and the CNMF trace can be identified. (See, e.g., FIGS. 10B-10G). In these exemplary cases, it can be seen that the NOL ROI can consist only of a few pixels, and can be extremely noisy. The related CNMF ROI can be significantly larger and has much less noise. Examining the neighboring, or overlapping, sources that surround the NOL (e.g., and CNMF) component, sources can be seen with very different activity than that extracted in the CNMF trace, but clearly are present in the NOL signal. This phenomenon can be present in all of the lower correlation components. Because of this, the graph can be interpreted in another way. The fraction of cells with low correlation between the NOL and CNMF components can be exactly the sources that simple signal extraction procedures cannot cleanly extract the true underlying activity, they can be the cells that benefit from CNMF. Without CNMF, extracted signals can falsely show high correlation between sources that can be imaged into the same region in the dual plane image. In the dual plane image shown in FIG. 3, it can be found that approximately 30% of the cells have correlations below 0.9. The exact fraction of cells with significant contamination can depend on the sources sparsity and targeted areas, but there may always be many cells that can show some overlap, and would benefit from a high performance unmixing strategy, like CNMF.

Figure 5A:
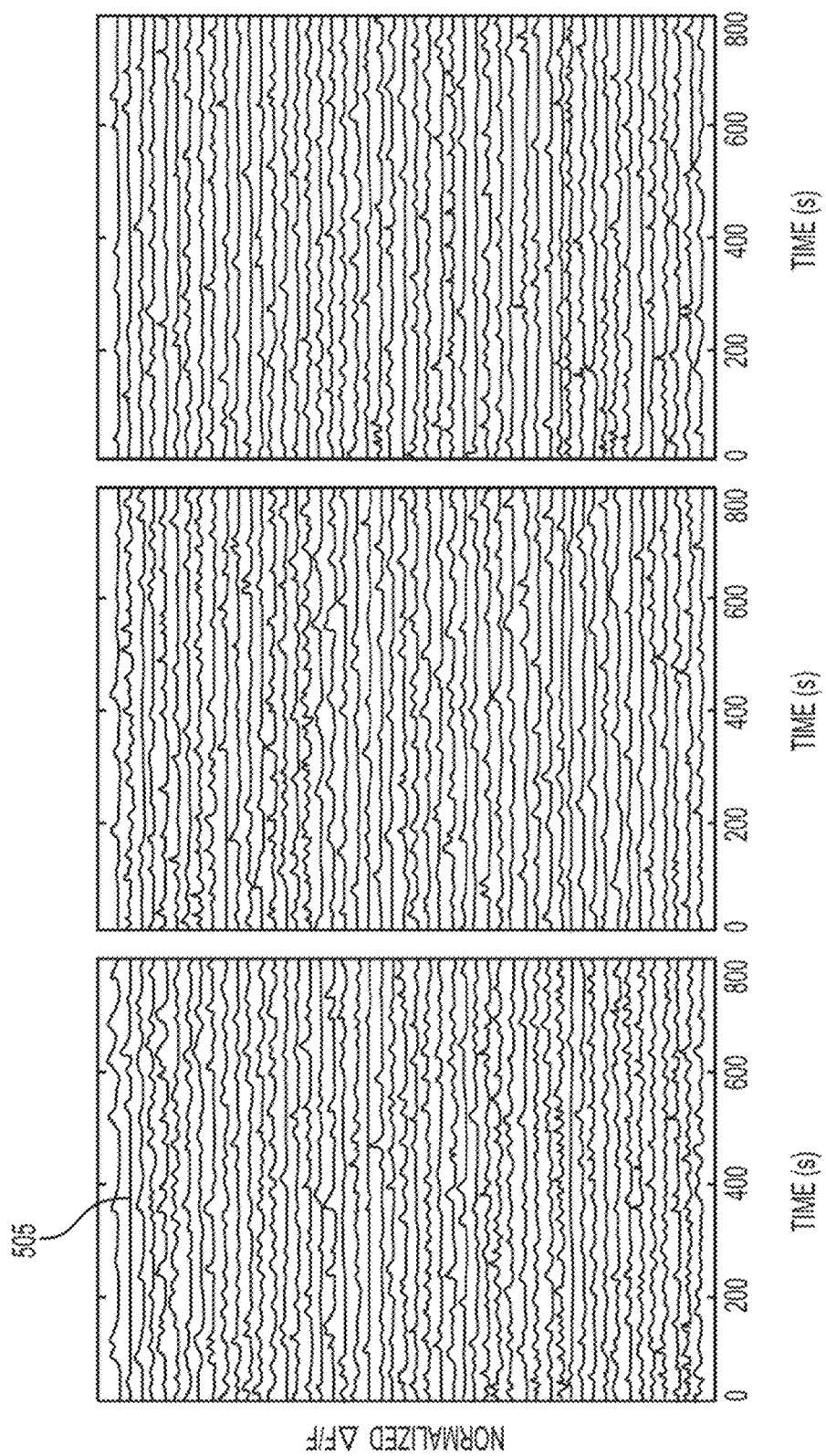
FIG. 5A is a set of exemplary signal diagrams of normalized ΔF/F traces of selected 150 ROIs in the dual axial plane imaging in FIGS. 3A-3I according to an exemplary embodiment of the present disclosure.
Figure 5B:
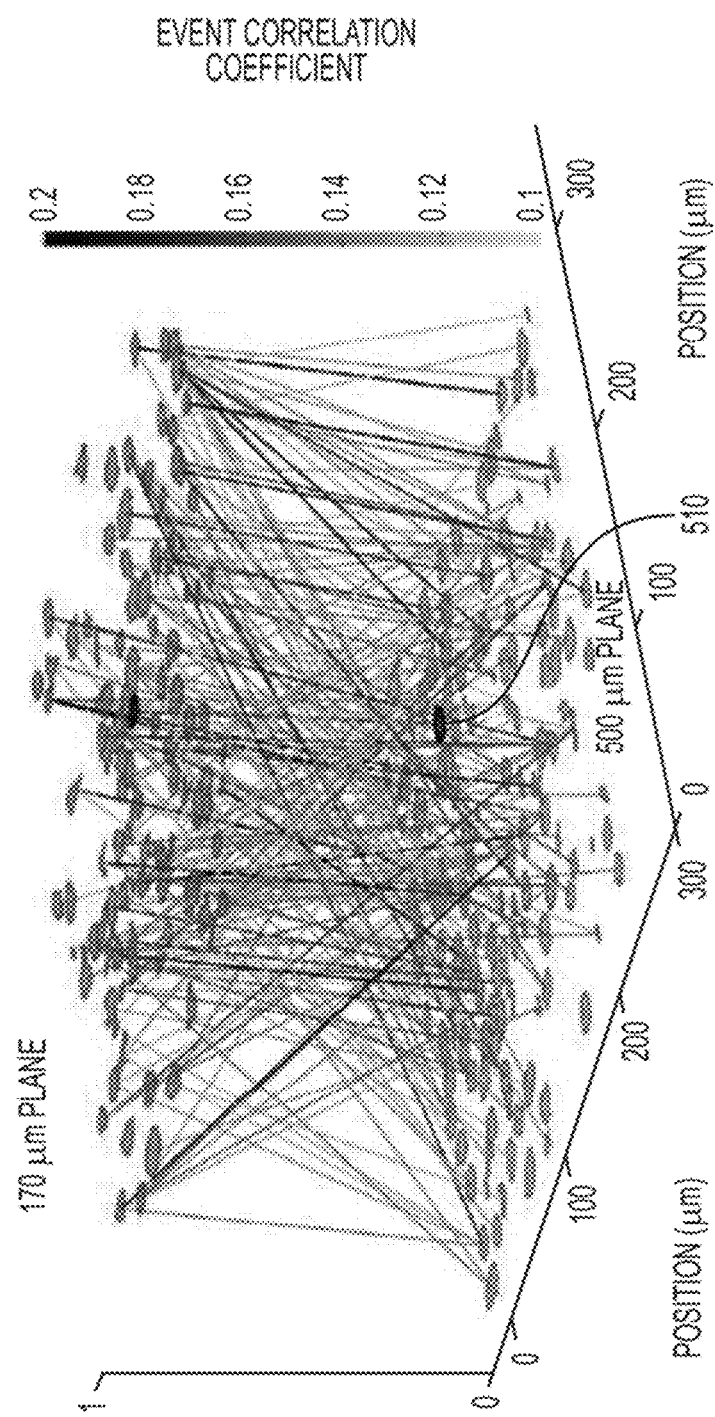
FIG. 5B is an exemplary chart illustrating the interlaminar correlation map of activity between neurons in L2/3 and L5 according to an exemplary embodiment of the present disclosure.

The power of the exemplary simultaneous multiplane imaging and source separation approach can be seen in FIGS. 5A-6E, where interlaminar correlations can be recorded, which can be used for understanding microcircuit information flow in the brain, as well as can evoke functional responses across cortical layers. As shown in FIG. 5A, 150 fluorescence activity traces 505 (e.g., out of approximately 350) showing spontaneous activity in L2/3 and L5 neurons in V1, collected at 10 Hz (e.g., FOV and cells as in FIGS. 3A-3H) are shown. In 13 minutes of imaging, over 20,000 events were detected across the population of active cells (e.g., 250 ROIs). The significant correlations between cells in L2/3 and cells in L5 can be computed, and the interlaminar correlation map in FIG. 5B can be displayed. One of the high correlation pairs (e.g., projected lateral displacement of approximately 67 μm) is shown as element 510 (e.g., dark outlines) in FIG. 5C. A scatterplot showing the correlation coefficients between pairs with respect to projected lateral displacement is shown in FIG. 5D. It can be noted that for the spontaneous activity in this recording, little dependence in the average correlation between cells in L2/3 and L5 on lateral distance between cells (e.g., inset, FIG. 5D) can be seen.

The data shown in FIGS. 3A-3I and 5A-5D were taken with two planes with inter-plane spacing of 330 μm, which can be far from the limit of the exemplary procedure. Both the number of planes, and the total external range between planes over 500 μm, can be extended with a high SNR. (See, e.g., FIGS. 10A-10O). In these additional experiments, the total performance and number of ROIs was limited by poor expression of the indicator in the mice (e.g., limited number of cells expressing strongly, combined with high non-specific background fluorescence). A shown in FIGS. 10A-10H, simultaneous three-plane imaging, again in mouse V1, is shown, and some representative activity traces from each of the planes is highlighted, as well as clean source separation using CNMF for a region of interest with partial spatial overlap from each of the planes can be shown. Deeper, extended, axial planes can be further demonstrated by imaging three planes at cortical depths of 130 mm, 430 mm and 640 mm, at 10 Hz, again with a high SNR. (See, e.g., FIGS. 10I-10O).

Figure 6A:
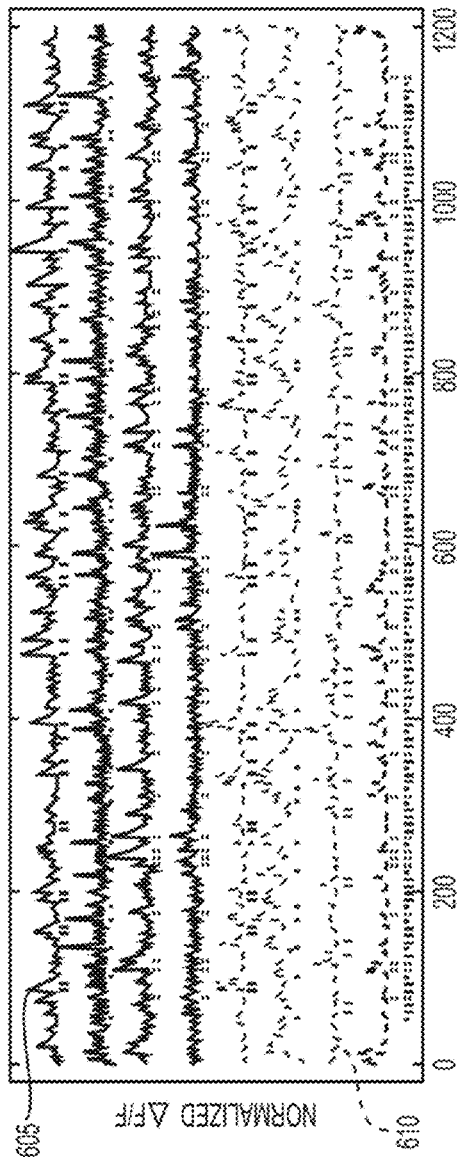
FIG. 6A is an exemplary signal diagram of normalized ΔF/F traces for selected ROIs with strong response to drifting grating visual stimulation, recorded with simultaneous dual plane imaging according to an exemplary embodiment of the present disclosure.

In a further set of experiments, visually evoked activity across L2/3 and L5 was examined. Drifting gratings were projected to probe the orientation and directional sensitivity (e.g., OS and DS,) of the neuronal responses. This paradigm was chosen because drifting grating produce robust responses in V1 (see, e.g., Reference 40), can be used frequently in the community (see, e.g., References 27 and 52), and can be used to examine the performance of the exemplary imaging procedure in a functional context. FIG. 6A shows some representative extracted traces 605 and 610 from cells with different OS, along with an indicator showing the timing of presentation of the preferred stimulus (e.g., traces 605 and 610 were acquired in the dual-plane paradigm). In this exemplary experiment, the activity of each plane individually, for multiple trials, was recorded, followed by a brief interval with no visual stimulation, followed by recording the dual plane images.

During the entire recording period, this mouse had particularly strong spontaneous activity in nearly all of the cells in the FOV. Many cells showed strong and consistent orientation tuning across single-plane trials (e.g., 75 out of 260 cells). For these cells, the computed single-plane DS and OS were compared to those computed from the same neurons, but from the dual-plane image series. If the dual plane images had increased noise, or if overlapping sources could not be cleanly separated, a decrease can be expected, or an OS can be altered. This was neither the case on the population, nor single cell level, as shown in FIGS. 6 B and 6C. FIG. 6D shows the exemplary standard dev. dual-plane image, and extracted ROI contours. The two small boxes 625 on the contour image indicate two pairs of cells, with significant spatial overlap in the dual-plane image. This is illustrated in more detail in FIG. 6E, where the DS of these cells is shown to ensure that the source separation procedure cleanly extracted the functional activity. It can be clear that the functional activity of even strongly overlapping cells can be fully separated, without cross contamination.

Exemplary Discussion

Successful simultaneous 3D multilayer is in-vivo imaging is shown with a hybrid SLM multibeam-scanning approach that can leverage spatiotemporal sparseness of activity and prior structural information to efficiently extract single cell neuronal activity. The effective area that can be sampled can be extended, multiple axial planes can be targeted over an extended range, greater than 500 μm, or both, at depth within the cortex. This can enable the detailed examination of intra- and inter-laminar functional activity. The exemplary procedure can be easily implemented on any microscope, with the addition of a SLM module to the excitation path, and without any additional hardware modifications in the detection path. The regional targeting can be performed remotely, through holography, without any motion of the objective, which can make the exemplary procedure a strong complement to 3D two-photon activation (See, e.g., References 44, 45, and 51).

Exemplary Comparisons to Alternative Methods

Many imaging modalities exist today. Some of the simplest systems that provide volumetric imaging can combine a piezo mounted objective with resonant galvos. Optically, these systems have high performance throughout the focusing range, as all components can be used in their best-designed positions. A critical component for determining the imaging rate can be the speed of the piezo and how fast can the objective be translated axially. This can be related to the resonant frequency of the combined piezo-objective system, and the maximum forces and accelerations facilitated in the system. For deep imaging in scattering tissue, the fluorescence collection efficiency can scale as $$\frac{NA^2}{M^2},$$

with M being the objective magnification. (See, e.g., Reference 6). Unfortunately, the combination of high NA, and low magnification, mean that the objectives can be large, and heavy. This large effective mass lowers the resonant frequency of the combined piezo/objective system, and necessitates significant forces to axially move quickly, as well as lengthens the settle times (e.g., approximately 15 ms). As such, while 2D imaging rates can be high, volumetric imaging can be slower, with volumetric rates less than 10 Hz (e.g., 3 planes, sequentially).

The "throw"—the distance with which piezo can travel, can also be limited, with the current state-of-the-art systems offering 400 μm of total travel, although most systems have significantly less. The settle time can also lead to lower duty cycles as imaging cannot take place during objective settling. Compared to piezo-based systems, the exemplary SLM-based system/apparatus has significantly greater axial range, and couples no vibrations into the sample. It can be possible to currently scan at least three planes simultaneously at 10 Hz using traditional galvanometers, with over 500 μm total separation between the outer planes (see, e.g., FIGS. 10A-10O), and the speed could be immediately tripled by installing a resonant galvanometer on the exemplary system. Additionally, change to a different axial plane can be performed very rapidly, in approximately 3 ms, which can minimize lost time, and can facilitate axial switching within a frame, with little data loss (See, e.g., FIGS. 11A-11C).

Remote focusing has also been used for faster volumetric imaging, either with the use of a secondary objective and movable mirror (see, e.g., References 9 and 10), or with electrotunable lenses (See, e.g., Reference 23). While both have higher performance than piezo mounted objectives, neither has yet demonstrated the ability to facilitate in-vivo functional imaging at the axial span illustrated herein. Remote focusing with movable mirrors can scan with minimal aberration of the PSF, but for cell targeted imaging, defocusing induced aberrations may not be significant, neither in the exemplary procedure, nor for electrotunable lenses. For applications where a perfect PSF can be paramount, remote focusing with a mirror can offer better optical performance, but benefits from careful alignment and engineering, and may not be beneficial for somatic calcium imaging. The electrotunable lens represents perhaps the most cost effective solution for high performance fast focusing, and can be inserted directly behind the objective. But in this position, it affects any beam that passes through it, so it can complicate combining two-photon activation with imaging. A better solution can be to place it in a conjugate plane to the back focal plane of the objective—exactly the same nominal position as the exemplary SLM—and then it can control the imaging beam alone. While an SLM can be more costly than the electrotunable lens, it can still be a small expense relatively to the cost of any two-photon microscope, and offers faster settle times (see, e.g., FIGS. 11A-11C), as well as multiplexed excitation.

While fast sequential imaging strategies such as acousto-optic deflector ("AOD") systems offer good performance, with the current state-of-the-art 3D AOD systems currently providing high performance imaging over relatively large volumes of tissue (See, e.g., References 31, 43, and 50). Unfortunately, these systems can be very complex and expensive, with the cost of these systems at least a few times that of conventional two-photon microscopes, which severely limits their use. They also can be very sensitive to wavelength, benefits from extensive realignment with changes in wavelength. The scanning range of most AOD systems can be less than most systems, (see, e.g., References 29, 34, 50 and 53), with only the most strongly chromatically corrected variant exceeding the exemplary demonstrated range. (See, e.g., Reference 31). With the addition of the same chromatic correction optics to the exemplary system, the addressable volumes can be similar. An additional complication of any point targeting strategy, like AOD systems, can be that sample motions can be significantly more difficult to treat. With raster scanning, shifts in the XY plane can be easily detectible, and treatable with well-established correction procedures. Point targeting systems, on the other hand, need to densely target at a few ROIs in the sample to create a fiducial that can be used determine the magnitude and direction of motion. These fiducials need to be consistently visible, for closed loop correction.

A bigger limitation of all of these serially scanned systems can be that all can be nearing the fundamental limits of their speed, and further increases in performance can be likely only possible with multibeam systems. For example, in AOD based systems, while the "speed-limit" can be given by the speed of sound in the material, a more practical limit can be set by the dwell time used per target to acquire signals with sufficient SNR. Single beam large FOV galvanometric scanning systems suffer from this as well, if one maintains high frame rates, the linear speed of travel of the excitation spot across the FOV can be high, resulting in low dwell times per unit distance on the sample. To maintain SNR at useful levels, finite dwell times can be beneficial. As fluorophore saturation ultimately can limit the maximum emission rate regardless of excitation intensity (e.g., increases in intensity simply cause photodamage, bleaching, and reduced spatial resolution). The current "best" functional indicators, like GCaMP6, have high two-photon cross sections (see, e.g., Reference 14), and excitation saturation can be easily reached with modern laser systems. This can affect all single beam systems that use fluorescence as the optical readout.

An exemplary procedure to increase performance, and take advantage of available power, while maintaining sufficient dwell times for high sensitivity, can be to have multiple beams targeting the sample. Spatially multiplexed strategies have been used before (see, e.g., References 6, 8, 21, 32, and 37), but with very limited success for imaging neuronal activity in scattering samples. Imaging in scattering samples can produce fluorescence, which can scatter extensively, limiting the ability to "assign" each fluorescence photon to its source (See, e.g., References 4, 3 and 32). Under these conditions, a more successful approach has been to time multiplex each separate excitation beam (See, e.g., References 4, 15, 19 and 20).

The standard lasers used in two-photon imaging operate at approximately 80 MHz, with the individual pulses separated by 12 ns, and many standard fluorophores used in biological imaging have fluorescence lifetimes of less than or equal to 3 ns. Thus, each single laser pulse can produce a short burst of fluorescence that can extend strongly for only 25% of the "dark time", rendering the system's duty cycle low. With an appropriate combination of beam splitters and delay lines, the repetition rate can be effectively increased by a factor of 4, to approximately 320 MHz. with approximately 3 ns between pulses. As these four beams traverse independent paths before entering the microscope, each beam can be adjusted to a different area and depth, and can be used for multilayer (see, e.g., Reference 15) or multi-area imaging. (See, e.g., Reference 58). For multilayer imaging, the exemplary system can exceed the demonstrated FOV and axial range of published implementation of temporally multiplexed beams, without customized electronics for time-stamped photon counting, and with significantly greater flexibility and speed in choosing targeted depths. Other multibeam or temporally multiplexed strategies to be can be complementary methods that can be leveraged to further increase the exemplary system performance.

Exemplary Phase Only SLMs for Beam Steering

The performance of the exemplary system can depend on the SLM, a 512×512 pixel phase only device that performs beam-splitting by imparting phase modulation on the incoming laser pulse, and uses diffraction to redirect the beams to their targeted site. The efficiency of any diffractive process can be affected by many things (e.g., the fill factor and the effective number of phase levels per "feature"). The controllable pixel fill factor of the exemplary SLM can be 82%, and thus, even with "perfect" holograms, the maximum power throughput can be reduced compared to a simple mirror. Taken together, these factors can lead to an effective power throughput on the SLM module ranging from approximately 82% to approximately 40%, reducing the total light available for imaging. In exemplary experiments, the efficiency has not yet been a limitation for multiplane imaging, but it can be for imaging multiple planes in L5 and beyond. Compared to a conventional system with a piezo mounted objective, this can seem like a significant loss, however, it can be far less of a penalty than for multi-AOD systems, which give less than 20% total power throughput.

Another important consideration for any diffractive device can be that they can be inherently chromatic (e.g., the deflection can depend on the wavelength of the light, laser sources for multi-photon imaging may not be strictly monochromatic (e.g., the ultrafast laser pulse has a characteristic bandwidth, with a minimal range dependent on the shape of the pulse. In the exemplary system (e.g., Coherent Mira-HP) this can correspond to a FWHM of 6.5 nm at 940 nm for the approximately 140 fs pulses from the laser. With a 25× objective, and an SLM induced lateral displacement of 150 µm from the origin for the central beam, it can be found that the spectral FWHM colors to be deflected ±1 µm from the target position.

If the effective excitation NA can be large, and the PSF correspondingly small, these displacements can be comparable in size with the FWHM of the monochromatic PSF, which both blurs the image, and reduces the peak focused intensity at such displacements. With shorter pulses, performance fall off can be more severe, and without additional correction elements, pulse widths shorter than 100 fs may not be recommended. This chromatic dispersion can be reduced with the incorporation of a custom shaped high dispersion optical element, (see, e.g., Reference 31), to improve the performance over a wider lateral range, and for shorter pulses. Nonetheless, even without efforts to reduce dispersion, the FOV of a meaningful amount can be extended, even without correction, and within that range, rapidly, and flexibly.

For axial displacements on the exemplary system, the effect of chromatic dispersion can be markedly less. For a diffractive lens, the dependence of focal length with wavelength can be $$f(\lambda) \approx f_0 \cdot \left(\frac{\lambda}{\lambda_o}\right),$$

which can correspond to an axial shift between the FWHM points of approximately 1.1 µm for a −200 µm displacement, and approximately 1.6 µm for a +300 µm displacement. The objective back aperture can be filled to have an NA of 0.45, and with these settings, the FWHM of the nominal monochromatic PSF can be approximately 6.5 µm, so the chromatic axial displacement may only be a small fraction of the PSF, for the entire span of axial separations demonstrated here. If finer axial resolution can be beneficial, which can benefit from larger excitation NA, the axial range with high performance can be correspondingly smaller. For a given SLM setting, the relative displacement it produces, and the resultant axial PSF can, both scale as $NA^2$. For example, at an excitation NA of 0.9, only 120 µm of axial separation can be possible with the same relative performance. For the exemplary task, fast multiplane calcium imaging with single cell resolution, the performance can be excellent over 500 µm.

The efficiency of this procedure can be improved by better SLMs (e.g., devices that have higher fill factors, increased pixel number and increased phase modulation. Increased pixel counts can increase the number of levels available across any feature, and can increase the diffraction efficiency. For nearly all applications, once the pixilation facilitates greater than or equal to 8 levels across a ramped 0 to $2\pi$ transition, the efficiency can be very high. For arbitrary patterns of excitation, it may not be possible to predict how many overall pixels can be needed on the device to achieve this, but for the simple lateral or axial deflections, this can correspond to SLMs with approximately 1500 pixels across, which can keep the overall module power efficiency above 80% for the current fill factor, and higher with improved devices. More pixels can also increase the possible range of deflections; however, this may not extend the range without better compensation of chromatic dispersion, which can be one reason why existing, higher pixel devices, may not be used. The total size of the device may not be critical, and the pixel density may not need to be increased; just the total number of pixels. Large pixels have an added benefit of increased power handling, and generally higher fill factors, because the electronics and insulating barriers between neighboring pixels can be somewhat fixed in size, whereas active areas may not be. Larger pixels can result in larger phase features, which can reduce the maximum angles of deflection, but this can be easily compensated with altering the magnification of the post-SLM telescope system, which can be beneficial to properly map the SLM to the back focal plane of the objective.

Another area where efficiency can be increased can be by combining adaptive optics methods with the exemplary targeting. SLMs can be a natural element for corrections of both system, and sample aberrations (See, e.g., Reference 30).

Exemplary Volumetric Imaging

The overall speed of multiplane imaging can be increased with additional exemplary procedures. Because of the systems sensitivity, activity with high SNR can be detected. As such, the nominal dwell time per pixel can be reduced, and enough photons for effective detection can still be collected. By transitioning the exemplary microscope from conventional galvanometers to resonant galvanometers, the imaging can be sped up by at least a factor of three. Combined with the fast switching time of the exemplary device, large volumes of neural tissue can be imaged at high speed. The exemplary strategy can be to rapidly interleave multiplane images in successive scans to generate a complete picture of neural activity.

The exemplary SLM was chosen specifically because it can be controlled via low latency PCIe bus transfers, increasing speed, and giving deterministic latency for pattern changes. This device was optimized for fast hologram transitions by increasing the backplane drive voltage, utilizing more than $2\pi$ phase stroke, and the computation of optimized intermediate holograms. Taken together, they dramatically increase the effective switching speed of the device, and facilitate beam retargeting in less than 3 ms. FIG. 11B shows a graph that illustrates the performance. Two sets of planes in 3 ms can be fully transitioned between, with usable fluorescence produced in the new set of planes in 2 ms. Imaging at 30 Hz, with three sets of 3-plane images, can be performed. The fast transition times can ensure interframe switching while maximizing duty cycle. This can facilitate nine axial sections, with an overall volume rate of 10 Hz, over large regions of the cortex, and significant depth. (See, e.g., FIG. 11C). The imaged volume can also be increased by scaling up the number of independent beams entering the SLM modules, and incorporating various spatial and temporal multiplexing strategies (See, e.g., References 15 and 58). In these cases, the addressable volume or speed increase can scale linearly with the number of beams entering the SLM module(s).

Further volumetric imaging in scattering tissue can be promising, and SLM-based multiregion imaging can be but one implementation of a general strategy of computationally enhanced projective imaging, which can make possible the ability to interrogate neurons over a very large area, with high temporal resolution and SNR. Projective imaging can be extremely powerful, and has led to tremendous advances in medical imaging, such as computerized tomography ("CT"), positron emission tomography ("PET"), and magnetic resonance imaging ("MRI"). Many of these methods suffer from issues familiar to neuroscientists aiming at imaging activity in the brain. For x-ray CT scanning and PET, "photodamage" can be a serious concern, while for Mill, speed can be limited. For those modalities, advanced computational and statistical procedures, ideally suited to the particular imaging "task", shape the overall strategy.

Basic knowledge of the underlying physical structure and sparsity can be used to define constraints for the recovery of the underlying signal, and can facilitate higher fidelity reconstruction and increased imaging speed. (See, e.g., References 7, 11, 14 and 57). These same principles apply here. The spatial distribution of neurons may not be dense and uniform everywhere, and neuronal signals may not be consistently highly synchronized; this can produce spatiotemporal sparseness that can be leveraged for efficient source separation of mixed signals. With the exemplary multiplexed SLM system/apparatus the number of areas simultaneously illuminated can be deterministically controlled such that there can be direct control over the effective number of sources, in contrast to alternate extended two-photon approaches, like Bessel beam scanning (see, e.g., References 11 and 59), where the sample alone controls the complexity of the signal.

Just as contrast agents dramatically have improved performance in other imaging modalities, this exemplary procedure can include advances in functional indicators. GCaMP6 has very low basal fluorescence, which may increase only with neuronal firing (e.g., the dark of space, punctuated by stars of activity). This has advantages for the signal unmixing and SNR, as background fluorescence can be minimal. As development continues on these and other probes, more sites can be targeted simultaneously.

There can be many issues that can be addressed by high speed volumetric imaging. First, for example, the simple increase in neurons monitored in the local circuit can greatly increase the chances for capturing the richness of variability and dynamics in cortical processing (See, e.g., References 2, 3 and 28). For example, what can be the organization of functionally or behaviorally relevant ensembles in cortical columns? How do upstream interneurons affect downstream activity and synchrony, and output (See, e.g., References 23, 25, 39)? Without the ability to probe interlaminar activity simultaneously, answering these questions definitively can be very difficult, if not impossible. While somatic imaging has been described herein, the exemplary procedure functions well for imaging dendrites, or dendrites and soma (see, e.g., Reference 46) for dendritic source separation with CNMF. The extended axial range of the exemplary procedure can facilitate exploring L5 soma and their apical tufts simultaneously, and can give direct insight into the role of dendritic spikes and computation in neuronal output. (See, e.g., References 35 and 55). The SLM-based multiplane imaging can be a powerful procedure for addressing these and other questions that can benefit from high speed volumetric imaging with clear cellular resolution. The exemplary system can be flexible, easily configurable and compatible with most existing two photon microscopes, and can provide new insights into cortical computation and function across multiple layers.

Exemplary Experimental Procedures

Exemplary Animals and Surgery

All experimental procedures were carried out in accordance with animal protocols approved by Columbia University Institutional Animal Care and Use Committee. Experiments were performed with C57BL/6 wild-type mice at the age of postnatal day (P) 60-120. Virus AAV1synGCaMP6f (see, e.g., Reference 14) was injected to both layer 2/3 and layer 5 of the left V1 of the mouse cortex, 4-5 weeks prior to the craniotomy surgery. The virus was front-loaded into the injection pipette and injected at a rate of 80 nl/min. The injection sites were at 2.5 mm lateral and 0.3 mm anterior from the lambda, putative monocular region at the left hemisphere. Injections were made at two different depths from the cortical surface, layer 2/3 at 200 µm-250 µm and layer 5 at 400 µm-500 µm respectively.

After 4-5 weeks of expression, mice were anesthetized with isoflurane (e.g., 2% by volume, in air for induction and 1% during surgery). Before surgery, dexamethasone sodium phosphate (e.g., 2 mg per kg of body weight; to prevent cerebral edema) and bupivacaine (e.g., 5 mg/ml) were administered subcutaneously, and enrofloxacin (e.g., 4.47 mg per kg) antibiotics and an anti-inflammatory, carprofen (e.g., 5 mg per kg) were administered intraperitoneally. A circular craniotomy (e.g., 2 mm in diameter) was made above the injection site using a dental drill and the dura mater was removed (See, e.g., Reference 36). 1.5% agarose was placed over the craniotomy and a 3-mm circular glass coverslip (e.g., Warner instruments) was placed and sealed using a cyanoacrylate adhesive. A titanium head plate with a 4 mm by 3.5 mm imaging well was attached to the skull using dental cement. The imaging experiments were performed 1-14 days after the chronic window implantation. During the imaging, the mouse was awake and moved freely on a circular treadmill with its head fixed. Over 40 total imaging sessions across 17 mice were performed.

The shrimp used in the structural imaging were *artemia nauplii* (e.g., Brine Shrimp Direct) in hydra medium (e.g., with composition of 1 mM $CaCl_2.H_2O$, 0.1 mM $MgCl_2.6H_2O$, 30 µM $KNO_3$, 0.5 mM $NaHCO_3$, 80 µM $MgSO_4$). During imaging, the oxygen concentration in the medium was reduced by limiting perfusion, which can lead to reduced motion of the shrimp.

Exemplary Two-photon SLM Laser Scanning Microscope

The setup of the exemplary two-photon SLM laser scanning microscope is illustrated in FIG. 1A. The laser source can be a pulsed Ti: Sapphire laser (e.g., Coherent Mira HP) which can be tuned to 940 nm with a maximum output power of approximately 1.4 W (e.g., approximately 140 fs pulse width, 80 MHz repetition rate). The output laser beam can be directed through a Pockets cell (e.g., ConOptics EO350-160-BK) to control the intensity on the sample. A broadband λ/2 waveplate (e.g., Thorlabs AHWP05M-980) was located after the EO modulator to rotate the laser polarization so that it can be parallel with the active axis of the spatial light modulator (e.g., Meadowlark Optics, HSP512-1064, 7.68×7.68 mm² active area, 512×512 pixels) located further downstream. The laser beam can be expanded by a 1:1.5 telescope (e.g., f1=50 mm, f2=75 mm, Thorlabs plano-convex lenses, "B" coated) to fill the active area of the SLM. The light incident angle to the SLM can be approximately 3.5°. The reflected beam from the SLM can then be scaled by a 4:1 telescope (e.g., f3=400 mm, f4=100 mm, Thorlabs Achromatic doublets lenses, "B" coated), and imaged onto a set of galvanometer mirrors (e.g., Cambridge 6215HM40B). The galvanometer mirrors can be located conjugate to the microscope objective pupil of a modified Olympus BX-51 microscope by use of an Olympus pupil transfer lens (e.g., f5=50 mm) and Olympus tube lens (e.g., fTL=180 mm). An Olympus 25×NA 1.05

XLPlan N objective can be used for the imaging. Other objectives also perform well in the exemplary system. The SLM surface can be imaged afocally to the back pupil of the objective. The fluorescent signal from the sample can be detected with a photo-multiplier tube ("PMT", Hamamatsu H7422P-40) located above the microscope, and followed by a low noise amplifier (Stanford Research Systems SR570). ScanImage 3.8 (see, e.g., Reference 47) can be used to control the galvanometer mirrors, digitize and store the signal from the amplifier of the PMT. The line scanning can be bidirectional with a single line scan rate of 2 kHz. For a 256×200 pixel imaging, the frame rate can be 10 fps.

Exemplary Hologram Generation

Figure 7A:
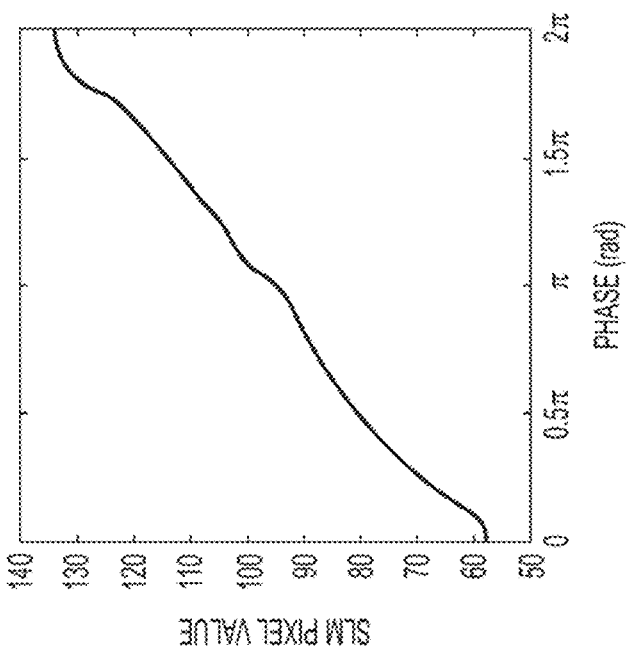
FIG. 7A is an exemplary graph illustrating the reflected phase of the SLM for a wavelength of 940 nm versus the applied driving pixel value to the SLM according to an exemplary embodiment of the present disclosure.

Custom software using MATLAB (The MathWorks, Natick, Mass.) was developed to load and control the phase hologram pattern on the SLM through a PCIe interface (Meadowlark Optics). The SLM was calibrated, and a lookup table that converts the pixel values to voltage driving the liquid crystal of the SLM was generated. At the operation wavelength of 940 nm, the SLM outputs approximately 80 effective phase levels over a 2π phase range, with a relative uniform phase level spacing. (See, e.g., graph shown in FIG. 7A).

To create a 3D beamlet pattern at the sample (e.g., a total of N beamlets, each with a coordinates[$x_i$, $y_i$, $z_i$], i=1, 2 . . . N), the phase hologram pattern on the SLM φ(u, v) can be, for example expressed in the following:

$$\Phi(u,v) = \text{phase}\{\Sigma_{i=1}^{N} A_i e^{2\pi j \{x_i u + y_i u + [Z_2^0(u,v)C_2^0(z_i) + Z_4^0(u,v)C_4^0(z_i) + z_6^0(u,v)C_6^0(z_i)]\}}\}$$

(M1)

$A_i$ can be the electrical field weighting factor for the individual beamlet. $Z_m^0(u, v)$ and $C_m^0(z_i)$ can be the Zernike polynomials and Zernike coefficients, respectively, which can fulfill the defocusing functionality and can compensate the first-order and second-order spherical aberration due to defocusing. The expressions of Zm (u, v) and Cm(zi) are shown below. (See, e.g., Reference 5). A 2D coordinate calibration between the SLM phase hologram, and thus the projected beamlet pattern at the sample through Eq. M and the PMT image can be carried out on a pollen grain slide. By steering the beamlet to different positions with the SLM and recording the PMT image, an affine transformation can be extracted to map the coordinates between the PMT image and the image plane at the sample, and thus the SLM phase hologram through Eq. M1. For the axial defocusing, the defocusing length set in the SLM phase hologram can be matched with the actual defocusing length by adjusting the apparent "effective N.A." the Zernicke coefficients, after calibration following the procedure described in (See, e.g., Reference 49). This can be done mainly for convenience, and it can be noted that this can change very little over the full axial range of the SLM (e.g., a range of 0.43-0.48). In multiplane imaging, the field weighting factor $A_i$ in Eq. M1 can determine the power ratio, of different imaging planes. It can be important to note that this coefficient may not be simply the desired power ratio rather it can affect the interference between the different fields, which in turn can depend on the relative phase displacements of the beams. Operationally, either the parameter can be adjusted empirically to achieve similar fluorescent signals from different imaging planes, or alternately, the expected power ratio from first principles can be calculated, considering the depths of each plane, nominal scattering length of light in the tissue, and perform numerical beam propagation of the electric field (See, e.g., Reference 54).

Visual stimuli were generated using MATLAB (e.g., The MathWorks, Natick, Mass.) and the Psychophysics Toolbox (see, e.g., Reference 12) and displayed on a liquid crystal display ("LCD") monitor (e.g., 19-inch, 60-Hz refresh rate) position 28 cm from the right eye, at approximately 45° to the long axis of the animal. Each visual stimuli session consisted of 8 different trials, each trial with a 3 s drifting square gratings (e.g., 100% contrast, 0.035 cycles per degree, two cycles per second) display, followed by 5 s of mean luminescence gray screen. 8 drifting directions (e.g., separated by 45 degrees) were presented in random order in the 8 trials in each session. 17 sessions were recorded continuously (e.g., 1088 s). A silicon photodetector (e.g., Thorlabs DET 36A) can be placed at the corner of the LCD to monitor the visual stimulation display. The detector output was recorded simultaneously with the imaging data at ScanImage 3.8. The neuronal responses to the visual stimulation can then be extracted and analyzed in the subsequent image processing.

Exemplary Image Analysis and Source Separation Procedure

The raw images can first be processed to correct brain motion artifacts using an exemplary pyramid procedure (see, e.g., Reference 60), and then analyzed using a constrained non-negative matrix factorization procedure, coded in MAT- LAB (e.g., The MathWorks, Natick, Mass.). The core of the CNMF can be that spatiotemporal fluorescence signals F from the whole recording can be expressed as a product of two matrices: (i) a spatial matrix A that encodes the location of each ROI and (ii) a temporal matrix C that characterizes the fluorescent signal of each ROI as well as the background B, expressed as F=AC+B.

Figure 6B:
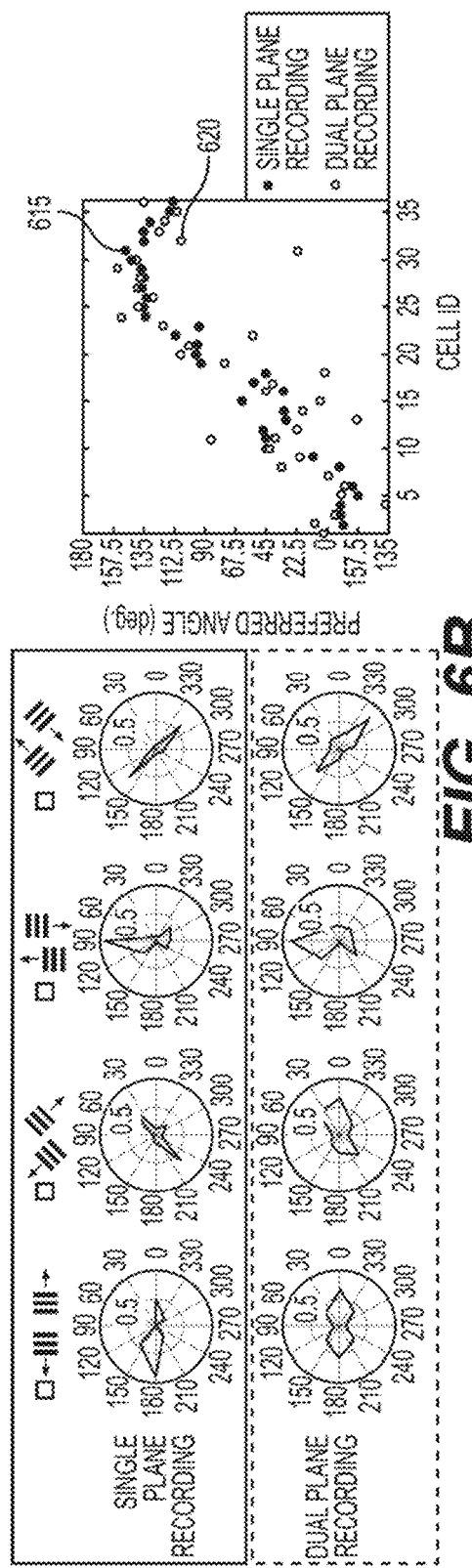
FIG. 6B is an exemplary diagram and an exemplary chart illustrating of the response of the ROIs to the drifting grating in visual stimulation according to an exemplary embodiment of the present disclosure.

This can be solved as a convex optimization problem, and the assumption that both matrices can be sparse such that they can promote localized spatiotemporal footprints. As shown in the graph of FIG. 6B, the individual single plane recordings 615 can first be analyzed. (see, e.g., Reference 46), and the characteristics of each ROI can then be used as initial estimates for the sources in the analysis of the multiplane recording (e.g., dual plane recording 620).

Exemplary Evaluation of CNMF and Comparison with ICA

To evaluate the signals extracted from CNMF, they can be compared with the signal extracted in a conventional manner. To obtain the latter signal, the spatial pixels of each ROI, which do not overlap with other ROIs, can be extracted. Raw temporal signals from these pixels can be averaged with a unitary weight, followed by a subtraction of the background baseline obtained from CNMF. This can be termed as non-overlapped ("NOL") signal. This can be what the conventional fluorescent extraction procedure would do except that the background baseline can be further subtracted.

The signals extracted from CNMF can be compared with the NOL signals in two aspects: similarity and signal-to-noise ratio ("SNR"). The SNR can be calculated based on the signal's power spectral density.

ICA was also performed to analyze the data, with the software written in Matlab (See, e.g., Reference 39). The motion-corrected image recording stack can first be normalized, followed by principal component analysis ("PCA") for dimensionality reduction and noise removal. ICA can then be applied to extract the spatio-temporal information of each independent sources (e.g., ROI).

Figure 2H:
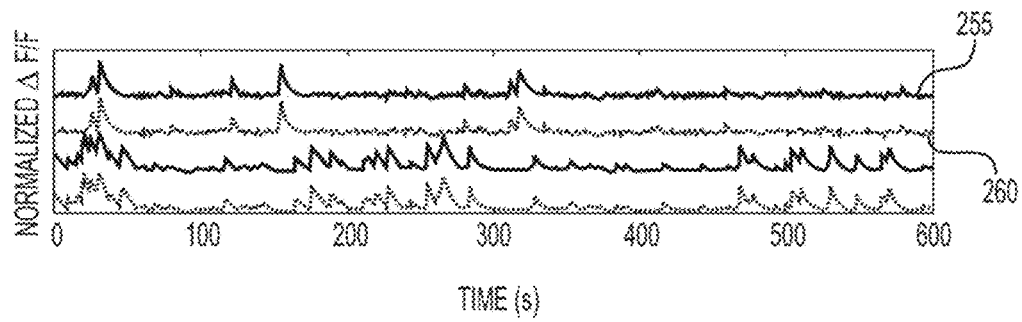

Exemplary Analysis of the Cell Orientation Selectivity of the Drifting Grating Visual Stimulation To analyze the orientation and direction selectivity of the ROIs in response to the drifting grating visual stimulation, the total number of events can be counted during the visual stimulation period in each session for all 8 different grating angles. These event numbers can be into a vector space (See, e.g., Reference 38). The direction and magnitude of their vector sum can represent the orientation selectivity and the orientation index. With $N_{visualsession}$ visual stimulation sessions, $N_{visualsession}$ vectors can be obtained. Hotelling's $T^2$-test can be used to calculate whether these vectors can be significantly different from 0, for example, whether the ROI has a strong orientation selectivity. Only ROIs with their vectors significantly different from 0 (e.g., less than 0.25 probability that null 0 can be true) in the single plane recording can be selected, and their orientation selectivity can be calculated by averaging the $N_{visualsession}$ vectors and extracting the angle (e.g., $N_{visualsession}=17$ for the experiment shown in FIGS. 6A-6D2).

The maximal lateral displacement of the incoming beam can be controlled by the familiar grating equation (See, e.g., References 46 and 65):

$$m\lambda = d \cdot \sin(\theta) \qquad (S1)$$

where m can be the diffraction order, $\lambda$ the wavelength of the light, d, the feature spacing, d, the angle of deflection. Only the first order m=1, and the imaging wavelength can be 940 nm. For a pixelated device, the smallest periodic feature can consist of two pixels, each of which can be 15 μm. Thus d=30 μm. The maximum SLM induced deflection angle can be related to the maximum lateral displacement from the center of the FOV in the sample plane, $r_{max}$, through the following relations:

$$r = f_{obj} \cdot \tan(\theta_{obj}) \qquad (S2)$$

$$\theta_{obj} = \theta_{SLM} \cdot \left[\frac{1}{M_{SLM}}\right] \cdot \left[\frac{1}{M_{scope}}\right].$$

For the exemplary system, with a 25× objective, this can correspond to for example:

$$f_{obj} = f_{tubelens}/M_{obj} = 180 \text{ mm}/25 = 7.2 \text{ mm}$$

$$M_{SLM} = 400/100 = 4.0, M_{scope} = 50/180 = 0.278$$

$$\theta_{SLM}^{max} = \sin^{-1}\left(\frac{\lambda}{d_{min}}\right) = 1.8°$$

$$r_{max} = 252 \text{ μm}$$

Figures 7C, 7D:
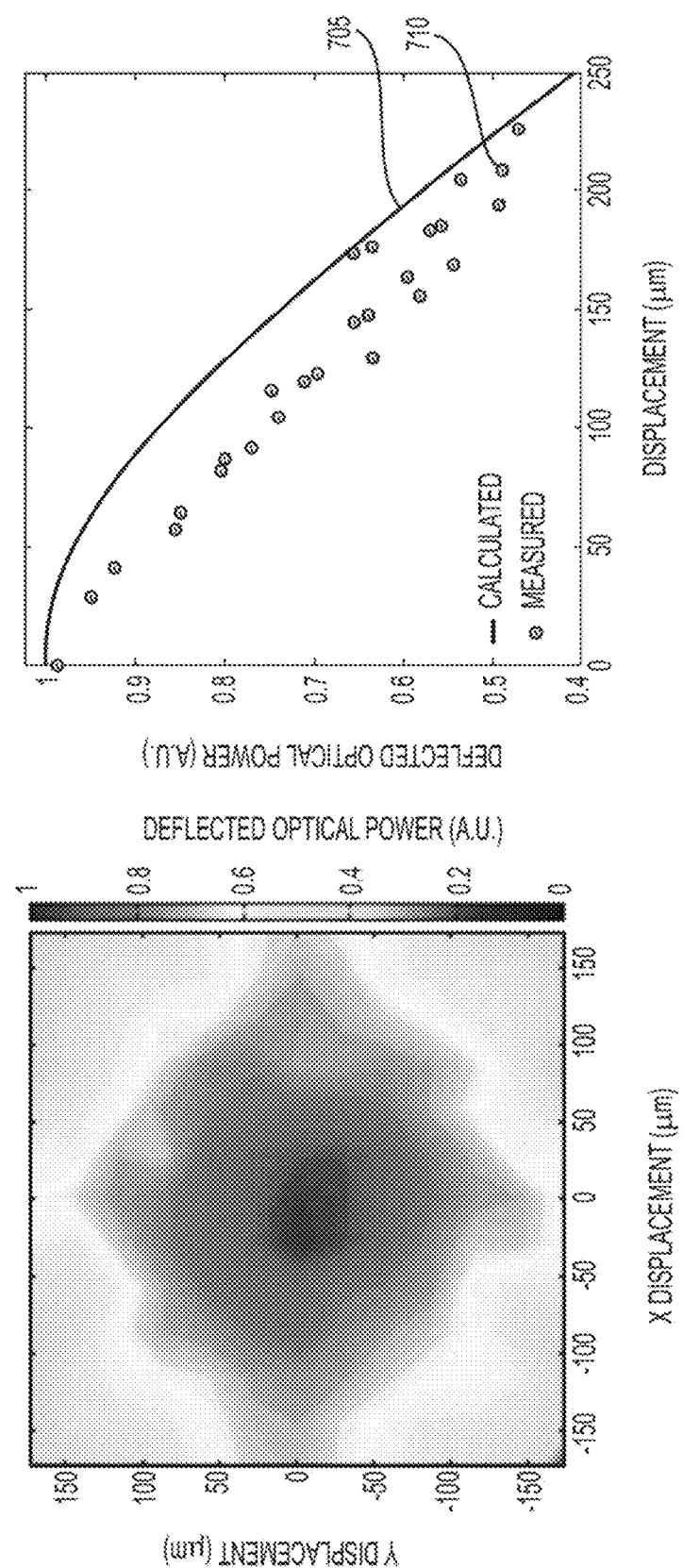
FIG. 7C is an exemplary graph illustrating SLM lateral deflection efficiency, measured from the optical power at the back aperture of the objective according to an exemplary embodiment of the present disclosure.
FIG. 7D is an exemplary graph illustrating calculated SLM lateral deflection efficiency according to an exemplary embodiment of the present disclosure.

For single point targeting, the efficiency of redirection can depend on the number of phase levels available on the SLM. The exemplary device was measured, and approximately 80 usable phase levels between 0 and $2\pi$ were found. (See, e.g., FIG. 7A). With the simplifying assumption that these levels can be uniformly spaced between 0 and $2\pi$, the first order diffractive efficiency of such a device can be given by for example:

$$\eta_1 = \left[\frac{\sin(\pi/N)}{\pi/N}\right]^2 \qquad (S3)$$

where N can be the total number of levels. (See e.g., Reference 42). This can imply very high efficiencies for holograms with large features (e.g., read spanning many pixels), which can result in small positional displacements in the sample (e.g., Fourier) plane. For larger sample plane displacements, the beneficial phase features can get smaller and smaller, and the finite sampling from the pixelated SLM can reduce the available phase levels. In the extreme case, there can be aliasing, which can strongly degrade the performance; (i) that limit can be avoided for all holograms used. Four pixels can be considered across a $\Delta 2\pi$ ramp to be the limit of efficient power redirection. The deflection vs. theoretical efficiency curve is shown in FIG. 7D, along with the measured relative SLM power deflection efficiency on the sample (See, e.g., FIGS. 7C and 7D). For pixelated SLMs, as shown in the graph of FIG. 7D which illustrates the calculated power 705 and the measured power 710, with quantized phase levels, the theoretical scalar beam redirection efficiency can be reduced for deflections with a non-integral number of pixels per phase ramp, but this effect can be small, as can be seen in the measured power on sample.

At $r_{max}$, the maximum possible lateral deflection, the pattern can have only two phase levels, which can lower the maximum diffraction efficiency, and additionally, can result in a symmetric phase pattern. Under these conditions, the phase "grating" may not be blazed, but instead can split the beam equally to the +1 and −1 orders; there can be two spots, mirrored across the nominal center of the FOV. This may not be a problem for dual lateral region imaging, where such a split can be in fact advantageous. However, if the desired effect can be to have a single targeted point on the sample, it can be best to restrict the lateral targeting to regions that can be address by phase gratings that span at least four pixels (e.g., levels). With four pixels blaze and two photon excitation, the excitation ratio of the +1 to −1 order can be ~20:1; for five pixels, approximately 50:1; and for eight pixels, approximately 350:1.

Similar relationships hold for axial displacement. In such exemplary case, the SLM can be used to impart a spherical curvature to the wavefront that can shift the focus before or beyond the nominal focal plane. For simplicity, only primary defocus can be considered here, neglecting higher order aberration terms.

For a phase wrapped device, this can correspond to a Fresnel phase profile. (See e.g., Reference 42):

$$\rho_p^2 = 2pf\lambda$$

With $\rho$, the normalized pupil radius, p, the Fresnel zone order, f, the focal length and $\lambda$ the wavelength. Each successive zone can correspond to adding one wave of defocus at that point on the pupil, which can also correspond to a $2\pi$ phase change. The "strongest" lens allowed without aliasing on the exemplary actual device can correspond to a two pixel spacing on the outermost Fresnel zone. For large p, it can be found that the relative spacing between zones can be, for example:

$$\Delta\rho_p = 2f\lambda/\rho_p \Rightarrow f = 2 \cdot d^2 \cdot \frac{N}{2\lambda} = 123 \text{ mm,}$$

with d the pixel size, and N the number of pixels on the device across the shortest dimension.

The sign off can be made positive or negative simply by reversing the phase. With this magnitude for the focal length on the SLM, and the exemplary intermediate optical scaling onto the objective back aperture (e.g., effective excitation NA approximately 0.45), this lens power can correspond to axial displacements of ±300 um under the objective. Any larger displacement can result in aliasing on the SLM, which can both reduce diffraction efficiency, as well as create secondary foci. For larger axial displacements, without aliasing, an SLM of the same overall all size with smaller pixels, or a larger overall SLM with more pixels, or both, would be beneficial.

For a physically larger SLM, there can be demagnification to scale the SLM to the appropriate size on the back aperture of the objective; thus the image of the SLM on the back aperture can have higher pixel density. The exemplary preference can be to have more pixels rather than smaller pixels (e.g., smaller pixels typically have lower fill factors, and larger pixels can have increased power handling, as the overall power density on the physical device can be decreased with increasing SLM area). The fill factor can be important for two reasons. The first can be the overall power transmission to the diffracted beam, which can be directly proportional to the fill factor. The second reason can be more subtle.

For a given diffraction pattern, having fill factors less than one can alter the diffraction period cell length compared to the structural cell length, which can broaden the far-field envelope that governs the relative efficiencies between different diffraction orders. As a result, power can be transferred from the desired first order into higher orders, may not be available for excitation and can generate spurious background signals. (See e.g., Reference 42).

Exemplary Chromatic Effects

Figure 7F:
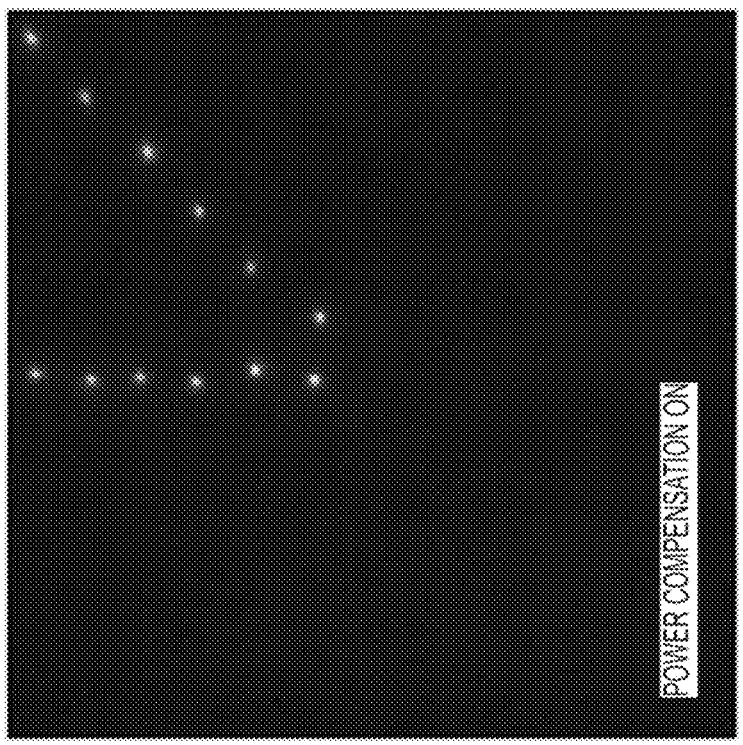
FIG. 7F is an image of 12 spots generated by about SLM simultaneously imaged on CCD with power compensation for each spot for SLM lateral deflection efficiency according to an exemplary embodiment of the present disclosure.
Figure 7E:
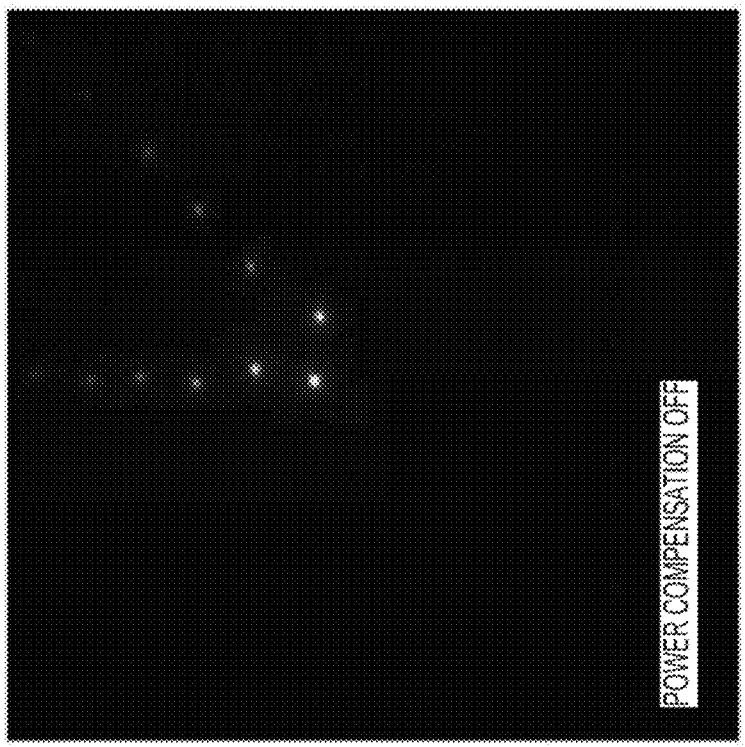
FIG. 7E is an exemplary image of 12 spots generated by SLM simultaneously imaged on a CCD according to an exemplary embodiment of the present disclosure.

SLMs can be diffractive optics, so they can be chromatic devices where beam redirection can depend on wavelength, (See, e.g., Equation (S1)). Thus any non-monochromatic source (e.g. femtosecond pulsed laser) can exhibit chromatic effects. The relationship connecting bandwidth to pulse width can be $\Delta v \Delta t \geq K$, with $K=0.315$ for the hyperbolic secant-squared shaped pulses from most Ti-Sapphire lasers. (See, e.g., Reference 26 and 68). The exemplary laser produced transform limited pulses of 140 fs, which means the FWHM of the nominally 940 nm beam can be 6.5 nm. Considering the blue and red edge of this spectral profile, for displacements in the x-y plane, there can be a shift in lateral position with across the spectrum. For the largest lateral displacements used, the relative shift for these components can be less than 1.5 µm. Nonetheless, because the nominal diffraction limited spot can be of comparable size, this can lead to a minor loss in lateral resolution, as well as a drop in peak intensity at the margins of the FOV. The reduced intensity can be compensated with appropriate weighting of the targets during hologram calculation (see, e.g., FIGS. 7E and 7F), but the "blur" cannot.

In the exemplary analysis for lateral deflections, variations in phase efficiency from shifts in the optimal phase depth as a function of wavelength were ignored. These can result from both a wavelength dependent retardation in the liquid crystal itself; the liquid crystals used in the exemplary SLM have only very minor variation in refractive index as a function of wavelength around the exemplary chosen center (e.g., private communication, Meadowlark).

For axial focusing, this effect can also be ignored. The relative efficiency of a diffractive lens as a function of wavelength can be (see e.g., Reference 42), for example:

$$\eta = \frac{\sin^2[\pi(\alpha - m)]}{[\pi(\alpha - m)]^2}, \text{ with } \alpha = \frac{\lambda_0}{\lambda}\left[\frac{n(\lambda) - 1}{n(\lambda_0) - 1}\right],$$

and m the diffraction order. For the bandwidth of the exemplary laser, $$n(\lambda) \approx \text{constant}, \Rightarrow \alpha = \frac{\lambda}{\lambda_0} \Rightarrow [0.995 \leq \alpha \leq 1] \; \eta \Rightarrow [0.998 \leq \eta \leq 1]$$

for lenses operating in the first order, or a change in efficiency of 0.2%. The focal length can change with the wavelength, and axial color can be similar, and proportional to $$\frac{\lambda}{\lambda_0}.$$

For the effective excitation NA used for functional imaging, NA approximately 0.45, the FWHM of the axial two photon point spread function can be approximately 6.5 µm (See, e.g., References 64 and 69). For the largest displacement used, approximately 300 µm, the axial color across the FWHM of the laser spectrum can be approximately 2 µm, which represents a total shift of 25% of the axial PSF. This can have a negligible effect on the axial resolution, and power delivery for somatic imaging. Assuming the excitation NA can be changed, the relative effect of the axial color can be invariant with NA, though the absolute sizes of everything scale as $NA^2$.

Figure 8A:
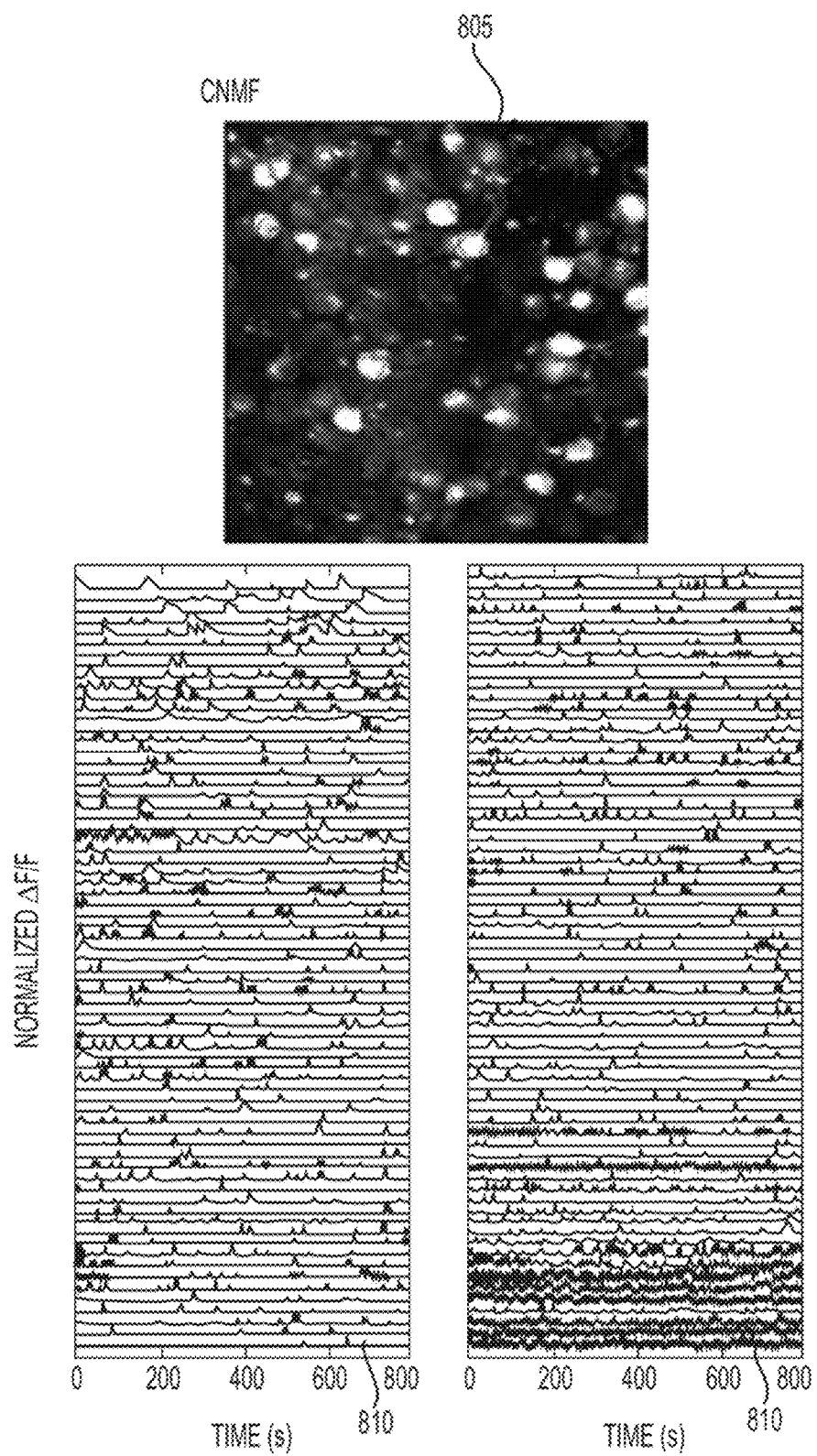
FIGS. 8A and 8B are exemplary ROI contour and calcium signals according to an exemplary embodiment of the present disclosure.
Figure 8B:
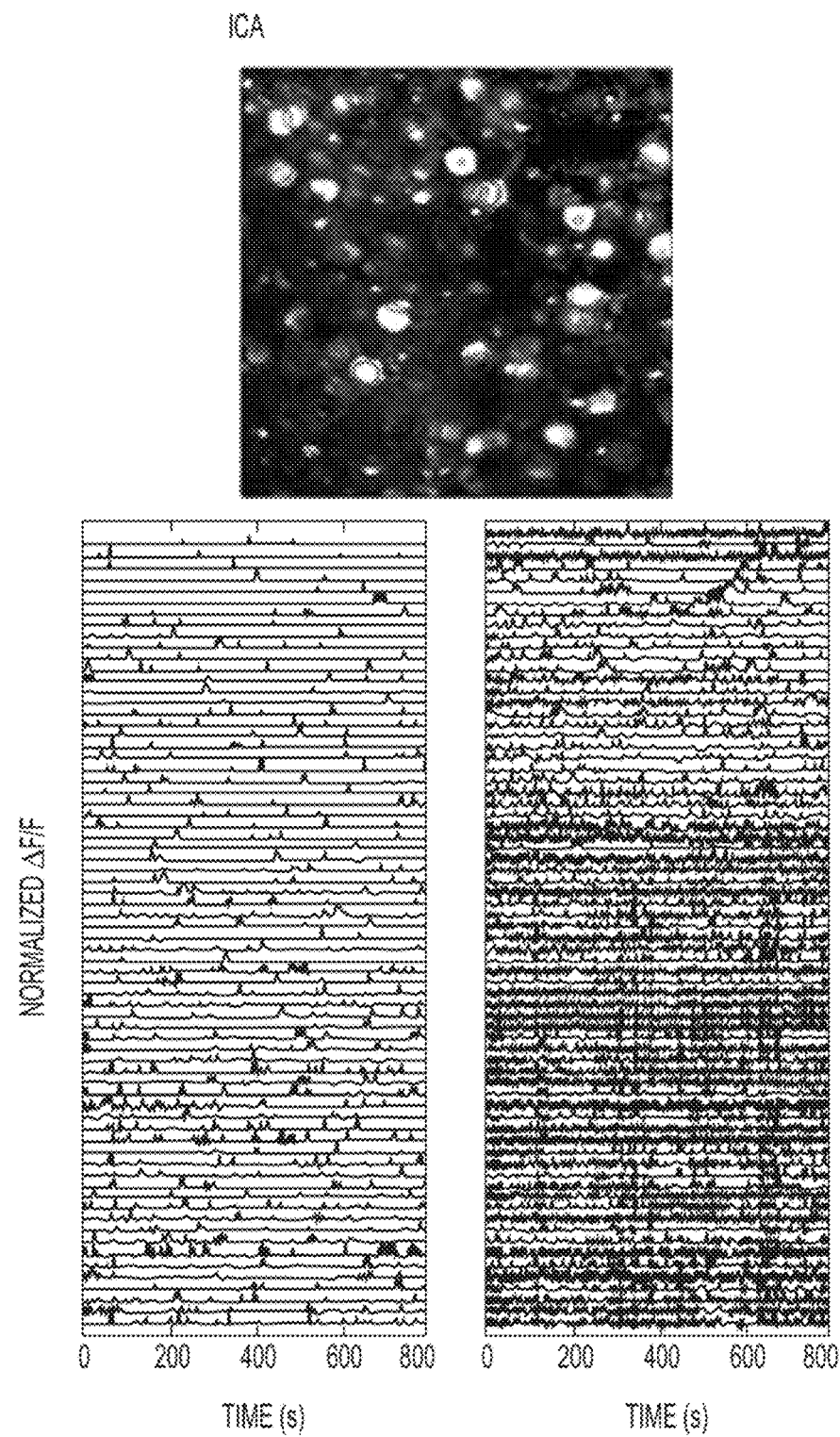

FIGS. 8A and 8B are shows ROI contour and calcium signals according to an exemplary embodiment of the present disclosure. For example, as illustrated in FIG. 8A the ROI contour and calcium signal extracted by CNMF. Element 805 is the contour overlaid on the temporal standard deviation image of a single plane recording of mouse V1 at depth of 500 µm for cortical surface. Traces 810 are the normalized ΔF/F traces with a scale bar of 50 µm. Clean, cell like features can be selected, and the great majority of traces have signals with high SNR, and that appear like familiar Ca++ activity traces. FIG. 8B is similar to FIG. 8A, with ROI contour and calcium signal extracted by ICA. The ROIs can be less cell-like, and a large number of extracted traces show poor SNR, with no features recognizable as typical activity traces.

Exemplary Power Directed to Each Layer

The mouse brain can be highly scattering, and there can be an exponential loss of ballistic photons with increasing depth. The nominal intensity in the focus as a function of depth can be given by $$I_d = I_0 \exp\left[\frac{-d}{l_s}\right],$$

where $I_0$ can be the incident intensity at the surface of the brain, d, the depth, and $I_s$, the characteristic scattering length. For 940 nm, the scattering length can be approximately 185 µm (See, e.g., References 27 and 70). Below the saturation limit, two-photon fluorescence signal can scale as the intensity squared. If it can be assumed that the expression of the indicator can be the same in the desired layers for imaging, the relative power needed to be delivered to each layer to give equivalent signal can be estimated as, for example:

$$F_1 \propto \sigma\left(I_{01} \cdot \exp\left[\frac{-d_1}{l_s}\right]\right)^2, F_2 \propto \sigma\left(I_{02} \cdot \exp\left[\frac{-d_2}{l_s}\right]\right),$$

$$F_1 \approx F_2 \Rightarrow \left(I_{01} \cdot \exp\left[\frac{-d_1}{l_s}\right]\right)^2 = \left(I_{02} \cdot \exp\left[\frac{-d_2}{l_s}\right]\right)^2,$$

$$\frac{I_{01}}{I_{02}} = \sqrt{\exp\left[\frac{-2(d_2 - d_1)}{l_s}\right]}$$

For the experiment shown in FIGS. 3A-3I, this ratio can be as follows:

$$\frac{I_{01}}{I_{02}} = \sqrt{\exp\left[\frac{-2(500 - 170)}{185}\right]} = 0.168,$$

$$I_{02} \approx 6 \cdot I_{01}$$

This can be combined with the measured displacement efficiency curve (see, e.g., graph shown in FIG. 7B) to flexibly set the appropriate weights for each plane in the hologram computation.

FIGS. 10A-10O show the Axial Three Plane in-vivo Functional Imaging of Mouse V1 at Layer 2/3, 4 and 5, and Extended Simultaneous Imaging Depth over 500 µm. For example, the top panels of FIGS. 10A-10C show, temporal standard deviation images of the sequential single plane recording of mouse V1 at depth of 170 µm (e.g., layer 2/3), 350 µm (e.g., layer 4) and 500 µm (e.g., layer 5) from a pial surface. The bottom panels of FIGS. 10A-10C show ROI contours overlaid on the top panel. The images are false-colored. Scale bar, 50 µm. FIG. 10D shows an image of the arithmetic sum of FIGS. 10A-10C. The top panel of FIG. 10E shows the temporal standard deviation imaging of the simultaneous three-plane recording of the planes shown in FIGS. 10A-10C. The bottom panel of FIG. 10E shows an exemplary image of overlaid ROI contours from the three plane. FIG. 10F shows a trace diagram with represented extracted ΔF/F traces of the selected ROIs from the three planes (e.g., trace 1005, layer 2/3, 15 ROIs out of 58; trace 1010, layer 4, 15 ROIs out of 65; trace 1015, layer 5, 15 ROIs out of 95), from the sequential single plane recording.

Figure 10G:
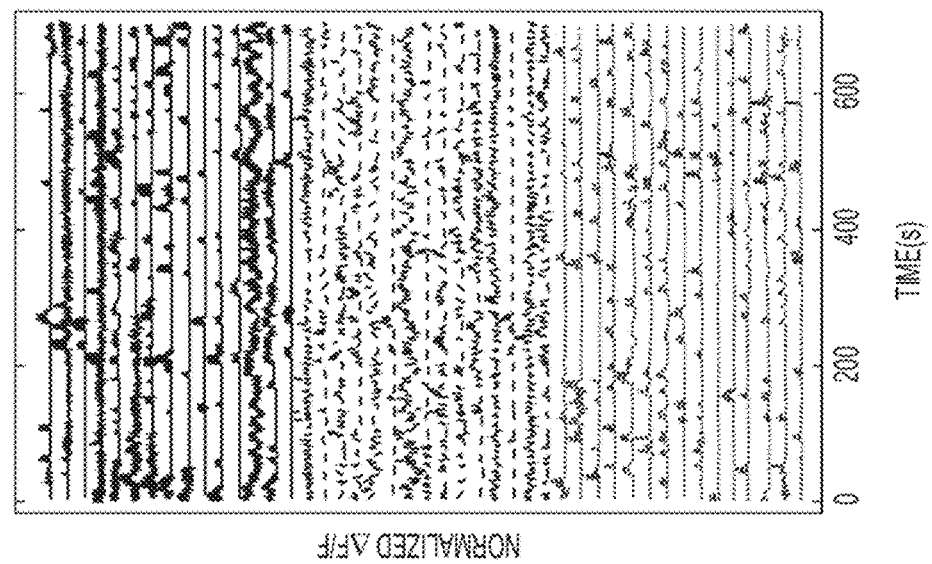
Figure 10F:
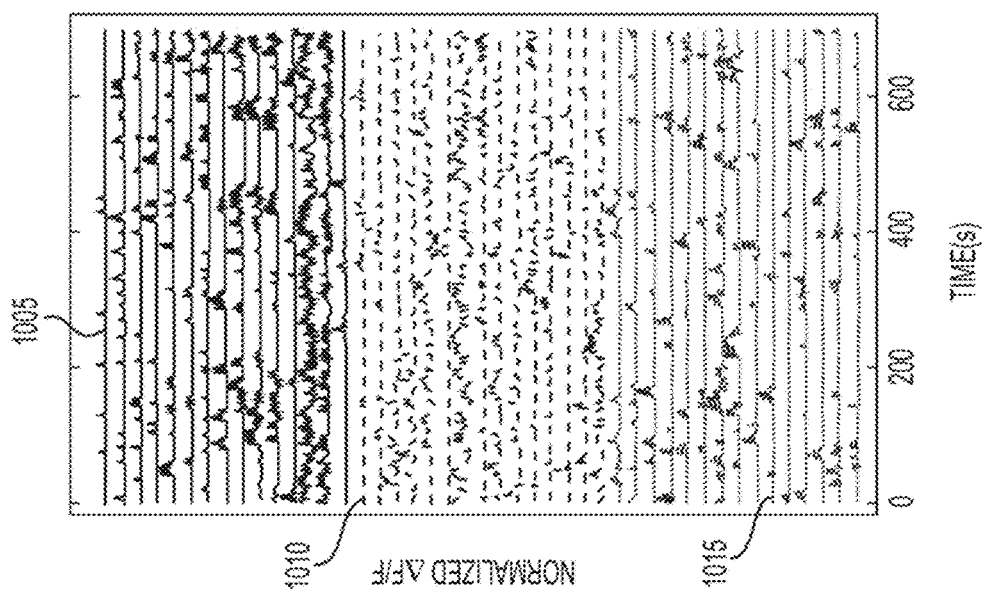
Figure 10H:
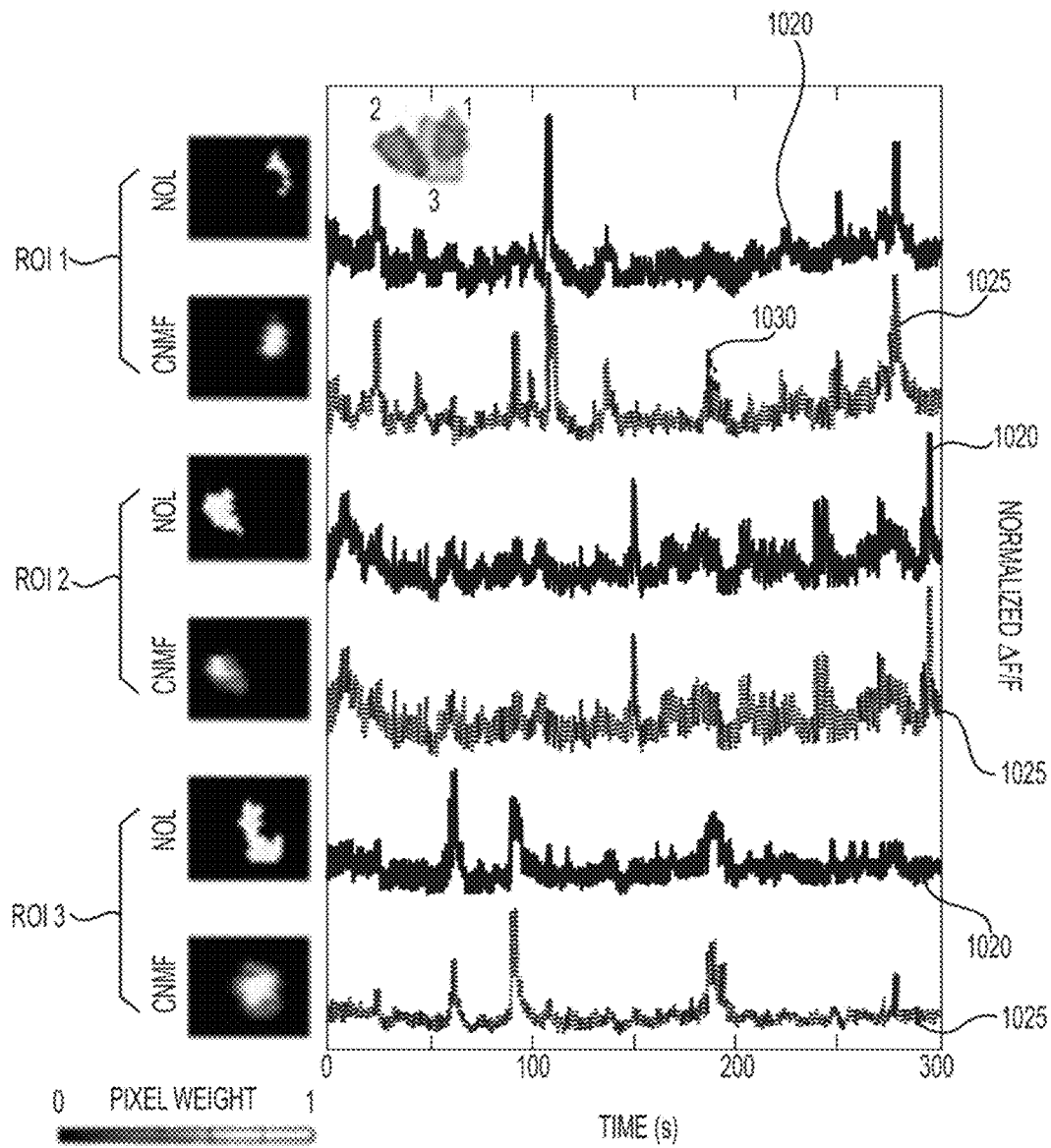

FIG. 10G shows an exemplary trace diagram of extracted ΔF/F traces of the same ROIs shown in FIG. 10F, from the simultaneous three-plane recording. FIG. 10H shows an exemplary diagram of the source separation of the fluorescent signal from spatially overlapped ROIs in the three plane imaging. The contours of the overlapped ROIs are plotted with their ROI ID. The calcium traces are normalized ΔF/F traces. For each ROI, the signal is extracted using NOL shown by element 1020, and CNMF by element 1025. The corresponding ROI contours results from these methods are shown next to their ΔF/F traces. Using the ROI contour in the CNMF but with uniformed pixel weighting and without unmixing treatment, the extracted ΔF/F trace 1030 is plotted, superimposed onto the traces extracted from CNMF.

FIG. 10I shows an exemplary diagram of the simultaneous three-plane imaging extending the imaging depth over 500 µm. FIG. 10J shows an exemplary overlaid temporal standard deviation image of the sequential single plane recording of mouse V1 at depth of 130 µm (e.g., element 1035), 430 µm (e.g., element 1040) and 640 µm (e.g., element 1045) from pial surface of a mouse V1 with a scale bar of 50 µm. FIG. 10K shows an exemplary temporal standard deviation imaging of the simultaneous three-plane recording of the three planes. FIG. 10L shows an exemplary image of the overlaid ROI contours from the three plane on FIG. 10J, while FIG. 10M shows the extracted ROI contours. FIG. 10N shows represented extracted ΔF/F traces of the selected ROIs from the three planes (e.g., trace 1045, layer 2/3; trace 1050, layer 4; trace 1055, layer 5), from the sequential single plane recording. FIG. 10O shows the extracted ΔF/F traces of the same ROIs shown in FIG. 10N, from the simultaneous three-plane recording.

Figure 11A:
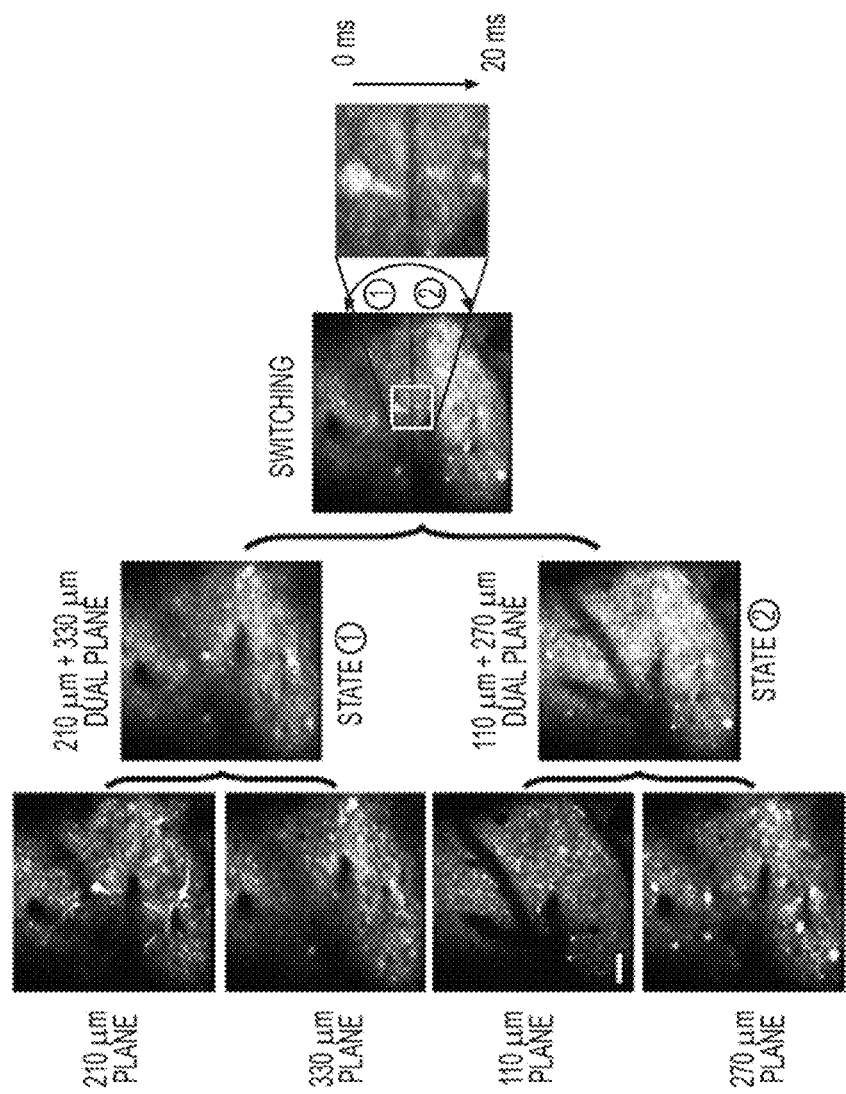
FIG. 11A is a set of exemplary images of SLM switching between two sets of dual plane imaging on mouse V1 according to an exemplary embodiment of the present disclosure.
Figure 11B:
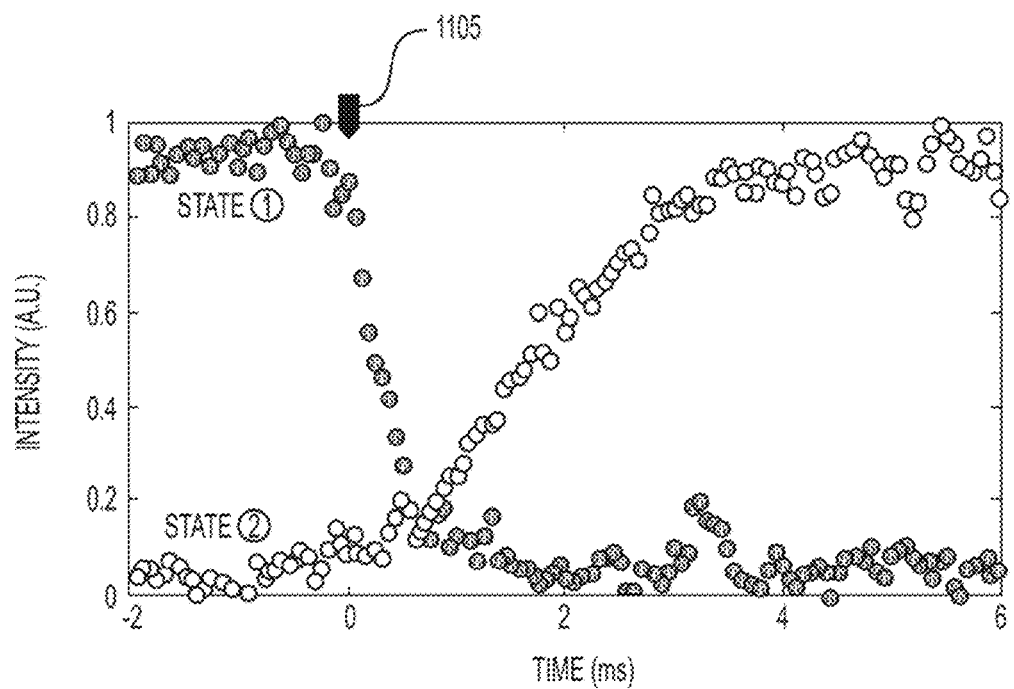
FIG. 11B is an exemplary chart illustrating switching time between State 1 and State 2, measured from fluorescent signal emitted from Rhodamine 6G according to an exemplary embodiment of the present disclosure.

FIG. 11A shows an exemplary diagram of SLM switching between two sets of dual plane imaging on mouse V1. State 1 is the dual plane for depth of 210 µm and 330 µm from cortical surface, and state 2 is the dual plane for depth of 110 µm and 270 µm from pial surface. Imaging frame rate is 10 fps. The SLM switching happens at the middle and at the end of each frame. The zoom-in-view of the switching region shows that the switching time between the two state is less than 2.5 ms.

Figure 11C:
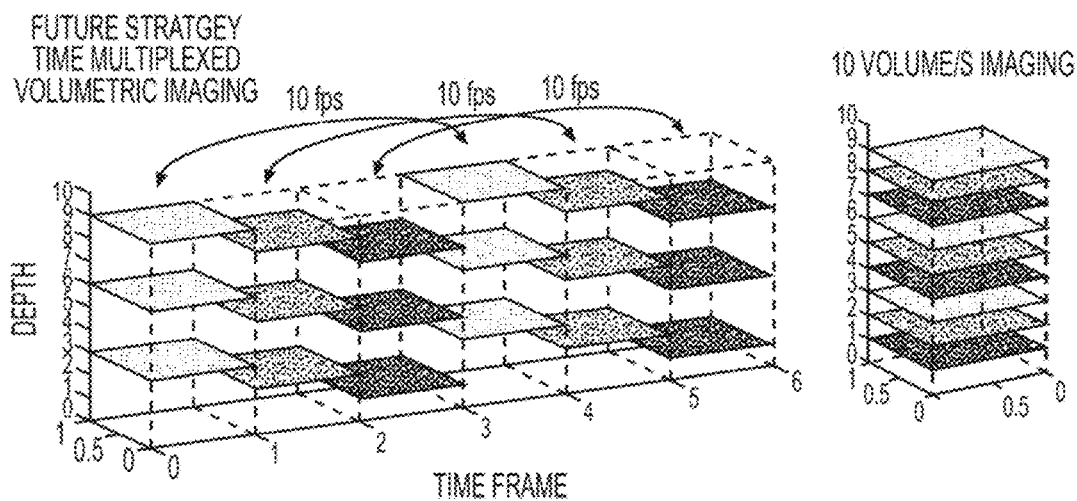
FIG. 11C is an exemplary diagram of a volumetric imaging procedure using time-multiplexed three-plane imaging according to an exemplary embodiment of the present disclosure.
Figure 12:
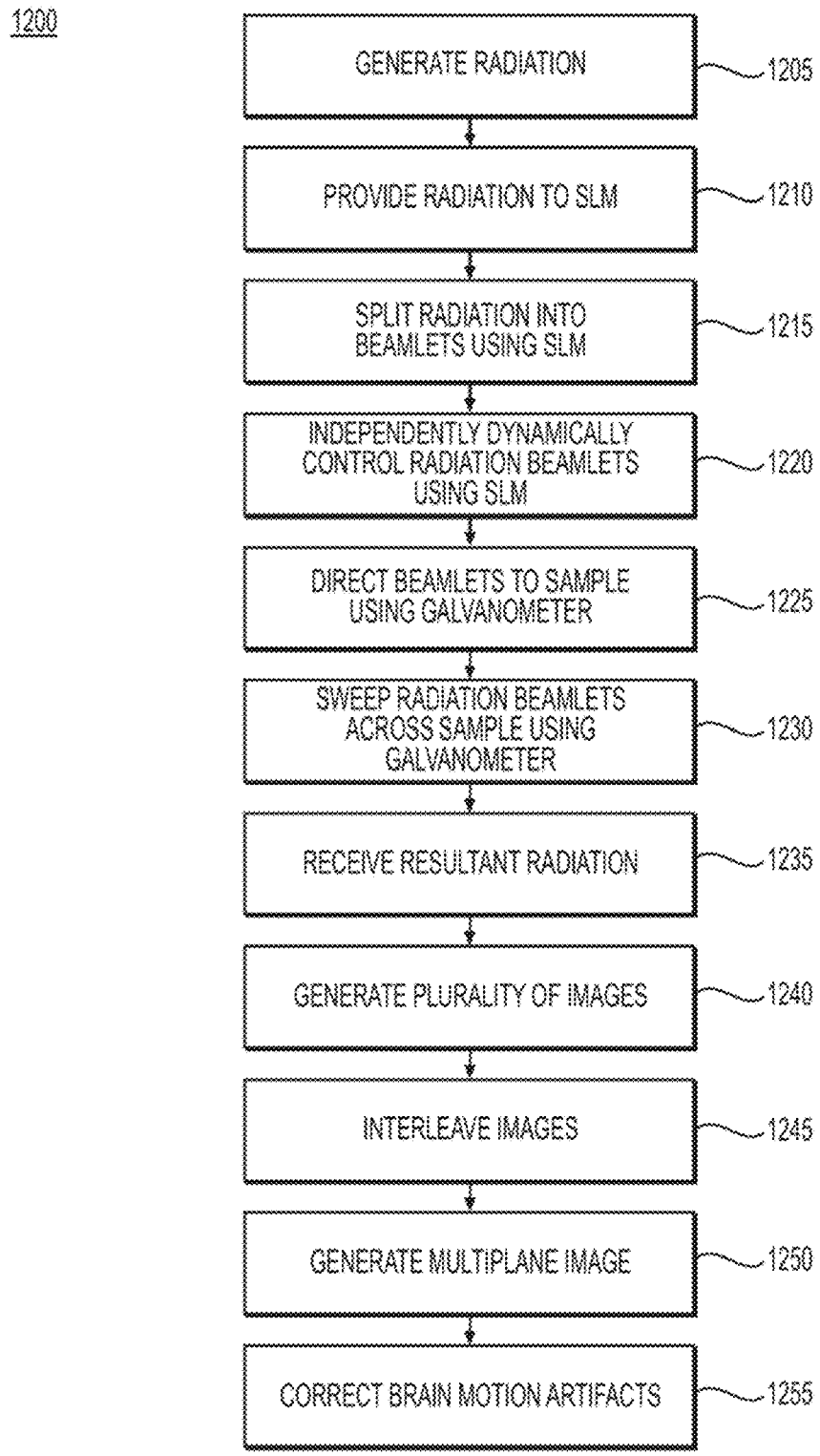
FIG. 12 is an illustration of an exemplary block diagram of an exemplary system in accordance with certain exemplary embodiments of the present disclosure.

FIG. 11B shows a graph of the switching time between State 1 and State 2, measure from fluorescent signal emitted from Rhodamine 6G. The switching time between different states is less than 3 ms. The black indicator 1105 indicates when the switching starts. FIG. 11C shows a diagram of a volumetric imaging procedure using time-multiplexed three-plane imaging. In this example, the normal frame rate is 30 fps. With time-multiplexing between different sets of three-plane imaging, the volumetric imaging rate is 10 vol/s.

Figure 13:
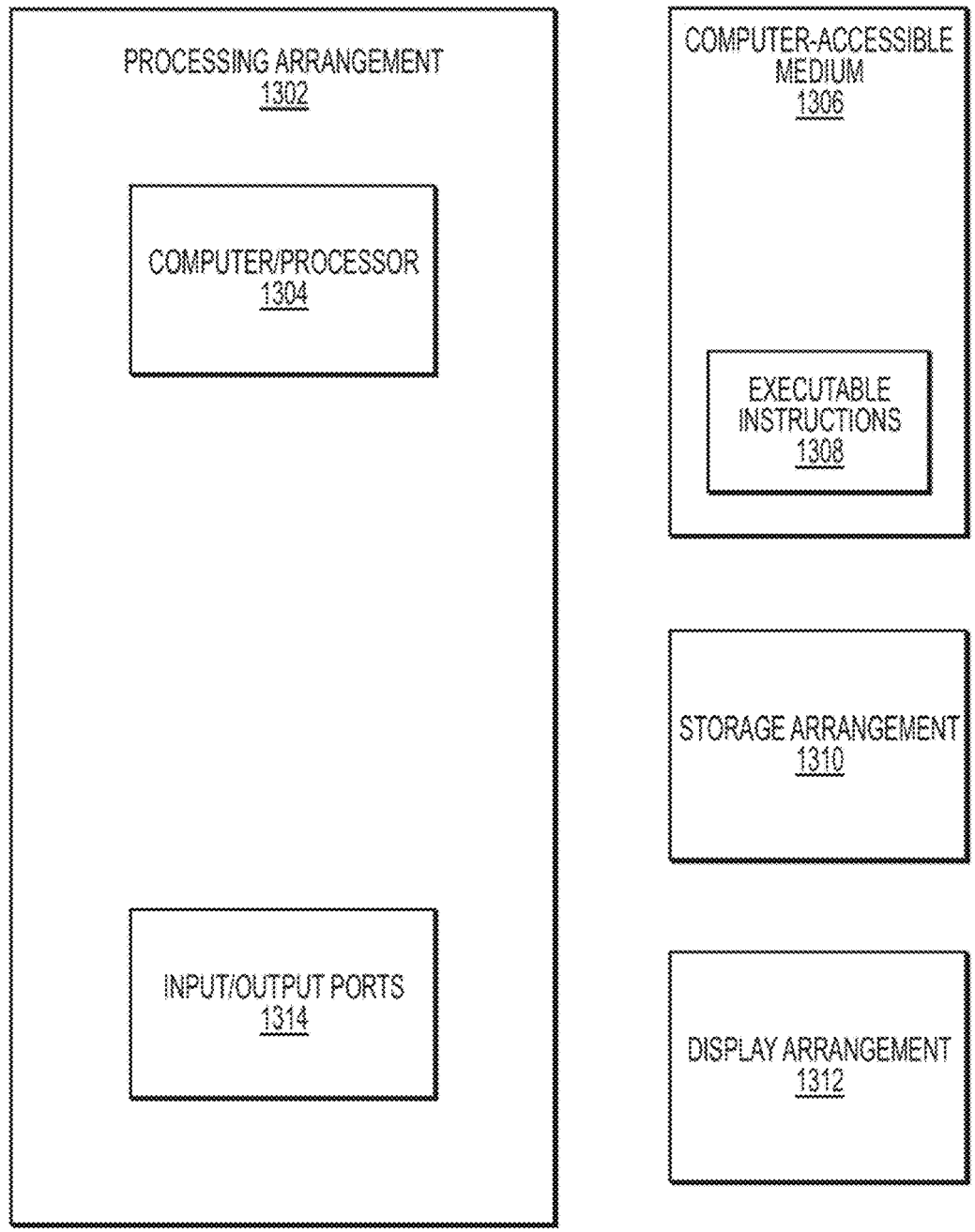
FIG. 13 is a block diagram of an exemplary embodiment of a system according to the present disclosure.

FIG. 13 shows an exemplary method 1200 according to an exemplary embodiment of the present disclosure. For example, at procedure 1205, a radiation can be generated using, for example, a laser source. At procedure 1210, the generated radiation can be provided to a SLM, which can split the radiation into a plurality of radiation beamlets at procedure 1215. At procedure 1220, the SLM can independently dynamically control the radiation beamlets and provide them to a galvanometer. At procedure 1225, the beamlets can be directed to the sample using the galvanometer (e.g., to different areas and/or to different planes), which can be used to sweep the beamlets across the sample at or 1230. At procedure 1235, a resultant radiation can be received from the sample that can be based on the beamlets. At procedure 1240, a plurality of images can be generated based on the resultant radiation. At procedure 1245, the images can be interleaved, and one or more multiplane images can be generated at procedure 1250. At procedure 1255, brain motion artifacts can be corrected for in the one or more multiplane images. Additionally, or in the alternative, brain notion artifacts can be corrected for in the plurality of images before the one or more multiplane images are generated.

FIG. 13 shows a block diagram of an exemplary embodiment of a system according to the present disclosure. For example, exemplary procedures in accordance with the present disclosure described herein can be performed by a processing arrangement and/or a computing arrangement 1302. Such processing/computing arrangement 1302 can be, for example entirely or a part of, or include, but not limited to, a computer/processor 1304 that can include, for example one or more microprocessors, and use instructions stored on a computer-accessible medium (e.g., RAM, ROM, hard drive, or other storage device).

As shown in FIG. 13, for example a computer-accessible medium 1306 (e.g., as described herein above, a storage device such as a hard disk, floppy disk, memory stick, CD-ROM, RAM, ROM, etc., or a collection thereof) can be provided (e.g., in communication with the processing arrangement 1302). The computer-accessible medium 1306 can contain executable instructions 1308 thereon. In addition or alternatively, a storage arrangement 1310 can be provided separately from the computer-accessible medium 1306, which can provide the instructions to the processing arrangement 1302 so as to configure the processing arrangement to execute certain exemplary procedures, processes and methods, as described herein above, for example.

Further, the exemplary processing arrangement 1302 can be provided with or include an input/output arrangement 1314, which can include, for example a wired network, a wireless network, the internet, an intranet, a data collection probe, a sensor, etc. As shown in FIG. 13, the exemplary processing arrangement 1302 can be in communication with an exemplary display arrangement 1312, which, according to certain exemplary embodiments of the present disclosure, can be a touch-screen configured for inputting information to the processing arrangement in addition to outputting information from the processing arrangement, for example. Further, the exemplary display 1312 and/or a storage arrangement 1310 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by Reference herein above, it is explicitly incorporated herein in its entirety. All publications Referenced are incorporated herein by Reference in their entireties.

EXEMPLARY REFERENCES

The following References are hereby incorporated by Reference in their entirety.

1. Ahrens, M. B., Orger, M. B., Robson, D. N., Li, J. M., and Keller, P. J. (2013). Whole-brain functional imaging at cellular resolution using light-sheet microscopy. Nature Methods 10, 413-+.
2. Alivisatos, A. P., Andrews, A. M., Boyden, E. S., Chun, M., Church, G. M., Deisseroth, K., Donoghue, J. P., Fraser, S. E., Lippincott-Schwartz, J., Looger, L. L., et al. (2013a). Nanotools for Neuroscience and Brain Activity Mapping. Acs Nano 7, 1850-1866.
3. Alivisatos, A. P., Chun, M., Church, G. M., Deisseroth, K., Donoghue, J. P., Greenspan, R. J., McEuen, P. L., Roukes, M. L., Sejnowski, T. J., Weiss, P. S., et al. (2013b). The Brain Activity Map. Science 339, 1284-1285. Alivisatos, A. P., Chun, M., Church, G. M., Greenspan, R. J., Roukes, M. L., and Yuste, R. (2012). The Brain Activity Map Project and the Challenge of Functional Connectomics. Neuron 74, 970-974.
4. Andresen, V., Egner, A., and Hell, S. W. (2001). Time-multiplexed multifocal multiphoton microscope. Optics Letters 26, 75-77.
5. Anselmi, F., Ventalon, C., Begue, A., Ogden, D., and Emiliani, V. (2011). Three-dimensional imaging and photostimulation by remote-focusing and holographic light patterning. Proceedings of the National Academy of Sciences of the United States of America 108, 19504-19509.
6. Bahlmann, K., So, P. T. C., Kirber, M., Reich, R., Kosicki, B., McGonagle, W., and Bellve, K. (2007). Multifocal multiphoton microscopy (MMM) at a frame rate beyond 600 Hz. Optics Express 15, 10991-10998. Beaurepaire, E., and Mertz, J. (2002). Epifluorescence collection in two-photon microscopy. Applied Optics 41, 5376-5382.
7. Beckmann, C. F., and Smith, S. A. (2004). Probabilistic independent component analysis for functional magnetic resonance imaging. Ieee Transactions on Medical Imaging 23, 137-152.
8. Bewersdorf, J., Pick, R., and Hell, S. W. (1998). Multifocal multiphoton microscopy. Optics Letters 23, 655-657.
9. Botcherby, E. J., Juskaitis, R., Booth, M. J., and Wilson, T. (2008). An optical technique for remote focusing in microscopy. Optics Communications 281, 880-887.
10. Botcherby, E. J., Juskaitis, R., and Wilson, T. (2006). Scanning two photon fluorescence microscopy with extended depth of field. Optics Communications 268, 253-260.
11. Botcherby, E. J., Smith, C. W., Kohl, M. M., Debarre, D., Booth, M. J., Juskaitis, R., Paulsen, O., and Wilson, T. (2012). Aberration-free three-dimensional multiphoton imaging of neuronal activity at kHz rates. Proceedings of the National Academy of Sciences of the United States of America 109, 2919-2924. Bowsher, J. E., Johnson, V. E., Turkington, T. G., Jaszczak, R. J., Floyd, C. E., and Coleman, R. E. (1996). Bayesian reconstruction and use of anatomical a Priori information for emission tomography. Ieee Transactions on Medical Imaging 15, 673-686.

12. Brainard, D. H. (1997). The psychophysics toolbox. Spatial Vision 10, 433-436.
13. Cha, J. W., Singh, V. R., Kim, K. H., Subramanian, J., Peng, Q., Yu, H., Nedivi, E., and So, P. T. C. (2014). Reassignment of Scattered Emission Photons in Multifocal Multiphoton Microscopy. Scientific Reports 4. Chen, G.-H., Tang, J., and Leng, S. (2008). Prior image constrained compressed sensing (PICCS): A method to accurately reconstruct dynamic CT images from highly undersampled projection data sets. Medical Physics 35, 660-663.
14. Chen, T. W., Wardill, T. J., Sun, Y., Pulver, S. R., Renninger, S. L., Baohan, A., Schreiter, E. R., Kerr, R. A., Orger, M. B., Jayaraman, V., et al. (2013). Ultrasensitive fluorescent proteins for imaging neuronal activity. Nature 499, 295-+.
15. Cheng, A., Goncalves, J. T., Golshani, P., Arisaka, K., and Portera-Cailliau, C. (2011). Simultaneous two-photon calcium imaging at different depths with spatiotemporal multiplexing. Nature Methods 8, 139-U158.
16. Ducros, M., Houssen, Y. G., Bradley, J., de Sars, V., and Charpak, S. (2013). Encoded multisite two-photon microscopy. Proceedings of the National Academy of Sciences of the United States of America 110, 13138-13143.
17. Dunn, A. K. (2014). Optical Properties of Neural Tissue. In Optical Imaging of Neocortical 18. Dynamics, B. Weber, and F. Helmchen, eds., pp. 33-51.
19. Egner, A., and Hell, S. W. (2000). Time multiplexing and parallelization in multifocal multiphoton microscopy. Journal of the Optical Society of America a-Optics Image Science and Vision 17, 1192-1201. Fahrbach, F. O., Gurchenkov, V., Alessandri, K., Nassoy, P., and Rohrbach, A. (2013). Light-sheet microscopy in thick media using scanned Bessel beams and two-photon fluorescence excitation. Optics Express 21, 13824-13839.
20. Fittinghoff, D. N., Wiseman, P. W., and Squier, J. A. (2000). Widefield multiphoton and temporally decorrelated multifocal multiphoton microscopy. Optics Express 7, 273-279.
21. Fricke, M., and Nielsen, T. (2005). Two-dimensional imaging without scanning by multifocal multiphoton microscopy. Applied Optics 44, 2984-2988.
22. Golan, L., Reutsky, I., Farah, N., and Shoham, S. (2009). Design and characteristics of holographic neural photostimulation systems. Journal of Neural Engineering 6.
23. Grewe, B. F., Langer, D., Kasper, H., Kampa, B. M., and Helmchen, F. (2010). High-speed in vivo calcium imaging reveals neuronal network activity with near-millisecond precision. Nature Methods 7, 399-U391. Grewe, B. F., Voigt, F. F., van 't Hoff, M., and Helmchen, F. (2011). Fast two-layer two-photon imaging of neuronal cell populations using an electrically tunable lens. Biomedical optics express 2, 2035-2046. Helmchen, F., and Denk, W. (2005). Deep tissue two-photon microscopy. Nature Methods 2, 932-940. Helmstaedter, M., Sakmann, B., and Feldmeyer, D. (2009). Neuronal Correlates of Local, Lateral, and Translaminar Inhibition with 24. Reference to Cortical Columns. Cerebral Cortex 19, 926-937.
25. Helmstaedter, M., Staiger, J. F., Sakmann, B., and Feldmeyer, D. (2008). Efficient recruitment of layer 2/3 interneurons by layer 4 input in single columns of rat somatosensory cortex. Journal of Neuroscience 28, 8273-8284.
26. Hirlimann, C. (2005). Femtosecond Laser Pulses: Principles and Experiments, Vol Advanced texts in physics, 2nd edn (Springer).
27. Horton, N. G., Wang, K., Kobat, D., Clark, C. G., Wise, F. W., Schaffer, C. B., and Xu, C. (2013). In vivo three-photon microscopy of subcortical structures within an intact mouse brain. Nature Photonics 7, 205-209. Huberman, A. D., and Niell, C. M. (2011). What can mice tell us about how vision works? Trends in Neurosciences 34, 464-473.
28. Insel, T. R., Landis, S. C., and Collins, F. S. (2013). The NIH BRAIN Initiative. Science 340, 687-688.
29. Iyer, V., Hoogland, T. M., and Saggau, P. (2006). Fast functional imaging of single neurons using random-access multiphoton (RAMP) microscopy. Journal of Neurophysiology 95, 535-545.
30. Ji, N., Sato, T. R., and Betzig, E. (2012). Characterization and adaptive optical correction of aberrations during in vivo imaging in the mouse cortex. Proceedings of the National Academy of Sciences of the United States of America 109, 22-27.
31. Katona, G., Szalay, G., Maak, P., Kaszas, A., Veress, M., Hillier, D., Chiovini, B., Vizi, E. S., Roska, B., and Rozsa, B. (2012). Fast two-photon in vivo imaging with three-dimensional random-access scanning in large tissue volumes. Nature Methods 9, 201-208.
32. Kim, K. H., Buehler, C., Bahlmann, K., Ragan, T., Lee, W.-C. A., Nedivi, E., Heffer, E. L., Fantini, S., and So, P. T. C. (2007). Multifocal multiphoton microscopy based on multianode photomultiplier tubes. Optics Express 15, 11658-11678.
33. Kobat, D., Horton, N. G., and Xu, C. (2011). In vivo two-photon microscopy to 1.6-mm depth in mouse cortex. Journal of Biomedical Optics 16.
34. Kremer, Y., Leger, J. F., Lapole, R., Honnorat, N., Candela, Y., Dieudonne, S., and Bourdieu, L. (2008). A spatio-temporally compensated acousto-optic scanner for two-photon microscopy providing large field of view. Optics Express 16, 10066-10076.
35. Li, Y., Lu, H., Cheng, P.-l., Ge, S., Xu, H., Shi, S.-H., and Dan, Y. (2012). Clonally related visual cortical neurons show similar stimulus feature selectivity. Nature 486, 118-U144. London, M., and Hausser, M. (2005). Dendritic computation. In Annual Review of Neuroscience, pp. 503-532.
36. Masamizu, Y., Tanaka, Y. R., Tanaka, Y. H., Hira, R., Ohkubo, F., Kitamura, K., Isomura, Y., Okada, T., and Matsuzaki, M. (2014). Two distinct layer-specific dynamics of cortical ensembles during learning of a motor task. Nature Neuroscience 17, 987-994.
37. Matsumoto, N., Okazaki, S., Fukushi, Y., Takamoto, H., Inoue, T., and Terakawa, S. (2014). An adaptive approach for uniform scanning in multifocal multiphoton microscopy with a spatial light modulator. Optics Express 22, 633-645.
38. Mazurek, M., Kager, M., and Van Hooser, S. D. (2014). Robust quantification of orientation selectivity and direction selectivity. Frontiers in Neural Circuits 8.
39. Meyer, H. S., Schwarz, D., Wimmer, V. C., Schmitt, A. C., Kerr, J. N. D., Sakmann, B., and Helmstaedter, M. (2011). Inhibitory interneurons in a cortical column form hot zones of inhibition in layers 2 and 5A. Proceedings of the National Academy of Sciences of the United States of America 108, 16807-16812. Mukamel, E. A., Nimmerjahn, A., and Schnitzer, M. J. (2009). Automated Analysis of Cellular Signals from Large-Scale Calcium Imaging Data. Neuron 63, 747-760.
40. Niell, C. M., and Stryker, M. P. (2008). Highly selective receptive fields in mouse visual cortex. Journal of Neuroscience 28, 7520-7536.
41. Nikolenko, V., Watson, B. O., Araya, R., Woodruff, A., Peterka, D. S., and Yuste, R. (2008). SLM microscopy: scanless two-photon imaging and photostimulation with spatial light modulators. Frontiers in Neural Circuits 2.
42. O'Shea, D. C., Suleski, T. J., Kathman, A. D., and Prather, D. W. (2003). Diffractive Optics: Design, Fabrication, and Test, Vol TT62 (Bellingham, Wash., USA: SPIE Press).
43. Otsu, Y., Bormuth, V., Wong, J., Mathieu, B., Dugue, G. P., Feltz, A., and Dieudonne, S. (2008). Optical monitoring of neuronal activity at high frame rate with a digital random-access multiphoton (RAMP) microscope. Journal of Neuroscience Methods 173, 259-270.
44. Packer, A. M., Peterka, D. S., Hirtz, J. J., Prakash, R., Deisseroth, K., and Yuste, R. (2012). Two-photon optogenetics of dendritic spines and neural circuits. Nature Methods 9, 1202-U1103.
45. Packer, A. M., Russell, L. E., Dalgleish, H. W. P., and Haeusser, M. (2015). Simultaneous all-optical manipulation and recording of neural circuit activity with cellular resolution in vivo. Nature Methods 12, 140-U186.
46. Palmer, C. (2014). Diffraction Grating Handbook, 7th edn (THERMO RGL). Pnevmatikakis, E. A., Soudry, D., Gao, Y., Machado, T. A., Pfau, D., Reardon, T., Mu, Y., Lacefield, C., Poskanzer, K. E., Ahrens, M. B., et al. (2015). Simultaneous denoising, deconvolution, and demixing of calcium imaging data. Neuron.
47. Pologruto, T. A., Sabatini, B. L., and Svoboda, K. (2003). ScanImage: flexible software for operating laser scanning microscopes. Biomedical engineering online 2, 13-13.
48. Quirin, S., Jackson, J., Peterka, D. S., and Yuste, R. (2014). Simultaneous imaging of neural activity in three dimensions. Frontiers in Neural Circuits 8.
49. Quirin, S., Peterka, D. S., and Yuste, R. (2013). Instantaneous three-dimensional sensing using spatial light modulator illumination with extended depth of field imaging. Optics Express 21, 16007-16021.
50. Reddy, G. D., Kelleher, K., Fink, R., and Saggau, P. (2008). Three-dimensional random access multiphoton microscopy for functional imaging of neuronal activity. Nature Neuroscience 11, 713-720.
51. Rickgauer, J. P., Deisseroth, K., and Tank, D. W. (2014). Simultaneous cellular-resolution optical perturbation and imaging of place cell firing fields. Nature Neuroscience 17, 1816-1824.
52. Rochefort, N. L., Narushima, M., Grienberger, C., Marandi, N., Hill, D. N., and Konnerth, A. (2011). Development of Direction Selectivity in Mouse Cortical Neurons. Neuron 71, 425-432.
53. Salome, R., Kremer, Y., Dieudonne, S., Leger, J. F., Krichevsky, O., Wyart, C., Chatenay, D., and Bourdieu, L. (2006). Ultrafast random-access scanning in two-photon microscopy using acousto-optic deflectors. Journal of Neuroscience Methods 154, 161-174.
54. Schmidt, J. D. (2010). Numerical Simulation of Optical Wave Propagation with Examples in MATLAB (Bellingham, Wash. 98227-0010 USA: SPIE Press).
55. Shai, A. S., Anastassiou, C. A., Larkum, M. E., and Koch, C. (2015). Physiology of Layer 5 Pyramidal Neurons in Mouse Primary Visual Cortex: Coincidence Detection through Bursting. PLoS computational biology 11, e1004090-e1004090.
56. Sheetz, K. E., Hoover, E. E., Carriles, R., Kleinfeld, D., and Squier, J. A. (2008). Advancing multifocal nonlinear microscopy: development and application of a novel multibeam Yb:KGd(WO4)(2) oscillator. Optics Express 16, 17574-17584.
57. Siltanen, S., Kolehmainen, V., Jarvenpaa, S., Kaipio, J. P., Koistinen, P., Lassas, M., Pirttila, J., and Somersalo, E. (2003). Statistical inversion for medical x-ray tomography with few radiographs: I. General theory. Physics in Medicine and Biology 48, 1437-1463.
58. Stirman, J. N., Smith, I. T., Kudenov, M. W., and Smith, S. L. (2014). Wide field-of-view, twin-region two-photon imaging across extended cortical networks.
59. Theriault, G., Cottet, M., Castonguay, A., McCarthy, N., and De Koninck, Y. (2014). Extended two-photon microscopy in live samples with Bessel beams: steadier focus, faster volume scans, and simpler stereoscopic imaging. Frontiers in Cellular Neuroscience 8.
60. Thevenaz, P., Ruttimann, U. E., and Unser, M. (1998). A pyramid approach to subpixel registration based on intensity. Ieee Transactions on Image Processing 7, 27-41.
61. Vogelstein, J. T., Packer, A. M., Machado, T. A., Sippy, T., Babadi, B., Yuste, R., and Paninski, L. (2010). Fast Nonnegative Deconvolution for Spike Train Inference From Population Calcium Imaging. Journal of Neurophysiology 104, 3691-3704.
62. Vogelstein, J. T., Watson, B. O., Packer, A. M., Yuste, R., Jedynak, B., and Paninski, L. (2009). Spike Inference from Calcium Imaging Using Sequential Monte Carlo Methods. Biophysical Journal 97, 636-655.
63. Williams, R. M., Zipfel, W. R., and Webb, W. W. (2001). Multiphoton microscopy in biological research. Current Opinion in Chemical Biology 5, 603-608.
64. Zipfel, W. R., Williams, R. M., and Webb, W. W. (2003). Nonlinear magic: Multiphoton microscopy in the biosciences. Nature Biotechnology 21, 1369-1377.
65. Palmer, C., Diffraction Grating Handbook. 7th ed. 2014: THERMO RGL. 265.
66. O'Shea, D. C., et al., Diffractive Optics: Design, Fabrication, and Test. Tutorial Texts in Optical Engineering. Vol. TT62. 2003, Bellingham, Wash., USA: SPIE Press.
67. Golan, L., et al., Design and characteristics of holographic neural photo-stimulation systems. Journal of Neural Engineering, 2009. 6(6).
68. Hirlimann, C., Femtosecond Laser Pulses: Principles and Experiments. 2nd ed. Vol. Advanced texts in physics. 2005: Springer.
69. Zipfel, W. R., R. M. Williams, and W. W. Webb, Nonlinear magic: Multiphoton microscopy in the biosciences. Nature Biotechnology, 2003. 21(11): p. 1369-1377.
70. Horton, N. G., et al., In vivo three-photon microscopy of subcortical structures within an intact mouse brain. Nature Photonics, 2013. 7(3): p. 205-209.

What is claimed is:

1. A device, comprising:
   at least one radiation source configured to generate at least one first radiation;
   at least one spatial light modulator (SLM) arrangement configured to receive the at least one first radiation and generate at least one second radiation based on the at least one first radiation, wherein the at least one SLM arrangement includes:

a SLM configured to generate the at least one second radiation;

a pre-SLM afocal telescope configured to resize the at least one first radiation to match an area of the SLM;

a plurality of folding mirrors configured to redirect the at least one first radiation to the pre-SLM afocal telescope; and a post SLM afocal telescope configured to resize the at least one second radiation to match a size of an acceptance aperture of the at least one galvanometer; and at least one galvanometer configured to receive the at least one second radiation, generate at least one third radiation based on the at least one second radiation, and provide the at least one third radiation to at least one sample.

2. The device of claim 1, wherein the at least one galvanometer includes at least one resonant galvanometer.

3. The device of claim 1, wherein the at least one SLM arrangement further includes at least one broadband waveplate located between the pre-SLM afocal telescope and the SLM.

4. The device of claim 3, wherein the at least one broadband waveplate is configured to rotate a polarization of the at least one first radiation to cause the at least one first radiation to be parallel with an active axis of the SLM.

5. The device of claim 1, wherein the SLM is configured to split the at least one first radiation into the radiation beamlets which are the at least one second radiation.

6. The device of claim 5, wherein the at least one SLM arrangement is configured to independently dynamically control each of the radiation beamlets.

7. The device of claim 5, wherein the SLM splits the at least one first radiation into the radiation beamlets by imprinting a phase profile across the at least one first radiation.

8. The device of claim 5, wherein the at least one galvanometer is further configured to direct each of the radiation beamlets to at least one of (i) a different area or (ii) a different plane of the at least one sample.

9. The device of claim 1, wherein the at least one radiation source is at least one laser source.

10. The device of claim 1, further comprising at least one pocket cell located between the at least one radiation source and the at least one SLM arrangement.

11. The device of claim 10, wherein the at least one pocket cell is configured to modulate an intensity of the at least one first radiation.

12. The device of claim 1, further comprising a computer processing arrangement configured to generate at least one image of the at least one sample based on at least one fourth radiation received from the at least one sample that is based on the at least one third radiation.

13. The device of claim 1, further comprising a computer processing arrangement configured to generate at least one image of the at least one sample based on a plurality of resultant radiations received from the at least one sample that are based on the radiation beamlets.

14. The device of claim 13, wherein a first number of the resultant radiations is based on a second number of the radiation beamlets.

15. The device of claim 14, wherein the second number of the radiation beamlets is based on a third number of the planes of the at least one sample.

16. The device of claim 15, wherein the computer processing arrangement is further configured to generate a third number of images of the at least one sample based on the resultant radiations.

17. The device of claim 13, wherein the at least one image includes a plurality of images.

18. The device of claim 17, wherein the computer processing arrangement is further configured to generate at least one multiplane image based on the images.

19. The device of claim 18, wherein the at least one multiplane image is generated by interleaving the images into the at least one multiplane image.

20. The device of claim 18, wherein the computer processing arrangement is further configured to correct brain motion artifacts in the images based on a pyramid procedure.

21. A method, comprising:

generating at least one radiation;

directing the at least one radiation to a pre-spatial light modulator (SLM) afocal telescope using a plurality of folding mirrors;

resizing the at least one redirected radiation using the pre-SLM afocal telescope to match an area of at least one (SLM);

splitting the at least one resized radiation into a plurality of radiation beamlets using the at least one SLM;

resizing the radiation beamlets to match a size of an acceptance aperture of at least one galvanometer; and directing the radiation beamlets to at least one sample using the at least one galvanometer.

* * * * *